US011932022B2

(12) United States Patent
Ishizawa et al.

(10) Patent No.: US 11,932,022 B2
(45) **Date of Patent: *Mar. 19, 2024**

(54) INK BOTTLE AND BOTTLE SET

(71) Applicant: SEIKO EPSON CORPORATION, Tokyo (JP)

(72) Inventors: Taku Ishizawa, Matsumoto (JP); Tadahiro Mizutani, Shiojiri (JP); Ryoichi Tanaka, Shiojiri (JP); Manabu Akahane, Tatsuno-machi (JP); Koichi Toba, Shiojiri (JP); Takumi Nagashima, Matsumoto (JP); Yoshiaki Shimizu, Matsumoto (JP); Tadashi Watanabe, Matsumoto (JP); Noriyuki Fukasawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,849

(22) Filed: Feb. 2, 2023

(65) Prior Publication Data

US 2023/0173814 A1 Jun. 8, 2023

Related U.S. Application Data

(63) Continuation of application No. 17/516,904, filed on Nov. 2, 2021, now Pat. No. 11,597,207, which is a (Continued)

(30) Foreign Application Priority Data

Jan. 26, 2017 (JP) ................................ 2017-011876

(51) Int. Cl.
*B41J 2/175* (2006.01)
*B65D 1/06* (2006.01)
(Continued)

(52) U.S. Cl.
CPC ....... *B41J 2/17506* (2013.01); *B41J 2/17509* (2013.01); *B41J 2/1752* (2013.01);
(Continued)

(58) Field of Classification Search
CPC ................ B65D 47/32; B65D 47/2031; B65D 41/0407; B41J 2/17506
(Continued)

(56) References Cited

U.S. PATENT DOCUMENTS 313,253 A 3/1885 Thatcher
811,811 A 2/1906 Allison
(Continued)

FOREIGN PATENT DOCUMENTS

CN 102126351 A 7/2011
CN 202186122 U 4/2012
(Continued)

*Primary Examiner* — Paul R Durand
*Assistant Examiner* — Michael J. Melaragno
(74) *Attorney, Agent, or Firm* — Oliff PLC

(57) ABSTRACT

Convenience of an ink bottle and a bottle set is improved. An ink bottle includes: a container portion that contains ink; a guiding portion that is formed in one end portion of the container portion, and includes an outflow port from which the ink in the container portion flow out; and a cover that covers at least an end portion of the container portion on the opposite side of the guiding portion.

15 Claims, 34 Drawing Sheets

Related U.S. Application Data continuation of application No. 16/728,430, filed on Dec. 27, 2019, now Pat. No. 11,192,380, which is a continuation of application No. 15/879,184, filed on Jan. 24, 2018, now abandoned.

(51) Int. Cl.

| | |
|---|---|
| ***B65D 41/04*** | (2006.01) |
| ***B65D 41/16*** | (2006.01) |
| ***B65D 47/12*** | (2006.01) |
| ***B65D 47/20*** | (2006.01) |
| ***B65D 47/32*** | (2006.01) |

(52) U.S. Cl.

CPC ......... *B41J 2/17523* (2013.01); *B41J 2/1755* (2013.01); *B41J 2/17553* (2013.01); *B65D 1/06* (2013.01); *B65D 41/0407* (2013.01); *B65D 41/16* (2013.01); *B65D 47/123* (2013.01); *B65D 47/2031* (2013.01); *B65D 47/32* (2013.01)

(58) Field of Classification Search

USPC .......................................................... 222/211

See application file for complete search history.

(56) References Cited

U.S. PATENT DOCUMENTS

| | | | |
|---|---|---|---|
| 3,179,276 | A | 4/1965 | Safianoff |
| 3,893,596 | A | 7/1975 | Beres et al. |
| D236,694 | S | 9/1975 | Avolio |
| D240,201 | S | 6/1976 | Avoilio et al. |
| 4,243,150 | A | 1/1981 | Gunne et al. |
| 4,524,365 | A | 6/1985 | Kakeno et al. |
| 4,548,828 | A | 10/1985 | Meyers |
| RE32,142 | E | 5/1986 | Meyers |
| 4,801,054 | A | 1/1989 | Nycz |
| 5,379,927 | A | 1/1995 | Montenieri et al. |
| 5,531,353 | A | 7/1996 | Ward et al. |
| 5,783,254 | A | 7/1998 | Maynard |
| D398,634 | S | 9/1998 | Katayama et al. |
| 5,838,352 | A | 11/1998 | Martinez |
| 5,874,976 | A | 2/1999 | Katon et al. |
| 5,897,033 | A | 4/1999 | Okawa et al. |
| 5,903,293 | A | 5/1999 | Nikkels et al. |
| 5,920,333 | A | 7/1999 | Bates |
| 6,079,823 | A | 6/2000 | Droege |
| 6,164,768 | A | 12/2000 | Murphy et al. |
| 6,209,736 | B1 | 4/2001 | Chen et al. |
| 6,213,597 | B1 | 4/2001 | Liu |
| 6,234,617 | B1 | 5/2001 | Niedermeyer et al. |
| 6,254,297 | B1 | 7/2001 | Frazier |
| D469,119 | S | 1/2003 | Shiba |
| 6,520,630 | B1 | 2/2003 | Oda et al. |
| 6,772,911 | B2 | 8/2004 | Gee et al. |
| 6,786,363 | B1 | 9/2004 | Lohrman |
| 6,820,764 | B2 | 11/2004 | Miani et al. |
| 6,969,161 | B2 | 11/2005 | Kuwabara et al. |
| D524,366 | S | 7/2006 | Arai et al. |
| D529,542 | S | 10/2006 | Tazawa |
| D538,850 | S | 3/2007 | Choi et al. |
| 7,300,138 | B2 | 11/2007 | Corner et al. |
| 7,360,876 | B2 | 4/2008 | Inoue et al. |
| 7,416,140 | B2 | 8/2008 | Camilleri et al. |
| D583,862 | S | 12/2008 | Park et al. |
| 7,458,665 | B2 | 12/2008 | Batista et al. |
| 7,503,469 | B2 | 3/2009 | Bloom et al. |
| 7,607,770 | B2 | 10/2009 | Inoue et al. |
| 7,677,417 | B2 | 3/2010 | Leiner et al. |
| 7,735,698 | B2 | 6/2010 | Lin |
| 7,887,166 | B2 | 2/2011 | Guhse et al. |
| 8,002,130 | B2 | 8/2011 | Thilly |
| 8,028,850 | B2 | 10/2011 | Zimmerman |
| 8,397,957 | B2 | 3/2013 | Bloom et al. |
| 8,511,520 | B2 | 8/2013 | Van Wijk et al. |
| 8,608,034 | B2 | 12/2013 | Bloom |
| 8,678,249 | B2 | 3/2014 | Gaus |
| 8,794,489 | B2 | 8/2014 | Bloom et al. |
| 9,050,814 | B2 | 6/2015 | Yoshida et al. |
| 9,090,075 | B2 | 7/2015 | Matsumoto et al. |
| 9,199,769 | B2 | 12/2015 | Wood et al. |
| 9,387,684 | B2 | 7/2016 | Ogawa et al. |
| 9,421,781 | B2 | 8/2016 | Kimura et al. |
| 9,592,675 | B2 | 3/2017 | Matsumoto et al. |
| 9,662,893 | B2 | 5/2017 | Mori et al. |
| 9,718,276 | B2 | 8/2017 | Tomoguchi |
| 9,738,079 | B2 | 8/2017 | Matsushita et al. |
| 9,757,949 | B2 | 9/2017 | Yoshida et al. |
| 9,908,338 | B2 | 3/2018 | Koshikawa et al. |
| 9,908,671 | B2 | 3/2018 | Besson et al. |
| 9,969,173 | B2 | 5/2018 | Yamaguchi |
| 9,994,037 | B2 | 6/2018 | Sakai |
| 10,105,960 | B2 | 10/2018 | Tomoguchi |
| 10,239,323 | B2 | 3/2019 | Nagashima et al. |
| 10,350,896 | B2 | 7/2019 | Ishizawa et al. |
| 10,350,901 | B2 | 7/2019 | Mizutani et al. |
| D865,521 | S | 11/2019 | Ishizawa et al. |
| 10,471,723 | B2 | 11/2019 | Fukasawa et al. |
| D899,513 | S | 10/2020 | Ohashi et al. |
| 11,192,380 | B2 | 12/2021 | Ishizawa et al. |
| 11,298,952 | B2 | 4/2022 | Mizutani et al. |
| 2001/0027957 | A1 | 10/2001 | Kano |
| 2002/0035940 | A1 | 3/2002 | Sasaki et al. |
| 2002/0066712 | A1 | 6/2002 | Brockwell |
| 2002/0171713 | A1 | 11/2002 | Ueno et al. |
| 2003/0174181 | A1 | 9/2003 | Nishioka et al. |
| 2004/0060893 | A1 | 4/2004 | Kano et al. |
| 2004/0061748 | A1 | 4/2004 | Kuwabara et al. |
| 2004/0069799 | A1 | 4/2004 | Gee et al. |
| 2004/0074924 | A1 | 4/2004 | Kuhn et al. |
| 2005/0006407 | A1 | 1/2005 | Lawson et al. |
| 2005/0011916 | A1 | 1/2005 | Battista et al. |
| 2005/0035078 | A1 | 2/2005 | Lieberman et al. |
| 2005/0211727 | A1 | 9/2005 | Ohm et al. |
| 2006/0017787 | A1 | 1/2006 | Inoue et al. |
| 2006/0108378 | A1 | 5/2006 | Cohen et al. |
| 2006/0187280 | A1 | 8/2006 | Yan |
| 2006/0231580 | A1 | 10/2006 | Lawson et al. |
| 2007/0024683 | A1 | 2/2007 | Yan |
| 2007/0052776 | A1 | 3/2007 | Guhse et al. |
| 2007/0052777 | A1 | 3/2007 | Guhse et al. |
| 2007/0171263 | A1 | 7/2007 | Inoue et al. |
| 2008/0011783 | A1 | 1/2008 | Bloc et al. |
| 2009/0057349 | A1 | 3/2009 | Lin |
| 2010/0201761 | A1 | 8/2010 | Lu et al. |
| 2011/0155687 | A1 | 6/2011 | Ammann |
| 2011/0221187 | A1 | 9/2011 | Sarnoff et al. |
| 2012/0024897 | A1 | 2/2012 | Corbett et al. |
| 2012/0043293 | A1 | 2/2012 | Bryan et al. |
| 2012/0125481 | A1 | 5/2012 | Matsumoto et al. |
| 2012/0152978 | A1 | 6/2012 | Sekiyama et al. |
| 2012/0187158 | A1 | 7/2012 | Pritchard |
| 2012/0211530 | A1 | 8/2012 | Bloom |
| 2012/0287209 | A1 | 11/2012 | Yan |
| 2013/0213522 | A1 | 8/2013 | Guhse et al. |
| 2013/0258004 | A1 | 10/2013 | Kyotani |
| 2013/0271535 | A1 | 10/2013 | Sarnoff et al. |
| 2013/0277327 | A1 | 10/2013 | Fong |
| 2014/0104349 | A1 | 4/2014 | Kimura et al. |
| 2014/0158660 | A1 | 6/2014 | Wood et al. |
| 2014/0209639 | A1 | 7/2014 | Sasaki et al. |
| 2014/0224356 | A1 | 8/2014 | Hatton et al. |
| 2015/0062258 | A1 | 3/2015 | Yoshida et al. |
| 2015/0197094 | A1 | 7/2015 | Ogawa et al. |
| 2015/0231889 | A1 | 8/2015 | Yoshida et al. |
| 2016/0016408 | A1 | 1/2016 | Matsumoto et al. |
| 2016/0016706 | A1 | 1/2016 | Rognard et al. |
| 2016/0089893 | A1 | 3/2016 | Osakabe et al. |
| 2016/0121619 | A1 | 5/2016 | Tomoguchi |
| 2016/0167850 | A1 | 6/2016 | Mclaren et al. |
| 2016/0200110 | A1 | 7/2016 | Matsushita et al. |
| 2016/0303860 | A1 | 10/2016 | Mori et al. |
| 2016/0303863 | A1 | 10/2016 | Sakai |

(56) References Cited

U.S. PATENT DOCUMENTS

| | | | |
|---|---|---|---|
| 2016/0332455 | A1 | 11/2016 | Yoshida et al. |
| 2016/0347516 | A1 | 12/2016 | Hatton et al. |
| 2017/0008295 | A1 | 1/2017 | Osakabe et al. |
| 2017/0030472 | A1 | 2/2017 | Hall |
| 2017/0120606 | A1 | 5/2017 | Koshikawa et al. |
| 2017/0190184 | A1 | 7/2017 | Sarnoff et al. |
| 2017/0266977 | A1 | 9/2017 | Osakabe et al. |
| 2017/0282570 | A1 | 10/2017 | Yamaguchi |
| 2017/0326882 | A1 | 11/2017 | Okude et al. |
| 2017/0341402 | A1 | 11/2017 | Nagashima et al. |
| 2017/0355191 | A1 | 12/2017 | Mizutani et al. |
| 2017/0355194 | A1 | 12/2017 | Fukasawa et al. |
| 2017/0355195 | A1 | 12/2017 | Fukasawa et al. |
| 2017/0368833 | A1 | 12/2017 | Tomoguchi |
| 2018/0001650 | A1 | 1/2018 | Miyashita et al. |
| 2018/0065375 | A1 | 3/2018 | Nagashima et al. |
| 2018/0154645 | A1 | 6/2018 | Rooney et al. |
| 2018/0207939 | A1 | 7/2018 | Ishizawa et al. |
| 2018/0250943 | A1 | 9/2018 | Fukasawa et al. |
| 2018/0290456 | A1 | 10/2018 | Osakabe et al. |
| 2019/0275801 | A1 | 9/2019 | Osakabe et al. |
| 2020/0207108 | A1 | 7/2020 | Osakabe et al. |
| 2022/0024214 | A1 | 1/2022 | Osakabe et al. |

FOREIGN PATENT DOCUMENTS

| | | | | | |
|---|---|---|---|---|---|
| CN | 202702869 | U | | 1/2013 | |
| CN | 204382821 | U | | 6/2015 | |
| EP | 0 707 970 | A2 | | 4/1996 | |
| EP | 3 075 540 | A1 | | 10/2016 | |
| GB | 2 080 775 | A | | 2/1982 | |
| IN | 300515-0001 | | | 3/2018 | |
| JP | S58-107348 | A | | 6/1983 | |
| JP | S59-042963 | A | | 3/1984 | |
| JP | H05-35690 | U | | 5/1993 | |
| JP | 3021835 | U | | 3/1996 | |
| JP | H09-020018 | A | | 1/1997 | |
| JP | H09-294955 | A | | 11/1997 | |
| JP | H10-216612 | A | | 8/1998 | |
| JP | H11-123834 | A | | 5/1999 | |
| JP | 2001-002097 | A | | 1/2001 | |
| JP | 2001-088317 | A | | 4/2001 | |
| JP | 2001-146021 | A | | 5/2001 | |
| JP | 2001-187459 | A | | 7/2001 | |
| JP | 2003-305865 | A | | 10/2003 | |
| JP | 2004-142442 | A | | 5/2004 | |
| JP | 2004-142447 | A | | 5/2004 | |
| JP | 2005-028859 | A | | 2/2005 | |
| JP | 2006-263960 | A | | 10/2006 | |
| JP | 2006-281793 | A | | 10/2006 | |
| JP | 2008-162595 | A | | 7/2008 | |
| JP | 2009-241608 | A | | 10/2009 | |
| JP | 2010-240907 | A | | 10/2010 | |
| JP | 3168889 | U | | 6/2011 | |
| JP | 2011-230840 | A | | 11/2011 | |
| JP | D1429123 | S | | 12/2011 | |
| JP | 2012-106363 | A | | 6/2012 | |
| JP | 2012-131068 | A | | 7/2012 | |
| JP | 2012-176587 | A | | 9/2012 | |
| JP | D14-55311 | S | | 11/2012 | |
| JP | 2013-176968 | A | | 9/2013 | |
| JP | 2013-226830 | A | | 11/2013 | |
| JP | 2014-008640 | A | | 1/2014 | |
| JP | 2014-088207 | A | | 5/2014 | |
| JP | 2014-091257 | A | | 5/2014 | |
| JP | 2015-178280 | A | | 10/2015 | |
| JP | 2016-041595 | A | | 3/2016 | |
| JP | 2016-68473 | A | | 5/2016 | |
| JP | 2016-087844 | A | | 5/2016 | |
| JP | 2016-102824 | A | | 6/2016 | |
| JP | 2016-190402 | A | | 11/2016 | |
| JP | 2016-203404 | A | | 12/2016 | |
| JP | 2017-039517 | A | | 2/2017 | |
| WO | 2004028817 | A1 | | 4/2004 | |
| WO | WO-2005056401 | A1 | * | 6/2005 | ......... B65D 21/0217 |
| WO | 2016/060019 | A1 | | 4/2016 | |
| WO | 2020/242453 | A1 | | 12/2020 | |

* cited by examiner

INK BOTTLE AND BOTTLE SET

CROSS-REFERENCE TO RELATED APPLICATIONS

This application is a Continuation Application of U.S. patent application Ser. No. 17/516,904, filed Nov. 2, 2021, which is a Continuation Application of U.S. application Ser. No. 16/728,430, filed Dec. 27, 2019, which is a Continuation Application of U.S. application Ser. No. 15/879,184, filed Jan. 24, 2018, which claims priority to Japanese Patent Application No. 2017-011876 filed on Jan. 26, 2017. The entire disclosures of both prior applications are expressly incorporated by reference herein.

BACKGROUND

1. Technical Field

The present invention relates to ink bottles, bottle sets, and the like.

2. Related Art

Examples of hitherto known ink ejection devices include ink-jet printers capable of printing on a recording medium, such as recording paper, using ink by discharging the ink from a recording head onto the recording medium. Some inkjet printers allow a user to refill a tank for storing ink that is to be supplied to the recording head. Bottles (ink bottles) suitable for injecting ink into a tank are hitherto known (refer to JP-A-2014-88207, for example).

With the bottle described in JP-A-2014-88207, if the bottle whose plug is open is grasped firmly or tilted downward, for example, the ink inside the bottle may leak out from an outflow port. This is one factor that impairs the convenience of the bottle. Accordingly, the hitherto known bottles have problems to be solved in terms of convenience.

SUMMARY

An advantage of some aspects of the invention is that the convenience of an ink bottle or a bottle set can be improved.

The invention may be realized as the following modes or application examples.

Application Example 1

An ink bottle including: a container portion that contains ink; a guiding portion that is formed in one end portion of the container portion, and includes an outflow port from which the ink in the container portion can flow out; and a cover that covers at least an end portion of the container portion on the opposite side of the guiding portion.

In this ink bottle, the container portion can be protected by the cover, and as a result, the convenience can be easily improved.

Application Example 2

The ink bottle described above, wherein the container portion has a space for containing ink, and an opening through which air can be introduced into the space, and the ink bottle includes; a valve is provided in the guiding portion, the valve opens and closes a guiding flow passage that guides the ink in the container portion to the outflow port, and a restriction member that is located in the container portion, and restricts compression deformation of the This ink bottle is provided, in the guiding portion, with the valve that closes the guiding flow passage such that the guiding flow passage is openable and closable. Therefore, even if the ink bottle is tilted downward with the outflow port being oriented downward, the leaking out of ink in the container portion from the outflow port can be easily suppressed by the valve. Also, the ink bottle is provided with the restriction member in the container portion. Accordingly, when a compressing force acts on the container portion, the compression deformation of the container portion can be restricted, and as a result, the leaking out of the ink in the container portion can be easily suppressed, for example. In this way, the convenience can be easily improved with this ink bottle.

Application Example 3

The ink bottle described above, wherein the container portion has a space for containing ink, and an opening through which air is introduced into the space, and the ink bottle includes; a valve is provided in the guiding portion, the valve opens and closes a guiding flow passage that guides the ink in the container portion to the outflow port, and a closing portion is provided outside the space of the container portion, the closing portion opens and closes the opening.

This ink bottle is provided, in the guiding portion, with the valve that closes the guiding flow passage such that the guiding flow passage is openable and closable. Therefore, even if the ink bottle is tilted downward with the outflow port being oriented downward, the leaking out of ink in the container portion from the outflow port can be easily suppressed by the valve. Also, the ink bottle is provided with the closing portion that closes the opening formed in the container portion such that the opening is openable and closable. Therefore, as a result of the closing of the opening by the closing portion being released when the ink in the container portion is allowed to flow out through the outflow port, that is, as a result of opening the opening when the ink in the container portion is allowed to flow out through the outflow port, external air can be introduced into the container portion via the opening. Accordingly, the ink in the container portion can be allowed to quickly flow out through the outflow port. In this way, the convenience can be easily improved with this ink bottle.

Application Example 4

The ink bottle described above, wherein the ink bottle includes a depression portion that is depressed in a portion of an outer shell, and the opening is formed in the depression portion of the ink bottle.

This ink bottle is provided with the opening of the container portion in the depression portion of the container portion. Therefore, the opening is located at a position receded from the outer shell of the container portion. Accordingly, at least a portion of the closing portion that closes the opening can be housed inside the depression portion, and as a result, the amount of the closing portion projecting from the outer shell of the container portion can be reduced.

Application Example 5

The ink bottle described above, wherein the opening is formed in an end portion on the opposite side of the guiding portion including in the container portion.

In this ink bottle, the opening is formed in the end portion on the side opposite to the guiding portion of the container portion, and therefore, when the ink bottle is tilted downward with the outflow port being oriented downward, and ink is allowed to flow out from the outflow port, the opening is located above the outflow port. As a result, when the ink bottle is tilted downward with the outflow port being oriented downward, and the ink is allowed to flow out from the outflow port, the ink is unlikely to leak out from the opening.

Application Example 6

The ink bottle described above, wherein an opening portion that is configured to communicate with the inside of the container portion is formed in the container portion, the ink bottle further includes: a film that covers and seals the opening portion of the container portion; and a nozzle member in which the outflow port that is configured to communicate with the opening portion is provided, and is detachably attached to the container portion, and a breakup portion is provided with the nozzle member, the breakup portion breaks through the film when the nozzle member is attached to the container portion.

In this ink bottle, the film can be broken through by attaching the nozzle member to the container portion. Accordingly, because the task of removing the film can be omitted, the convenience of the ink bottle can be easily improved.

Application Example 7

The ink bottle described above, wherein at least two fractured portions are formed in the film when the nozzle member is attached to the container portion.

In this ink bottle, at least two fractured portions are formed in the film. When the contained ink is allowed to flow out from the outflow port in this ink bottle, for example, the ink can be allowed to flow out from the outflow port through one fractured portion of the two fractured portions, and external air can be introduced into the container portion through the other fractured portion of the two fractured portions. That is, one of the two fractured portions can be used as an ink flow path, and the other can be used as an air flow path. Accordingly, the ink in the container portion can be allowed to smoothly flow out from the outflow port, and therefore the convenience of the ink bottle can be easily improved.

Application Example 8

The ink bottle described above, wherein the ink in the container portion includes liquid and particles that are dispersed in the liquid, and the ink bottle further includes a stirring member that is included in the container portion and has a density higher than the ink.

In this ink bottle, the ink in the container portion is easily stirred by the stirring member housed in the container portion. Accordingly, in the case where particles included in the ink are deposited in the container portion, the ink can be stirred by the stirring member if the container portion is caused to vibrate, the particles can be easily dispersed in the liquid. In this way, the convenience can be easily improved with this ink bottle.

Application Example 9

The ink bottle described above, wherein at least two opening portions are formed in a guiding flow passage that guides the ink to the outflow port.

Since this ink bottle is provided with at least two opening portions in a direction that intersects the gravity direction of the guiding flow passage, even if the stirring member moves toward the guiding portion side and blocks the guiding flow passage when the guiding portion including the outflow port is oriented in the gravity direction, ink passes through one opening portion and air passes through the other opening portion, and as a result, the ink can be more smoothly discharged from the inside of the ink bottle. In this way, the convenience can be easily improved with this ink bottle.

Application Example 10

An ink bottle including: a container portion that contains ink that includes liquid and particles that are dispersed in the liquid; a guiding portion that is formed in one end portion of the container portion, and includes an outflow port from which the ink in the container portion flows out; and a stirring member that is included in the container portion and has a density higher than the ink.

In this ink bottle, the ink in the container portion is easily stirred by the stirring member housed in the container portion. Accordingly, in the case where particles included in the ink are deposited in the container portion, for example, the ink can be stirred by the stirring member by causing the container portion to vibrate, and as a result, the particles can be easily dispersed in the liquid. In this way, the convenience can be easily improved with this ink bottle.

Application Example 11

A bottle set including: an ink bottle that includes an ink container portion that contains ink, and a nozzle portion that includes an outflow port from which ink in the ink container portion flows out; and a lid member that is attachable to and detachable from the ink bottle and contacts with the nozzle portion and seals the outflow port when the lid member is attached to the ink bottle, wherein at least one of the nozzle portion and the lid member is made of polypropylene.

In this bottle set, in a state in which the lid member is attached to the ink bottle, as a result of the lid member abutting against the nozzle portion, the outflow port is sealed. Therefore, in a state in which the lid member is attached to the ink bottle, stress occurs in the lid member and the nozzle portion. When ink comes into contact with the lid member or the nozzle portion in a state in which stress occurs in the lid member and the nozzle portion, deformation and a reduction in toughness can conceivably occur. Polypropylene is a material in which such deformation or a reduction in toughness is unlikely to occur. In this bottle set, at least one of the nozzle portion and the lid member is made of polypropylene, and as a result, deformation and a reduction in toughness are unlikely to occur in at least one of the nozzle portion and the lid member. Accordingly, the sealed state of the outflow port can be easily kept, and the convenience of the bottle set can be easily improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
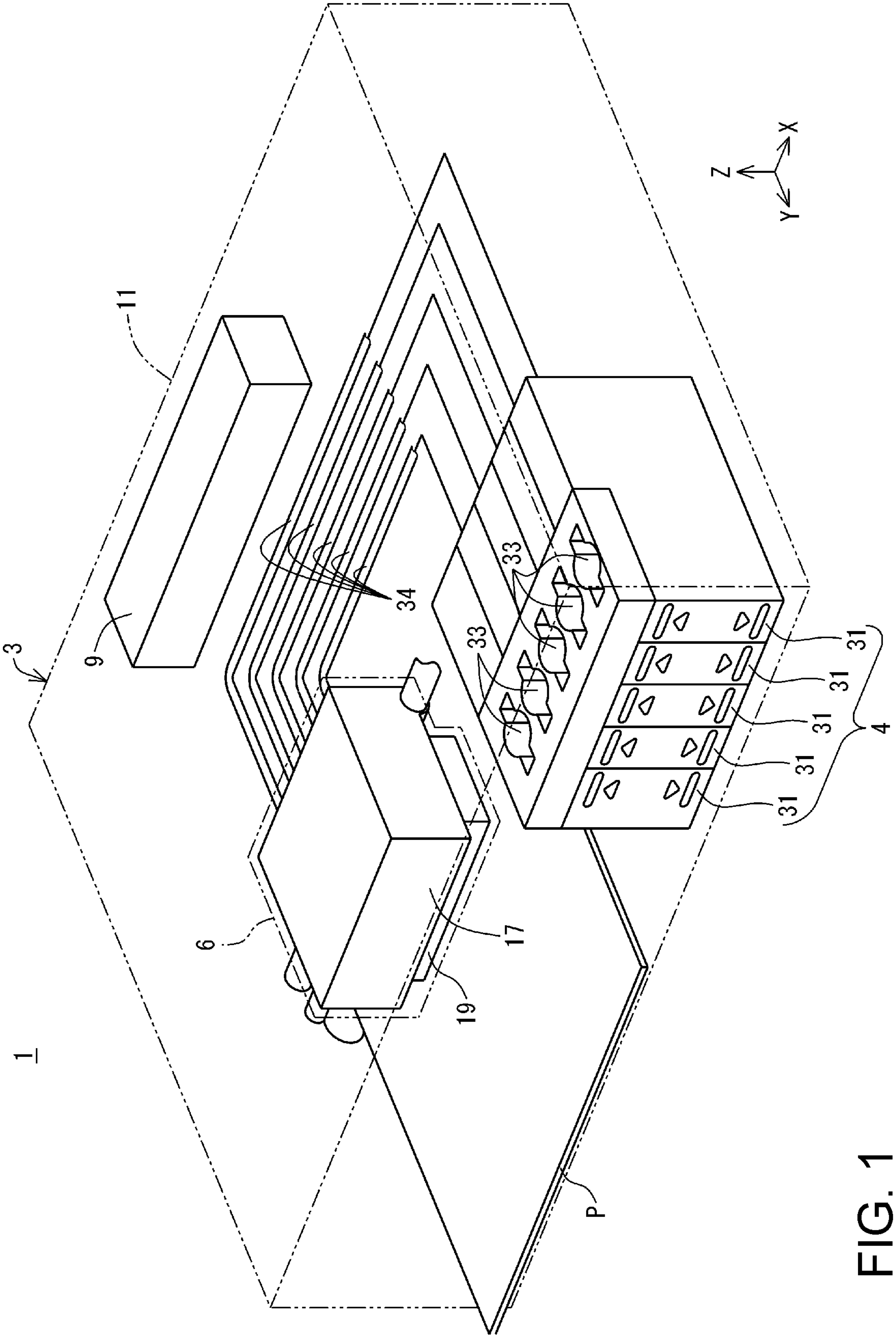
FIG. 1 is a perspective view schematically illustrating a main configuration of an ink ejection system according to a present embodiment.

An embodiment will be described while taking an ink ejection system and a bottle set as an example, with reference to the drawings. Note that, in the drawings, the scale of constituent parts and members may be different such that the respective constituent parts are shown with a recognizable size.

As shown in FIG. 1, an ink ejection system 1 according to this embodiment includes an ink-jet printer 3, which is an example of an ink ejection device, and an ink supply device 4. The printer 3 has a recorder 6 and a controller 9. Note that X, Y, and Z axes, which are orthogonal coordinate axes, are provided in FIG. 1. The X, Y, and Z axes are also provided as required in the subsequent drawings. In this case, the X, Y, and Z axes in each diagram correspond respectively to the X, Y, and Z axes in FIG. 1. FIG. 1 shows a state where the ink ejection system 1 is disposed on an XY plane defined by the X axis and the Y axis. In this embodiment, the state where the ink ejection system 1 is disposed on the XY plane with the XY plane being matched to a horizontal plane is a use state of the ink ejection system 1. The posture of the ink ejection system 1 when the ink ejection system 1 is disposed on the XY plane that is matched to a horizontal plane will be called a use posture of the ink ejection system 1.

Note that the horizontal plane may be a substantially horizontal plane. The substantially horizontal plane includes a plane that is inclined in an allowable inclination range relative to a surface on which the ink ejection system 1 is placed when in use, for example. Accordingly, the substantially horizontal plane is not limited to a plane such as that of a surface plate that has been highly accurately formed, for example. The substantially horizontal plane includes various planes such as those of a desk, a stand, a rack, and a floor on which the ink ejection system 1 is placed when in use. Also, the vertical direction is not limited to a direction strictly along a gravity direction, and includes a perpendicular direction relative to a substantially horizontal plane as well. Therefore, when the substantially horizontal plane is a plane such as that of a desk, a stand, a rack, and a floor, for example, the vertical direction indicates a direction perpendicular to such a plane.

Hereinafter, the X axis, Y axis, and Z axis that appear in the drawings and descriptions depicting constituent parts and units of the ink ejection system 1 mean the X axis, Y axis, and Z axis in a state where the constituent parts and units are assembled with (mounted in) the ink ejection system 1. The posture of the constituent parts and units when the ink ejection system 1 is in the use state will be called a use posture of these constituent parts and units. In the following description, the ink ejection system 1, the constituent parts and units thereof, and the like in their use posture will be described unless otherwise stated.

The Z axis is an axis perpendicular to the XY plane. When the ink ejection system 1 is in the use state, the Z-axis direction is a vertically upward direction. Also, when the ink ejection system 1 is in the use state, the −Z-axis direction is a vertically downward direction in FIG. 1. Note that, regarding the X, Y, and Z axes, the arrow orientation indicates a plus (positive) direction, and the orientation opposite to the arrow orientation indicates a minus (negative) direction. Note that the vertically upward direction and vertically upward indicate an upward direction and upward along a vertical line. Similarly, the vertically downward direction and vertically downward indicate a downward direction and downward along a vertical line. The upward direction and upward without mentioning "vertically" are not limited to an upward direction and upward along a vertical line, and include an upward direction and upward along a direction that intersects the vertical line except for the horizontal direction. Also, the downward direction and downward without mentioning "vertically" are not limited to a downward direction and downward along a vertical line, and include a downward direction and downward along a direction that intersects the vertical line except for the horizontal direction.

In the printer 3, the recorder 6 and the controller 9 are housed in the housing 11. The recorder 6 performs recording using ink, which is an example of a liquid, on a recording medium P, which is conveyed in the Y-axis direction by a conveying device (not shown). Note that the conveying device (not shown) intermittently conveys the recording medium P, such as recording paper, in the Y-axis direction. The recorder 6 is configured to be able to be moved back and forth along the X axis by a moving device (not shown). An ink supply device 4 supplies the ink to the recorder 6. The controller 9 controls driving of the aforementioned constituent parts.

Here, a direction parallel with the X axis is not limited to a direction that is perfectly parallel with the X axis, and also includes a direction that tilts relative to the X axis due to an error, a tolerance, or the like, excluding a direction perpendicular to the X axis. Similarly, a direction parallel with the Y axis is not limited to a direction that is perfectly parallel with the Y axis, and also includes a direction that tilts relative to the Y axis due to an error, a tolerance, or the like, excluding a direction perpendicular to the Y axis. A direction parallel with the Z axis is not limited to a direction that is perfectly parallel with the Z axis, and also includes a direction that tilts relative to the Z axis due to an error, a tolerance, or the like, excluding a direction perpendicular to the Z axis. That is to say, a direction parallel to an axis or a plane is not limited to a direction that is perfectly parallel with this axis or plane, and also includes a direction that tilts relative to this axis or plane due to an error, a tolerance, or the like, excluding a direction perpendicular to this axis or plane.

The recorder 6 includes a carriage 17 and a recording head 19. The recording head 19 is an example of an ink ejector, and discharges droplets of the ink to perform recording on the recording medium P. The recording head 19 is mounted in the carriage 17. Note that the recording head 19 is electrically connected to the controller 9. Discharge of ink droplets from the recording head 19 is controlled by the controller 9.

The ink supply device 4 includes an ink tank 31, as shown in FIG. 1. In the present embodiment, the ink supply device 4 includes a plurality (five, in the present embodiment) of ink tanks 31. The plurality of ink tanks 31 are housed in the housing 11. That is, the plurality of ink tanks 31 are housed in the housing 11 along with the recording head 19 and an ink supply tube 34. Thus, the ink tanks 31 can be protected by the housing 11. Note that a configuration may be adopted in which the plurality of ink tanks 31 are arranged outside the housing 11. In this case, the ink supply device 4 can be expressed as a separate body from the printer 3.

The ink is contained in each ink tank 31. An ink injection portion 33 is formed in each ink tank 31. The ink can be injected into each ink tank 31 from outside via the ink injection portion 33. Note that an operator can access the ink injection portion 33 of the ink tank 31 from outside the housing 11.

Ink supply tubes 34 are connected to the respective ink tanks 31. The ink in each ink tank 31 is supplied to the recording head 19 from the ink supply device 4 via the corresponding ink supply tube 34. The ink supplied to the recording head 19 is discharged as ink droplets from nozzles (not shown), which are oriented toward the recording medium P side. Note that, although the above example describes the printer 3 and the ink supply device 4 as an integrated part, the printer 3 and the ink supply device 4 may be separate constituent parts.

In the ink ejection system 1 having the above configuration, recording is performed onto the recording medium P by conveying the recording medium P in the Y-axis direction, and causing the recording head 19 to discharge ink droplets at a given position while moving the carriage 17 back and forth along the X axis. This operation is controlled by the controller 9.

The ink is not limited to either one of water-based ink or oil-based ink. Water-based ink may be either ink having a configuration in which a solute, such as a dye, is dissolved in a water-based solvent, or ink having a configuration in which a dispersoid, such as a pigment, is dispersed in a water-based dispersing medium. Oil-based ink may be either ink having a configuration in which a solute, such as a dye, is dissolved in an oil-based solvent, or ink having a configuration in which a dispersoid, such as a pigment, is dispersed in an oil-based dispersing medium.

Figure 2:
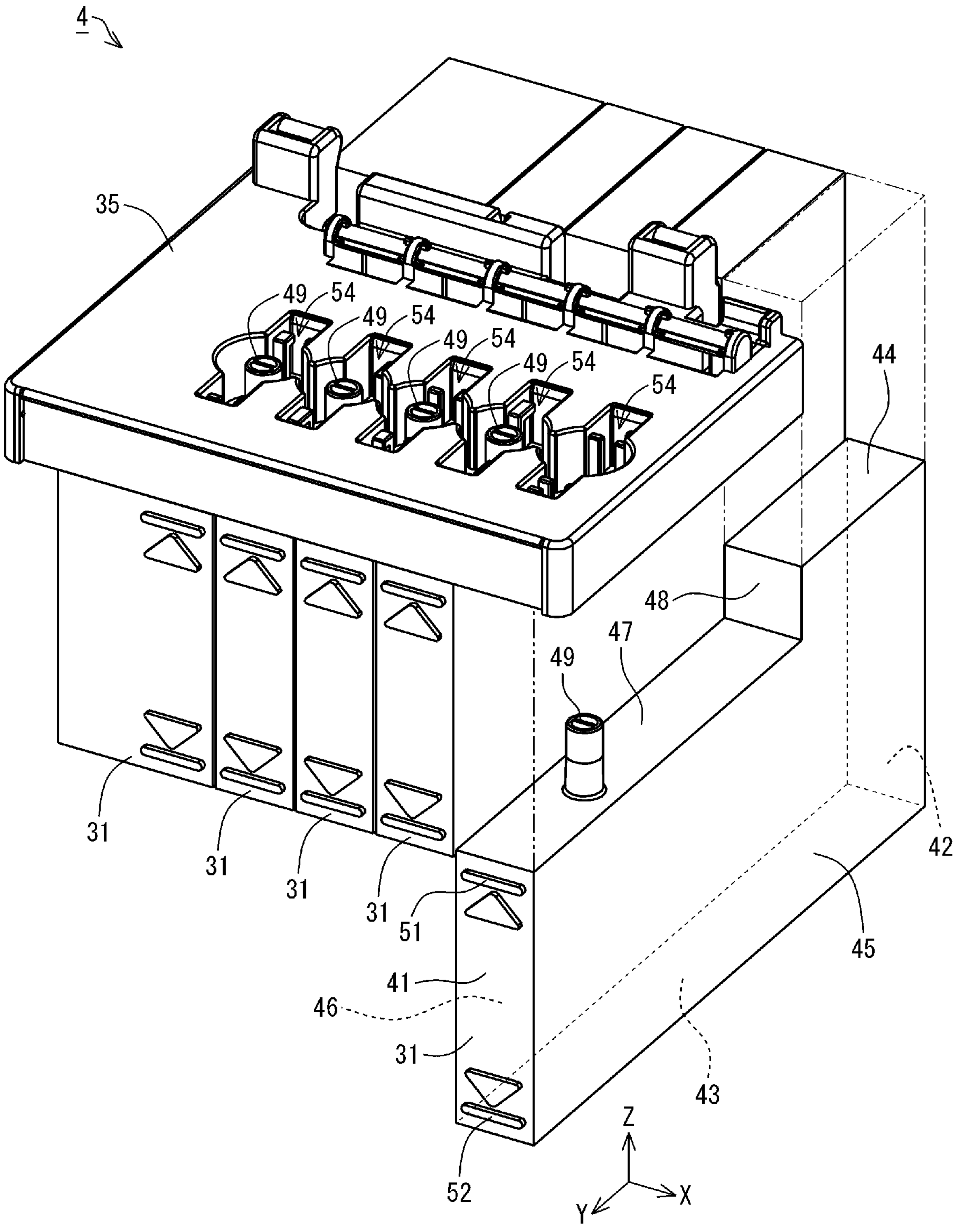
FIG. 2 is an exploded perspective view illustrating a main configuration of an ink supply device according to the present embodiment.

The ink supply device 4 includes the plurality of ink tanks 31 and an adapter 35. The plurality of ink tanks 31 are arranged side by side along the X axis, and have the same structure and shape. In the ink supply device 4, the plurality of ink tanks 31 are integrally bundled by the adapter 35. In FIG. 2, in order to facilitate understanding of the configuration, a state in which one ink tank 31 of the plurality of ink tanks 31 is removed from the adapter 35 is shown.

In the present embodiment, any of a configuration in which the plurality of ink tanks 31 respectively contain different types of ink and a configuration in which the plurality of ink tanks 31 contain the same type of ink can be adopted. The type of ink is an ink color, for example. In the present embodiment, any of a configuration in which the plurality of ink tanks 31 respectively contain ink of different colors and a configuration in which the plurality of ink tanks 31 contain ink of the same color can be adopted. The ink colors are black, yellow, magenta, cyan, and the like, for example.

The ink tank 31 has a length along the Y axis that is larger than the width along the X axis. Also, the ink tank 31 has a height along the Z axis that is smaller than the length along the Y axis. However, the size of the ink tank 31 is not limited thereto, and various sizes can be adopted. The ink tank 31 includes a first wall 41, a second wall 42, a third wall 43, a fourth wall 44, a fifth wall 45, a sixth wall 46, a seventh wall 47, and an eighth wall 48. Also, the ink tank 31 has a connecting tube 49. The first wall 41 to the eighth wall 48 constitute the outer shell of the ink tank 31. The number of walls that constitute the outer shell of the ink tank 31 is not limited to eight, namely the first wall 41 to the eighth wall 48, and a number that is less than eight or a number that exceeds eight can be adopted.

The first wall 41 faces the Y-axis direction and extends along the XZ plane. The first wall 41 is optically transparent, and is configured such that the ink inside the ink tank 31 can be viewed via the first wall 41. That is, the first wall 41 is a viewing wall through which the amount of ink in the ink tank 31 can be visually checked. The first wall 41 is provided with an upper limit mark 51 and a lower limit mark 52. A worker can ascertain the amount of ink in the ink tank 31 using the upper limit mark 51 and the lower limit mark 52 as references or guides.

Note that the marker for notifying the ink amount in the ink tank 31 is not limited to the upper limit mark 51 and the lower limit mark 52, and a scale marker indicating the ink amount can be adopted. A configuration in which a scale marker is added to the upper limit mark 51 and the lower limit mark 52 and a configuration in which the upper limit mark 51 and the lower limit mark 52 are omitted, and only the scale marker is added can be adopted. Also, a marker that indicates the type of ink to be contained in each ink tank 31 can be adopted as the marker added to the ink tank 31. A marker indicating the ink color as the type of ink can be adopted, for example. Various markers are adopted as the marker indicating the ink color such as markers including a letter such as "Bk" indicating black ink, "C" indicating cyan ink, "M" indicating magenta ink, "Y" indicating yellow ink, and markers that are colored to display the ink type.

The second wall 42 opposes the first wall 41 and faces the −Y-axis direction. The second wall 42 extends along the XZ plane. The third wall 43 intersects the first wall 41 and the second wall 42. Note that the term "two surfaces intersect" refers to a positional relationship in which two surfaces are not parallel to each other. Besides the case where the two surfaces are directly in contact with each other, even in a positional relationship where two surfaces are separated from each other rather than being in direct contact, it can be expressed that the two surfaces intersect if an extension of the plane of one surface intersects an extension of the plane of the other surface. The angle formed by the two intersecting surfaces may be a right angle, an obtuse angle, or an acute angle.

The third wall 43 intersects the first wall 41 and the second wall 42. The third wall 43 is located on the −Z-axis direction side of the first wall 41 and the second wall 42, and faces the −Z-axis direction. The third wall 43 extends along the XY plane. The end portion of the third wall 43 in the Y-axis direction is connected to the end portion of the first wall 41 on the −Z-axis direction side. Also, the end portion of the third wall 43 in the −Y-axis direction is connected to the end portion of the second wall 42 in the −Z-axis direction.

The fourth wall 44 opposes the third wall 43, and faces the Z-axis direction. The fourth wall 44 intersects the second wall 42, and extends along the XY plane. The fourth wall 44 is located on the Z-axis direction side of the second wall 42. The fourth wall 44 is located on the −Y-axis direction side relative to the first wall 41. The end portion of the fourth wall 44 in the −Y-axis direction is connected to the end portion of the second wall 42 in the Z-axis direction.

The fifth wall 45 intersects the first wall 41, the second wall 42, the third wall 43, and the fourth wall 44. The fifth wall 45 is located on the X-axis direction side of the first wall 41, the second wall 42, the third wall 43, and the fourth wall 44. The fifth wall 45 faces the X-axis direction and extends along the YZ plane. The end portion of the fifth wall 45 in the Y-axis direction is connected to the end portion of the first wall 41 in the X-axis direction. The end portion of the fifth wall 45 in the −Y-axis direction is connected to the end portion of the second wall 42 in the X-axis direction. The end portion of the fifth wall 45 in the −Z-axis direction is connected to the end portion of the third wall 43 in the X-axis direction. The end portion of the fifth wall 45 in the Z-axis direction is connected to the end portion of the fourth wall 44 in the X-axis direction.

The sixth wall 46 intersects the first wall 41, the second wall 42, the third wall 43, and the fourth wall 44. The sixth wall 46 is located on the −X-axis direction side of the first wall 41, the second wall 42, the third wall 43, and the fourth wall 44, and opposes the fifth wall 45. The sixth wall 46 faces the −X-axis direction, and extends along the YZ plane. The end portion of the sixth wall 46 in the Y-axis direction is connected to the end portion of the first wall 41 in the −X-axis direction. The end portion of the sixth wall 46 in the −Y-axis direction is connected to the end portion of the second wall 42 in the −X-axis direction. The end portion of the sixth wall 46 in the −Z-axis direction is connected to the end portion of the third wall 43 in the −X-axis direction. The end portion of the sixth wall 46 in the Z-axis direction is connected to the end portion of the fourth wall 44 in the −X-axis direction.

The seventh wall 47 is located on the Z-axis direction side of the first wall 41, and intersects the first wall 41. The seventh wall 47 faces the Z-axis direction, and extends along the XY plane. The seventh wall 47 is located between the third wall 43 and the fourth wall 44. The end portion of the seventh wall 47 in the Y-axis direction is connected to the end portion of the first wall 41 in the Z-axis direction. In other words, there is a level difference between the fourth wall 44 and the seventh wall 47 in the ink tank 31. The end portion of the seventh wall 47 in the X-axis direction is connected to the fifth wall 45. The end portion of the seventh wall 47 in the −X-axis direction is connected to the sixth wall 46.

The eighth wall 48 is located on the −Y-axis direction side of the seventh wall 47, and faces the Y-axis direction. Also, the eighth wall 48 is located on the Y-axis direction side of the fourth wall 44. The eighth wall 48 extends along the XZ plane. The end portion of the eighth wall 48 in the −Z-axis direction is connected to the end portion of the seventh wall 47 in the −Y-axis direction, and the end portion of the eighth wall 48 in the Z-axis direction is connected to the end portion of the fourth wall 44 in the Y-axis direction. In other words, the level difference between the fourth wall 44 and the seventh wall 47 is filled by the eighth wall 48 in the ink tank 31.

Figure 3:
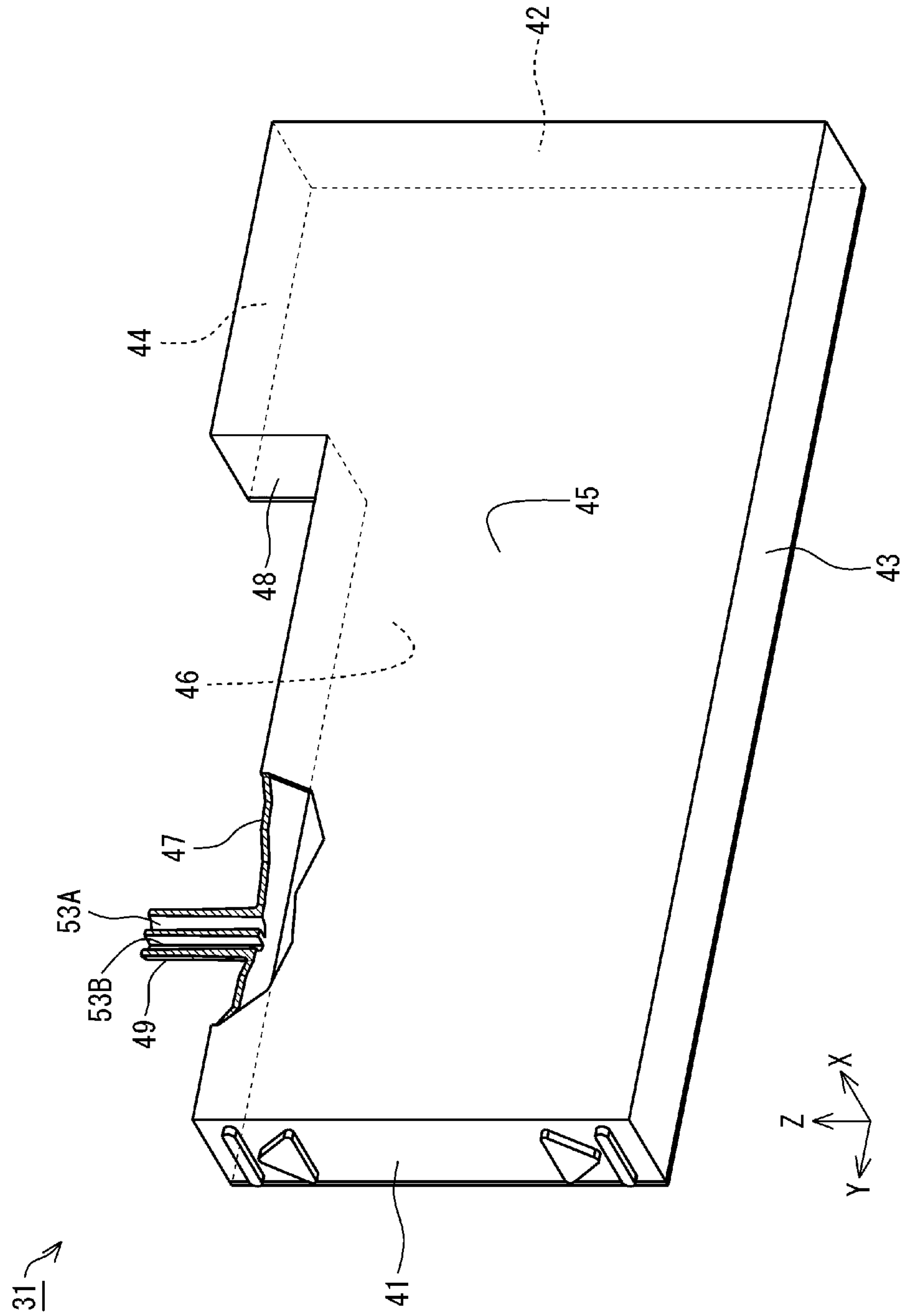
FIG. 3 is a perspective view illustrating an ink tank according to the present embodiment.

A connecting tube 49, which is an example of a connecting portion, is provided in a face of the seventh wall 47 that faces the Z-axis direction. The connecting tube 49 protrudes in the Z-axis direction from the seventh wall 47. The connecting tube 49 is formed to have a hollow tubular shape, and extends in the Z-axis direction. The connecting tube 49 may be expressed as having a chimney shape based on this configuration. The connecting tube 49 is in communication with the inside of the ink tank 31. The ink to be injected into the ink tank 31 is injected into the ink tank 31 via the connecting tube 49. The inside of the connecting tube 49 is partitioned into two flow passages, namely a flow passage 53A and a flow passage 53B, along the Z axis, as shown in FIG. 3. The flow passage 53A and the flow passage 53B are each in communication with the inside of the ink tank 31. In FIG. 3, a state where part of the ink tank 31 including the connecting tube 49 is cut away is illustrated in order to facilitate understanding of the inside of the connecting tube 49.

The adapter 35 has a size so as to cover the plurality of ink tanks 31 that are arranged side by side along the X axis, as shown in FIG. 2. The adapter 35 is located on the Z-axis direction side of the seventh wall 47 of the ink tank 31. A plurality of slot portions 54 are formed in the adapter 35. The slot portions 54 are provided, in the adapter 35, so as to correspond to the respective plurality of ink tanks 31 that are arranged along the X axis. Note that the number of slot portions 54 may be larger than the number of the plurality of ink tanks 31 that are arranged along the X axis.

Each slot portion 54 is formed in a direction so as to recede from the upper surface of the adapter 35 in the Z-axis direction towards the −Z-axis direction. A later-described through hole 55 is formed at the bottom of each slot portion 54. The through hole 55 passes through the adapter 35 along the Z axis. The through hole 55 has a size that allows the insertion of the connecting tube 49 of the ink tank 31. The adapter 35 is attached to a level difference portion between the fourth wall 44 and seventh wall 47 of the ink tank 31. Also, in the ink supply device 4, when the adapter 35 is attached to the ink tanks 31, the connecting tubes 49 of the ink tanks 31 are respectively inserted into the slot portions 54 via the through holes 55 of the adapter 35. Accordingly, in a state in which the adapter 35 is attached to the ink tanks 31, the connecting tubes 49 of the ink tanks 31 are exposed through the respective slot portions 54 of the adapter 35. Note that the ink injection portion 33 shown in FIG. 1 collectively refers to the slot portion 54 of the adapter 35 and the constituent elements in the slot portion 54 (including the connecting tube 49) in a state in which the adapter 35 is attached to the ink tank 31.

Figure 4:
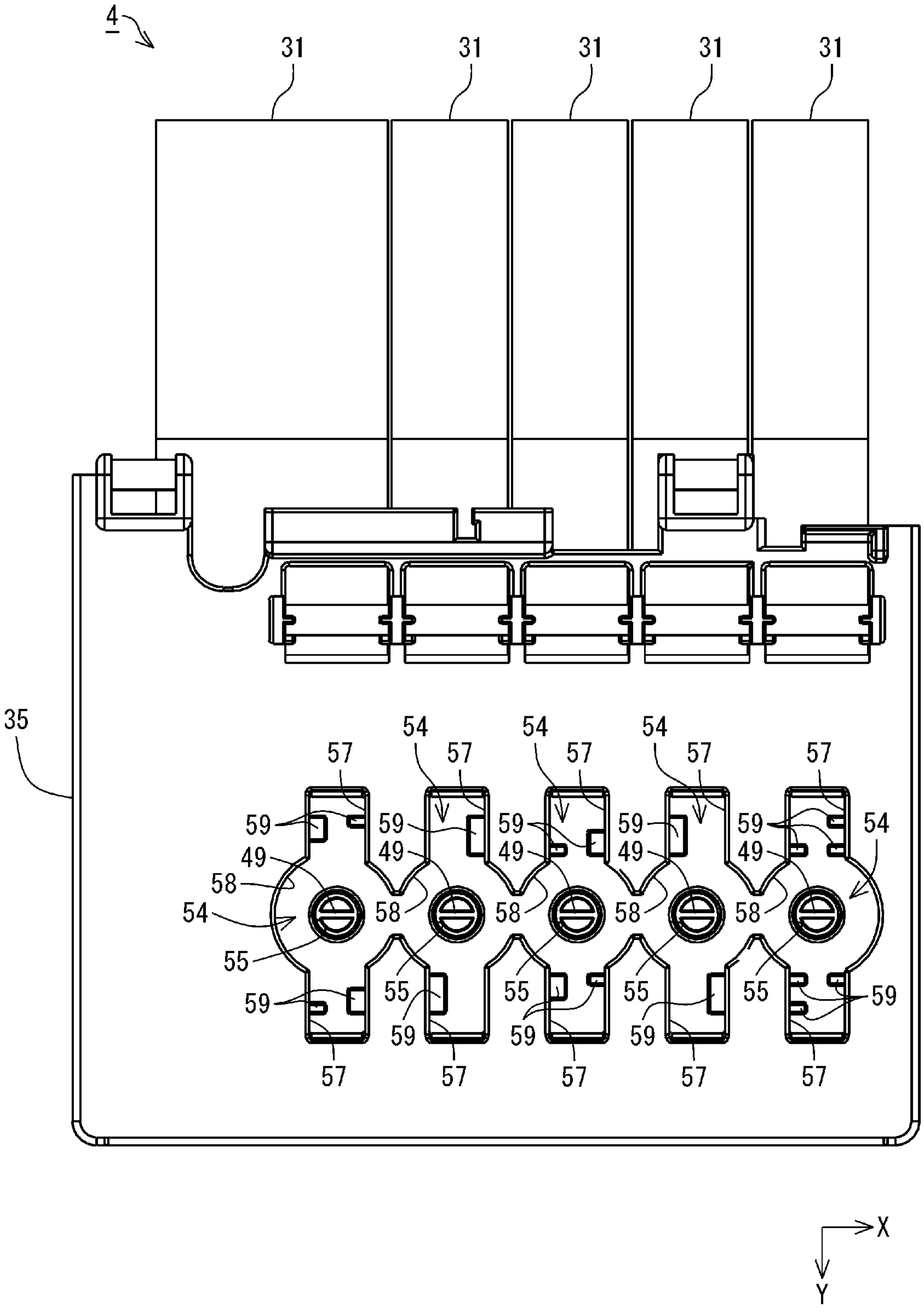
FIG. 4 is a plan view illustrating an ink tank and an adapter according to the present embodiment.

Each slot portion 54 has an appearance in which rectangular portions 57 each having a rectangular shape extending along the Y axis and a circular portion 58 that has a circular shape that is located at the middle of the two rectangular portions 57 in the Y axis are overlaid, as shown in FIG. 4. The through hole 55 is formed at the bottom of the circular portion 58. Note that, in the present embodiment, the circular portions 58 of the two slot portions 54 that are adjacent along the X axis are connected to each other. The connecting tubes 49 of the ink tanks 31 are each arranged at a position so as to be overlapped with the through hole 55 of the circular portion 58.

An inner wall, of the inner walls of each rectangular portion 57, that extends along the YZ plane is provided with a first protruding portion 59. In each of the slot portions 54, the first protruding portion 59 is provided in each of the rectangular portions 57 that oppose each other with the circular portion 58 being interposed therebetween. In one slot portion 54, the first protruding portions 59 are arranged at positions that are symmetrical with respect to a central point of the connecting tube 49. According to the configuration described above, the slot portion 54 has a structure that is symmetrical with respect to the central point of the connecting tube 49. In the plurality of slot portions 54 provided in the adapter 35, the configuration of the first protruding portions 59 is different from each other. Therefore, the plurality of slot portions 54 provided in the adapter 35 have structures that are different from each other.

On the other hand, a later-described ink bottle 62 is provided with recessed portions that correspond to the first protruding portions 59 of the slot portion 54 to which the ink bottle 62 is compatible, according to the types of the plurality of slot portions 54 provided in the adapter 35. Accordingly, the types of the ink bottles 62 that are respectively compatible to the plurality of slot portions 54 provided in the adapter 35 can be defined. That is, the plurality of slot portions 54 provided in the adapter 35 can be expressed as functioning as keyholes that have structures different from each other. Also, the ink bottles 62 that are respectively compatible to the plurality of slot portions 54 provided in the adapter 35 can be expressed as functioning as keys that are respectively adaptable to the keyholes. That is, ink can be injected into an ink tank 31 from the ink bottle 62 that is adaptable to the keyhole via the connecting tube 49. To the contrary, ink cannot be injected into an ink tank 31 from an ink bottle 62 that is not adaptable to the keyhole.

Figure 5:
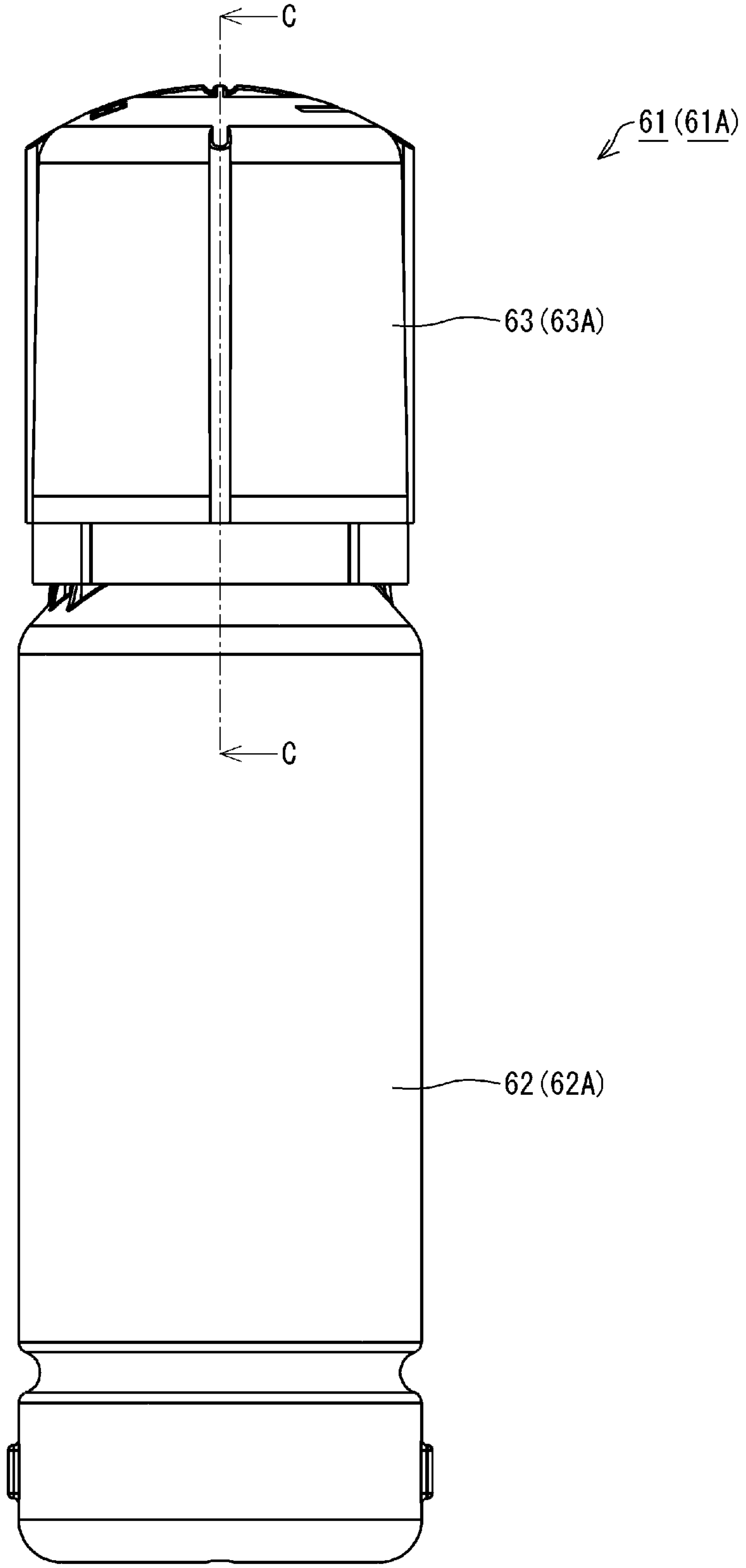
FIG. 5 is an external view illustrating a bottle set according to the present embodiment.

In the present embodiment, the bottle set 61 shown in FIG. 5 can be utilized for injecting ink into the ink tank 31. The ink to be supplied to the ink tank 31 described above is contained in the bottle set 61. Various examples of the members (hereinafter referred to as constituent members) that constitute the bottle set 61 and the bottle set 61 will be described. Note that when the bottle set 61 and the constituent members are identified in the respective examples below, different letters, signs, and the like are appended to reference signs for the bottle set 61 and the constituent members in each example.

Example 1

Figure 6:
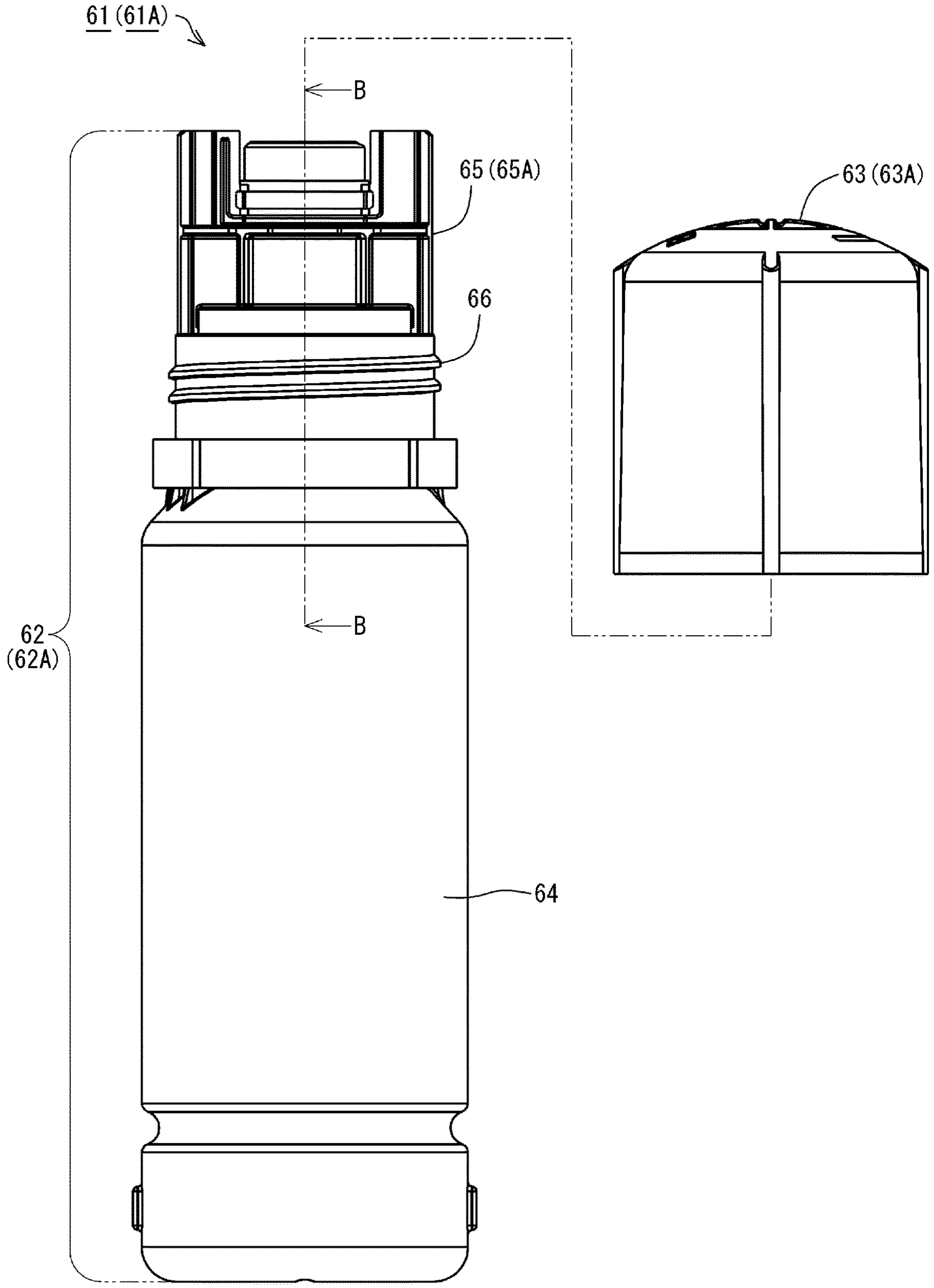
FIG. 6 is an exploded view illustrating the bottle set according to the present embodiment.

A bottle set 61A of Example 1 includes the ink bottle 62 and a lid member 63. In Example 1, the ink bottle 62 may be denoted as an ink bottle 62A, and the lid member 63 may be denoted as a lid member 63A. The lid member 63 is configured to be attachable to and detachable from the ink bottle 62, as shown in FIG. 6. The ink bottle 62 includes an ink container portion 64 and an ink outlet forming portion 65, which is an example of a guiding portion and a nozzle portion. The ink container portion 64 is a portion that can contain ink. The ink outlet forming portion 65 is a portion from which the ink in the ink container portion 64 can flow out of the ink bottle 62.

The lid member 63, when in a state of being attached to the ink bottle 62, is configured to be able to cover a portion of the ink outlet forming portion 65. A later-described ink outlet 95 is formed in the ink outlet forming portion 65. The ink in the ink container portion 64 flows out of the ink bottle 62 from the ink outlet 95 of the ink outlet forming portion 65. The lid member 63, when in a state of being attached to the ink bottle 62, is configured to be able to cover the ink outlet 95 of the ink outlet forming portion 65. Note that the state (FIG. 5) in which the lid member 63 is attached to the ink bottle 62 in the bottle set 61 is referred to as a covered state. The covered state is a state in which the lid member 63 is attached to the ink bottle 62 and the ink outlet 95 is covered by the lid member 63.

Note that the lid member 63 can be engaged with the ink outlet forming portion 65 using a thread 66 formed in the ink outlet forming portion 65, as shown in FIG. 6. That is, in the present embodiment, the lid member 63 is configured to be attachable to the ink bottle 62 through the engagement using the thread 66. Note that a thread (unshown) that can engage with the thread 66 of the ink outlet forming portion 65 is formed in the lid member 63. As a result of the thread of the lid member 63 engaging with the thread 66 of the ink outlet forming portion 65, the lid member 63 is attached to the ink bottle 62.

Figure 7:
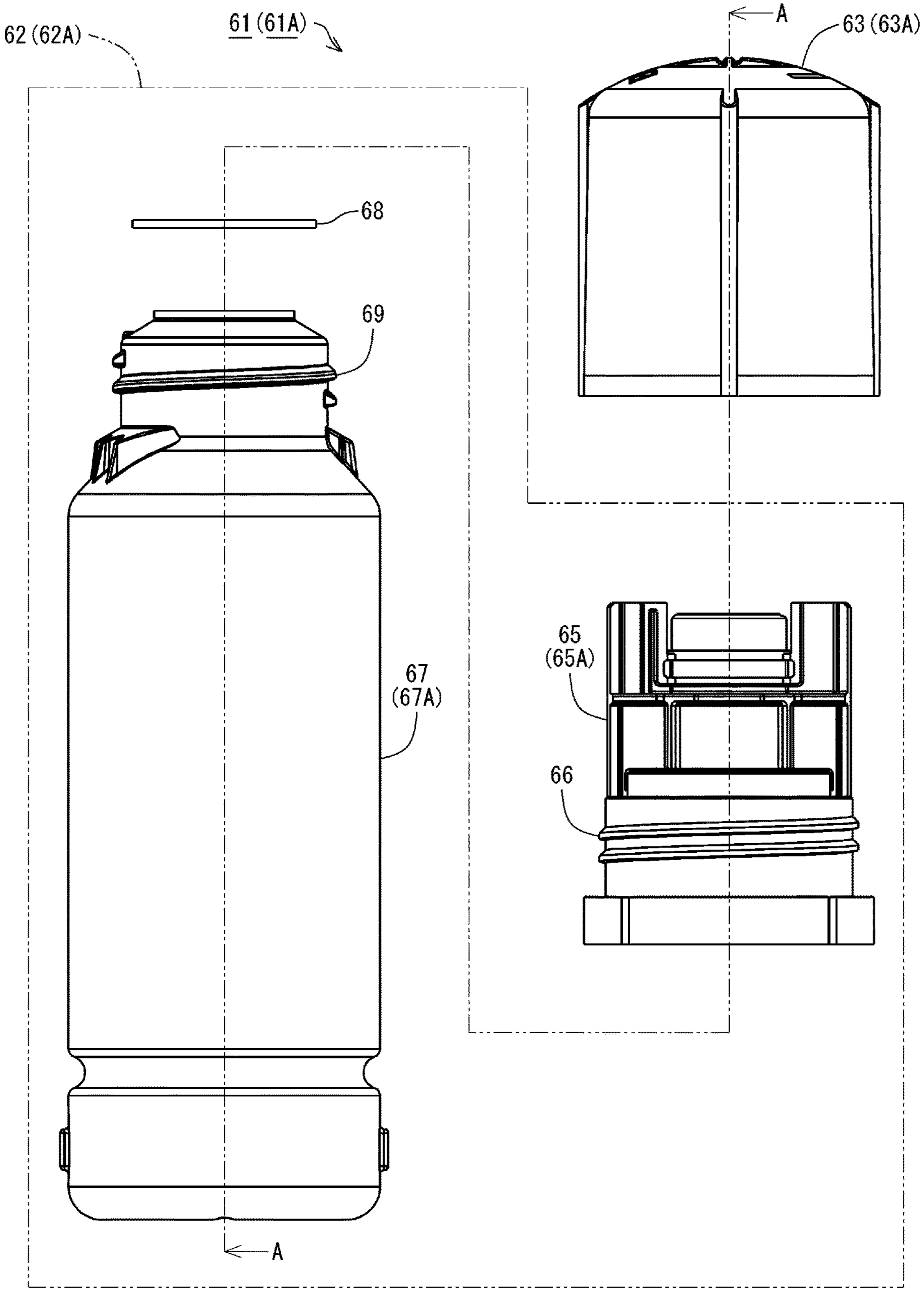
FIG. 7 is an exploded view illustrating a bottle according to the present embodiment.

In the present embodiment, the ink bottle 62 includes a container body portion 67, which is an example of a container portion, a seal member 68, and the ink outlet forming portion 65, as shown in FIG. 7. The ink outlet forming portion 65 is provided in an end portion of the container body portion 67. In the present embodiment, the outer shell of the ink bottle 62 is constituted by combining the container body portion 67 and the ink outlet forming portion 65. The seal member 68 is interposed between the container body portion 67 and the ink outlet forming portion 65. The container body portion 67 and the ink outlet forming portion

65 are combined to form one ink bottle 62 through the engagement using the thread 69, with the seal member 68 being interposed therebetween. Note that a thread (described later) that can engage with the thread 69 of the container body portion 67 is formed in the ink outlet forming portion 65. As a result of the thread of the ink outlet forming portion 65 engaging with the thread 69 of the container body portion 67, the container body portion 67 and the ink outlet forming portion 65 are combined to form one ink bottle 62.

Figure 8:
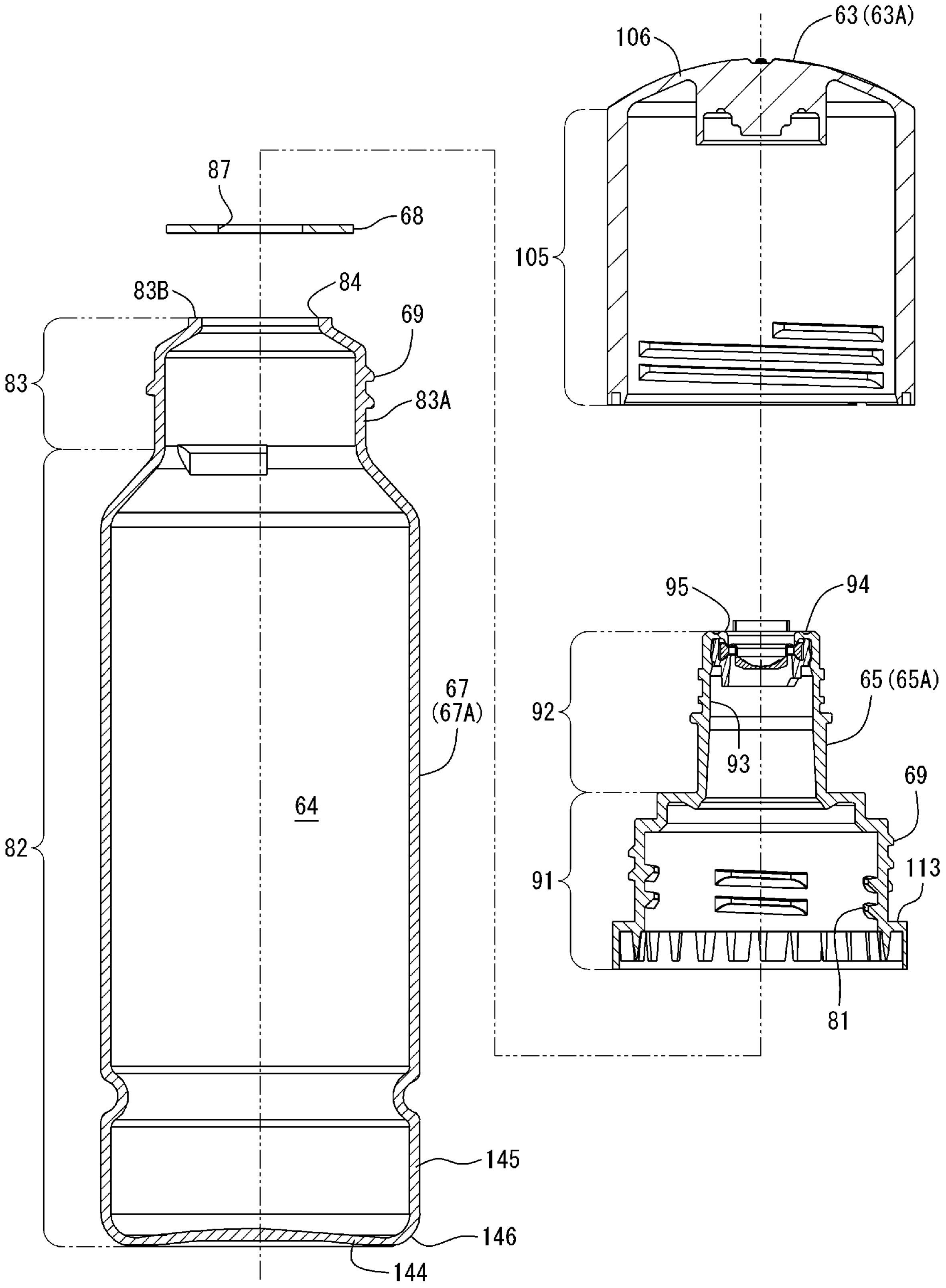
FIG. 8 is a cross-sectional view taken along line A-A in FIG. 7.

The container body portion 67 is formed to have a container shape, as shown in FIG. 8, which is a cross-sectional view taken along line A-A in FIG. 7, and is configured to be able to contain ink. The container body portion 67 and the ink outlet forming portion 65 are configured as separate bodies. A thread 81 is formed in the ink outlet forming portion 65. The container body portion 67 and the ink outlet forming portion 65 are configured to be engageable with each other using the thread 69 of the container body portion 67 and the thread 81 of the ink outlet forming portion 65. Also, the container body portion 67 and the ink outlet forming portion 65 are configured to be attachable to and detachable from each other. By twisting (turning) the ink outlet forming portion 65 relative to the container body portion 67, the ink outlet forming portion 65 can be removed from the container body portion 67.

Ink is contained in the container body portion 67. In the present embodiment, the container body portion 67 is made of an elastic material. The container body portion 67 includes a tubular barrel portion 82, a tubular engaging portion 83, and an opening portion 84. The material of the container body portion 67 may be a resin material such as polyethylene terephthalate (PET), nylon, polyethylene, polypropylene, or polystyrene, or a metal material such as an iron material or aluminum, for example. The barrel portion 82 and the engaging portion 83 are integrally formed. The barrel portion 82 is located on the side of the engaging portion 83 opposite to the seal member 68 side. The engaging portion 83 is located on the seal member 68 side of the barrel portion 82. The engaging portion 83 is formed to be narrower than the barrel portion 82. The thread 69 is formed in an outer side portion 83A of the engaging portion 83. The thread 69 is provided so as to project from the side portion 83A. The opening portion 84 is in communication with the ink container portion 64 in the container body portion 67, and is formed in an end portion 83B on the side of the engaging portion 83 opposite to the barrel portion 82 side. The opening portion 84 is open toward the seal member 68 side.

According to the configuration described above, the container body portion 67 includes the barrel portion 82 and the engaging portion 83, and is formed in a hollow container shape. The ink bottle 62 can contain ink of an amount corresponding to the sum of the capacities of the barrel portion 82 and the engaging portion 83. In the ink bottle 62, the combined internal space of the barrel portion 82 and the engaging portion 83 of the container body portion 67 constitutes the ink container portion 64.

An opening portion 87 is formed in the seal member 68. The ink in the container body portion 67 can flow out to the ink outlet forming portion 65 through the opening portion 87 of the seal member 68. According to this configuration, since the seal member 68 is interposed between the end portion 83B of the container body portion 67 and the ink outlet forming portion 65, the leakage of ink through the gap between the container body portion 67 and the ink outlet forming portion 65 can be suppressed. Various materials can be adopted as the material of the seal member 68 such as a foaming material of polyethylene, an elastic material such as rubber or elastomer, or the like, for example.

The ink outlet forming portion 65 includes a joint portion 91 and a tubular portion 92, as shown in FIG. 8. The joint portion 91 and the tubular portion 92 are integrally formed. The material of the ink outlet forming portion 65 may be resin such as polyethylene terephthalate (PET), nylon, polyethylene, polypropylene, or polystyrene, for example. The joint portion 91 has a tubular appearance. A thread 81 is provided on an inner surface of the joint portion 91. The joint portion 91 is a part to be engaged with the container body portion 67 using the thread 81. The inner diameter of the joint portion 91 is configured to be larger than the outer diameter of the engaging portion 83 of the container body portion 67. The thread 81 is formed on the inside of the joint portion 91, and the thread 69 is formed on the outside of the engaging portion 83 of the container body portion 67. As a result of the thread 81 provided on the inside of the joint portion 91 engaging with the thread 69 provided on the outside of the engaging portion 83, the ink outlet forming portion 65 and the container body portion 67 engage with each other. In a state in which the ink outlet forming portion 65 and the container body portion 67 engage with each other, the joint portion 91 of the ink outlet forming portion 65 covers the engaging portion 83 of the container body portion 67.

Figure 9:
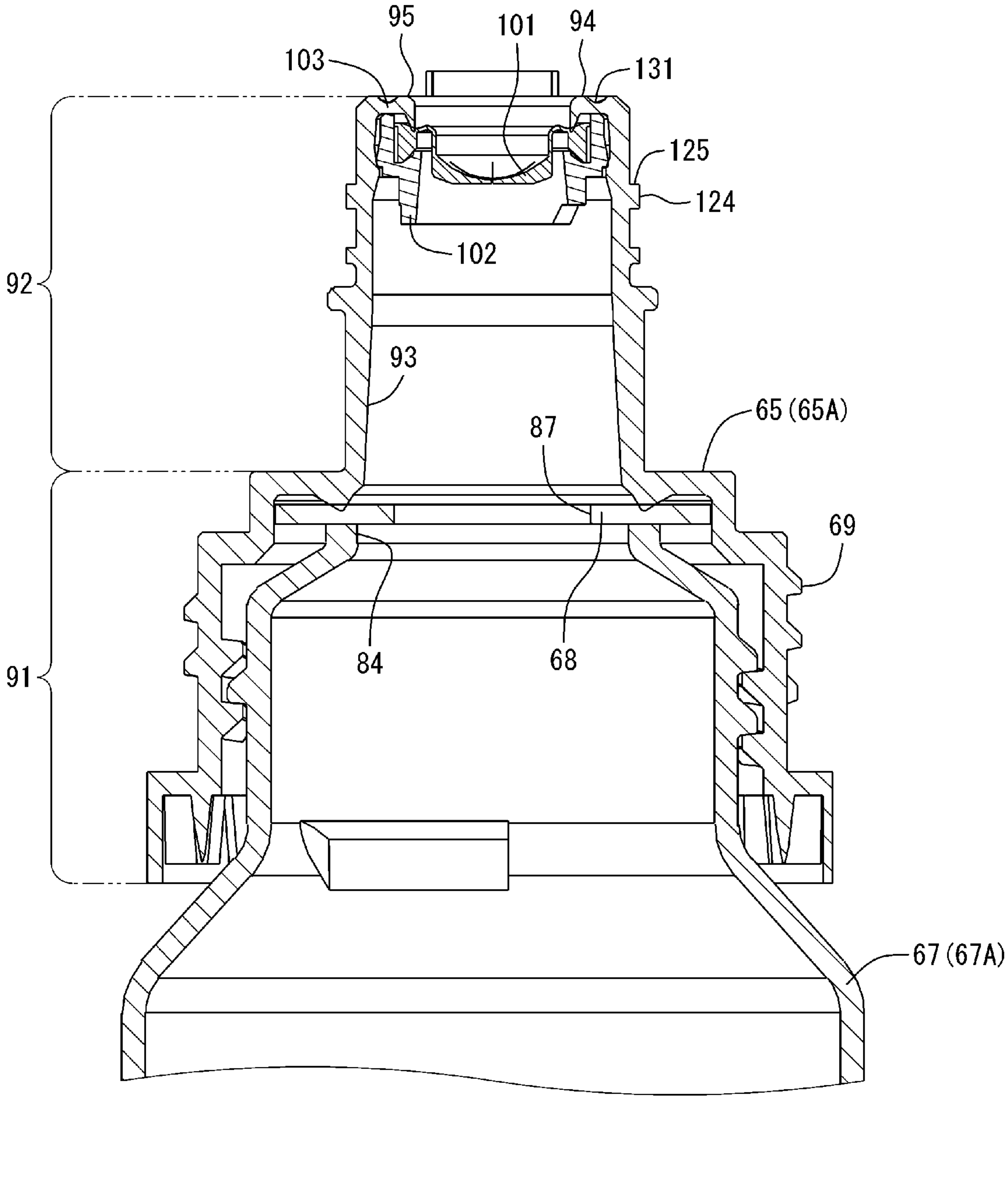
FIG. 9 is a cross-sectional view taken along line B-B in FIG. 6.

The tubular portion 92 protrudes from the joint portion 91 to the side opposite to the container body portion 67 side, as shown in FIG. 9, which is a cross-sectional view taken along line B-B in FIG. 6. The tubular portion 92 has a tubular shape. A guiding flow passage 93 is formed inside the tubular portion 92. The guiding flow passage 93 is provided in a region that overlaps the region of the opening portion 84 when the ink outlet forming portion 65 is seen in plan view from the opening portion 84 side toward the tubular portion 92 side. The guiding flow passage 93 is a hollow region, in the tubular portion 92, that overlaps the region of the opening portion 84 when seen in plan view.

An ink outlet 95 from which the ink from the container body portion 67 can flow out is provided in an end surface 94 of the tubular portion 92 on the side opposite to the joint portion 91 side. The ink outlet 95 is an example of an outflow port. The end surface 94 faces a side opposite to the container body portion 67 side. The ink outlet 95 is open toward a side opposite to the joint portion 91 side of the tubular portion 92. The ink outlet 95 is open in the end surface 94. Therefore, the end surface 94 surrounds the ink outlet 95. The ink outlet 95 is located at a terminal of the guiding flow passage 93. In other words, the guiding flow passage 93 guides the ink in the container body portion 67 to the ink outlet 95.

The ink contained in the container body portion 67 can flow out from the ink outlet 95 via the guiding flow passage 93 of the tubular portion 92. As a result, the ink in the container body portion 67 can flow out of the container body portion 67 from the ink outlet 95 through the opening portion 84 and the guiding flow passage 93. When a user injects the ink in the ink bottle 62 into the corresponding ink tank 31, the ink outlet 95 is inserted into the ink injection portion 33 of the ink tank 31. The user then injects the ink in the container body portion 67 into the ink tank 31 from the ink injection portion 33. Note that, when the user injects the ink in the ink bottle 62 into the ink tank 31, the user removes the lid member 63 (FIG. 7) from the ink bottle 62 and thereafter performs the injecting operation.

The ink outlet forming portion 65 is provided with a valve 101 and a holder 102, as shown in FIG. 9. The valve 101 seals the ink outlet 95 such that the ink outlet 95 is openable and closable. In the ink outlet forming portion 65, the valve 101 is provided in the guiding flow passage 93, and seals the ink outlet 95 such that the ink outlet 95 is openable and closable inside the guiding flow passage 93. In other words, the valve 101 blocks the guiding flow passage 93 such that the guiding flow passage 93 is openable and closable. The valve 101 is made of an elastic material such as rubber or elastomer, and seals the ink outlet 95 in a state in which an external force is not acted thereon. When the connecting tube 49 of the ink tank 31 is inserted into the ink outlet 95, and a pressing force acts on the valve 101 due to the connecting tube 49, the valve 101 opens. When the connecting tube 49 is removed from the ink outlet 95, and the external force acting on the valve 101 is released, the valve 101 closes.

Figure 10:
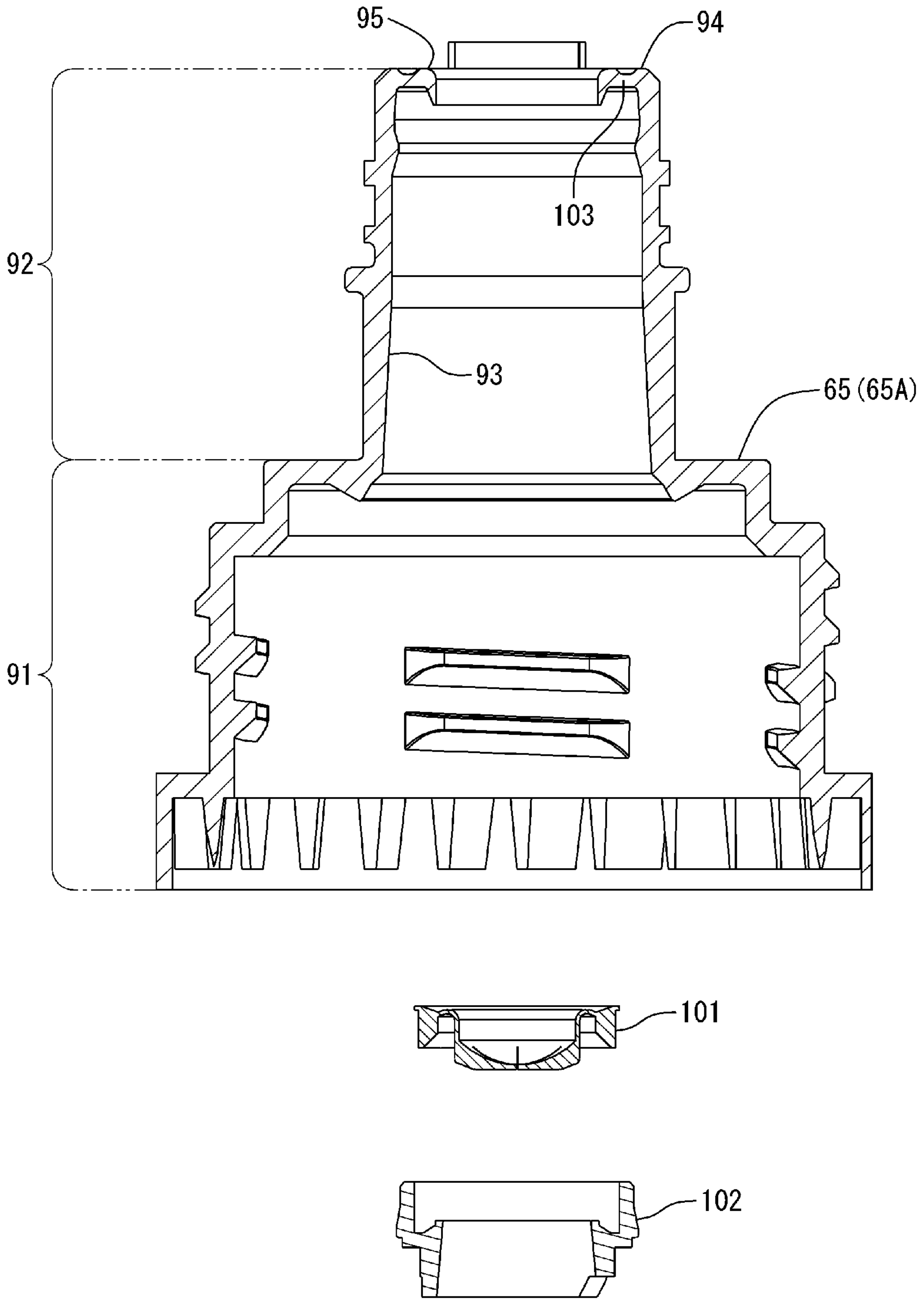
FIG. 10 is an exploded cross-sectional view illustrating an ink outlet forming portion, a valve, and a holder according to the present embodiment.

The valve 101 and the holder 102 are configured to be separable from the ink outlet forming portion 65, as shown in FIG. 10. That is, the ink outlet forming portion 65, the valve 101, and the holder 102 are configured as separate bodies to each other. The valve 101 is inserted into the guiding flow passage 93 from the joint portion 91 side of the ink outlet forming portion 65. The holder 102 is a member for restricting the valve 101 from falling out, and is provided on the joint portion 91 side of the valve 101, as shown in FIG. 9. The holder 102 is also inserted into the guiding flow passage 93 from the joint portion 91 side of the ink outlet forming portion 65. The valve 101 is sandwiched between the holder 102 and a flange portion 103 of the ink outlet forming portion 65. Accordingly, the ink outlet forming portion 65, the valve 101, and the holder 102 are integrally assembled. Note that the flange portion 103 is a wall that extends from an inside surface of the tubular portion 92 in an inner diameter direction of the tubular portion 92. The surface of the flange portion 103 opposite to the joint portion 91 side corresponds to the end surface 94.

Figure 11:
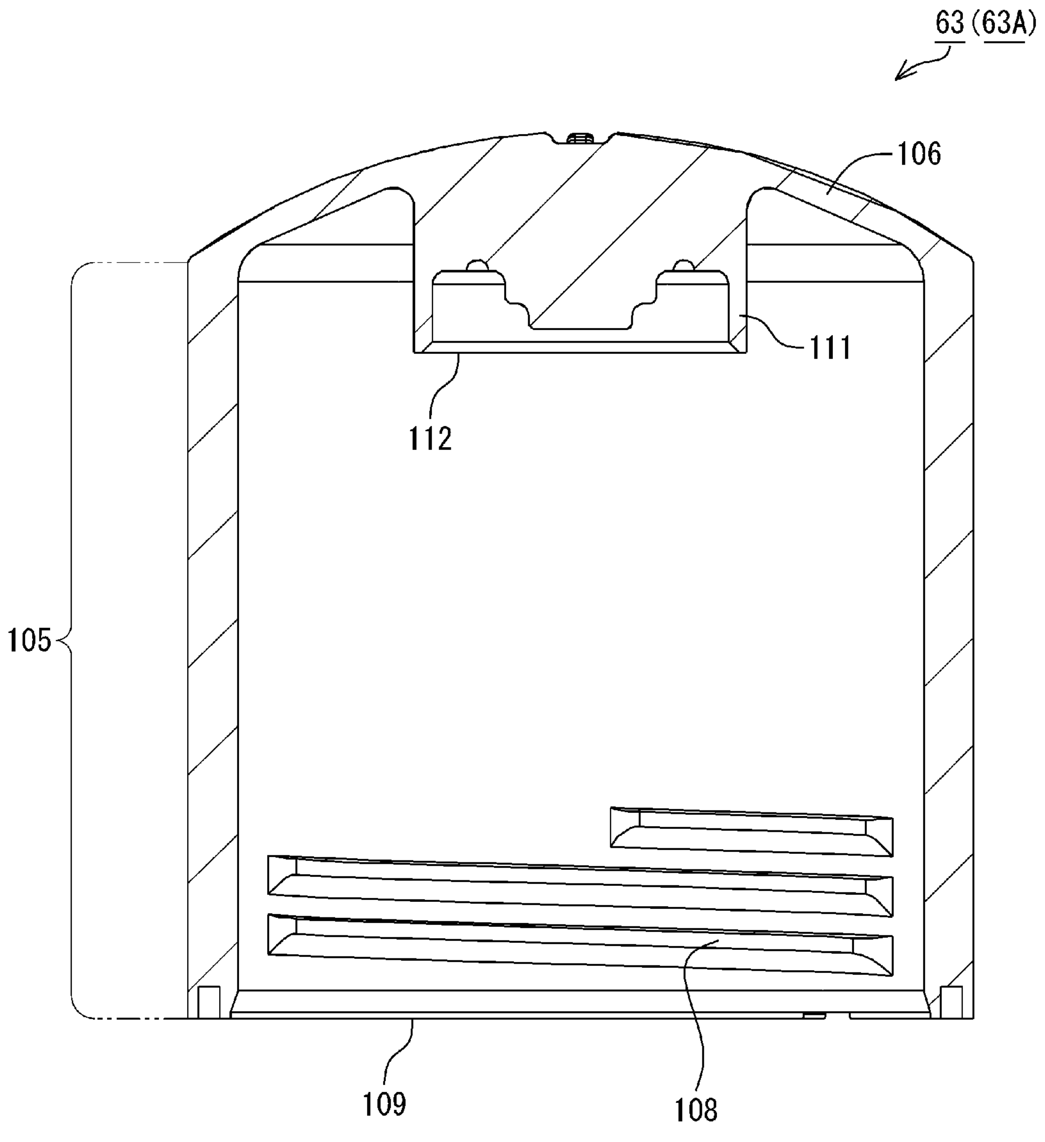
FIG. 11 is an enlarged view of a lid member in FIG. 8.

The lid member 63 is made of an elastic member, and can be divided into a tubular barrel portion 105 and a top plate portion 106, as shown in FIG. 11, which is an enlarged view of the lid member 63 in FIG. 8. The material of the lid member 63 may be a resin such as polyethylene terephthalate (PET), nylon, polyethylene, polypropylene, or polystyrene, for example. In this example, the lid member 63 is formed through injection molding using a resin material.

The barrel portion 105 and the top plate portion 106 are integrally formed. In the bottle set 61, the barrel portion 105 of the lid member 63 is located on the ink outlet forming portion 65 side, as shown in FIG. 8. The top plate portion 106 is located in one end portion of the barrel portion 105, as shown in FIG. 11. In the present example, the top plate portion 106 is located on the side opposite to the ink outlet forming portion 65 side of the barrel portion 105. The tubular barrel portion 105 protrudes from the top plate portion 106 toward the ink container portion 64 (FIG. 8) side. The top plate portion 106 closes the one end of the tubular barrel portion 105. That is, the portion that closes the one end of the tubular barrel portion 105 is the top plate portion 106. An opening may be formed in the top plate portion 106. Even if an opening is provided, since the top plate portion 106 extends in a direction intersecting the tubular barrel portion 105, the top plate portion 106 can be expressed as closing the one end of the tubular barrel portion 105.

Also, in the example shown in FIG. 11, the top plate portion 106 is configured as a curved plate shape. However, various plates such as a flat plate, an uneven plate, and a corrugated plate can be adopted as the top plate portion 106. Also, the shape of the top plate portion 106 is not limited to a plate, and various shapes such as a sphere, a column, and a cone can be adopted. Regardless of the shape, the portion that closes one end of the tubular barrel portion 105 corresponds to the top plate portion 106.

A thread 108 is provided on an inner surface of the barrel portion 105. The barrel portion 105 is a part to be engaged with the ink outlet forming portion 65 (FIG. 9) using the thread 108. The thread 108 is provided at a position, in the barrel portion 105, that is closer to an end portion 109 than to the top plate portion 106. The thread 108 is formed on the inside of the barrel portion 105, and the thread 69 is formed on the outside of the joint portion 91 of the ink outlet forming portion 65. As a result of the thread 108 provided on the inside of the barrel portion 105 engaging with the thread 69 provided on the outside of the joint portion 91 of the ink outlet forming portion 65, the lid member 63 and the ink outlet forming portion 65 engage with each other. In a state in which the lid member 63 and the ink outlet forming portion 65 engage with each other, the lid member 63 covers the tubular portion 92 of the ink outlet forming portion 65. That is, the state in which the lid member 63 and the ink outlet forming portion 65 engage with each other is the covered state.

Here, a plug portion 111 is provided in the top plate portion 106 of the lid member 63, as shown in FIG. 11. The plug portion 111 is provided on the ink outlet forming portion 65 (FIG. 8) side of the top plate portion 106, that is, on the end portion 109 side of the top plate portion 106. The plug portion 111 protrudes from the top plate portion 106 toward the end portion 109 side. The plug portion 111 is provided in a central region of the top plate portion 106. The plug portion 111 is provided in a position so as to face (oppose) the ink outlet 95 of the tubular portion 92 when the lid member 63 is attached to the ink bottle 62. The plug portion 111 has a tubular external appearance.

Figure 12:
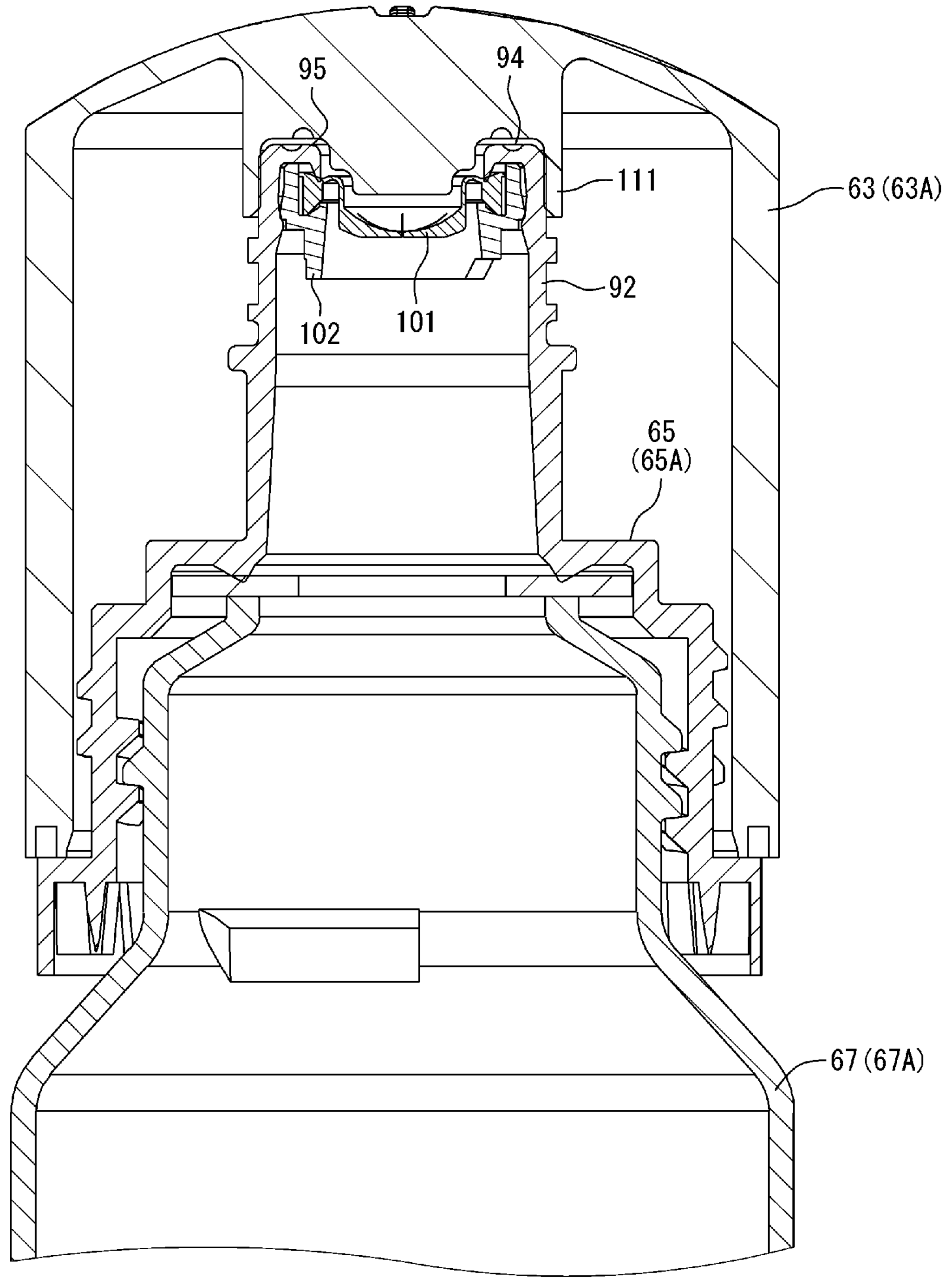
FIG. 12 is a cross-sectional view taken along line C-C in FIG. 5.

In the present example, as shown in FIG. 11, the distance (depth) from the end portion 109 of the barrel portion 105 to an end portion 112 of the plug portion 111 is shorter (shallower) than the distance from an end portion 113 of the joint portion 91 of the ink outlet forming portion 65 (FIG. 8) to the end surface 94 of the tubular portion 92. That is, when the lid member 63 is attached to the ink bottle 62, the plug portion 111 covers the end surface 94 from the outside of the tubular portion 92, as shown in FIG. 12, which is a cross-sectional view taken along line C-C in FIG. 5. Here, the inner diameter of the tubular plug portion 111 is slightly smaller than the outer diameter of the end portion of the tubular portion 92 on the end surface 94 side. Therefore, when the lid member 63 is attached to the ink outlet forming portion 65, the ink outlet of the ink outlet forming portion 65 is sealed by the plug portion 111. That is, in a state in which the lid member 63 is attached to the ink bottle 62, the ink outlet 95 is sealed as a result of the plug portion 111 abutting against the tubular portion 92. Note that the setting is such that the lid member 63 is not in contact with an inner diameter portion of the ink outlet 95 at this time. Similarly, the setting is such that the lid member 63 is not in contact with the valve 101.

With this configuration, the ink outlet 95 can be sealed. Therefore, in the case where, for example, not all of the ink in the container body portion 67 can be injected into the ink tank 31 and some ink remains in the container body portion 67, the ink can be stored in the ink bottle 62 with the ink outlet 95 being closed by the lid member 63. This configuration allows the ink to be stored with an increased airtightness in the container body portion 67 after being opened. As a result, it is possible to suppress the evaporation of liquid components of the ink in the ink bottle 62 and the degradation of the ink.

Here, in Example 1, at least one of the ink outlet forming portion and the lid member 63A is made of polypropylene. As described above, the inner diameter of the tubular plug portion 111 is slightly smaller than the outer diameter of the end portion of the tubular portion 92 on the end surface 94 side. Therefore, when the lid member 63A is attached to the ink outlet forming portion 65A, the end surface 94 of the tubular portion 92 of the ink outlet forming portion 65A is press-fitted into the tubular plug portion 111. Accordingly, the ink outlet 95 of the ink outlet forming portion 65A can be easily sealed by the plug portion 111. When the end surface 94 of the tubular portion 92 of the ink outlet forming portion 65A is press-fitted into the inside of the tubular plug portion 111, stress is generated in the tubular portion 92 of the ink outlet forming portion 65A and the tubular plug portion 111. Therefore, distortion (deformation) is likely to occur in the tubular portion 92 of the ink outlet forming portion 65A and the plug portion 111 of the lid member 63A.

When ink comes into contact with the lid member 63A or the ink outlet forming portion 65A in a state in which stress occurs in the lid member 63A or the ink outlet forming portion 65A, it is conceivable that deformation and a reduction in toughness of the material will occur. Polypropylene is a material in which deformation and a reduction in toughness are unlikely to occur. In the bottle set 61A in Example 1, at least one of the ink outlet forming portion 65A and the lid member 63A is made of polypropylene, and deformation and a reduction in toughness are unlikely to occur in at least one of the ink outlet forming portion 65A and the lid member 63A. Accordingly, the sealed state of the ink outlet 95 can be easily maintained, and the convenience of the bottle set 61A can be easily improved. Note that, in Example 1, any of an example in which only the ink outlet forming portion 65A is made of polypropylene, an example in which only the lid member 63A is made of polypropylene, out of the ink outlet forming portion 65A and the lid member 63A, and an example in which both the ink outlet forming portion 65A and the lid member 63A are made of polypropylene can be adopted.

Also, in the ink bottle 62, the valve 101 that seals the ink outlet 95 is provided such that the ink outlet 95 is openable and closable in the ink outlet forming portion 65, as described above. Therefore, even if the ink bottle 62 is tilted downward with the ink outlet 95 being oriented downward, in a state in which the lid member 63 is removed from the ink bottle 62, for example, the leaking out of ink in the container body portion 67 from the ink outlet 95 can be easily suppressed by the valve 101. Also, even if the ink bottle 62 swings when the ink bottle 62 is carried in a state in which the lid member 63 is removed from the ink bottle 62, for example, the leaking out of ink in the container body portion 67 from the ink outlet 95 can be easily suppressed by the valve 101.

Figure 13:
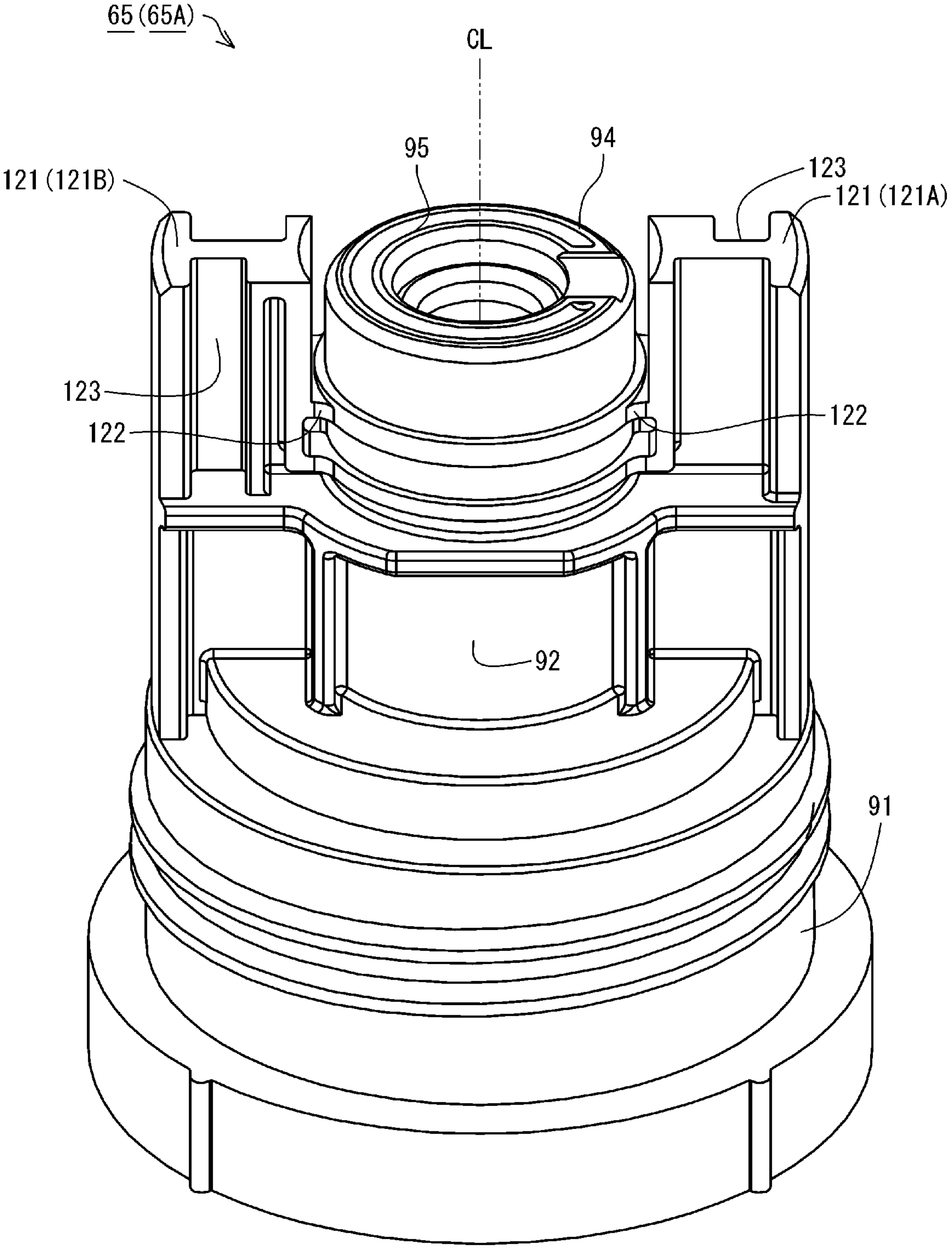
FIG. 13 is a perspective view illustrating an ink outlet forming portion according to the present embodiment.

A plurality of (two in the present embodiment) positioning portions 121 are provided in the ink outlet forming portion 65, as shown in FIG. 13. In the following, when individually identifying the two positioning portions 121, the two positioning portions 121 will be respectively denoted as a positioning portion 121A and a positioning portion 121B. When the ink outlet forming portion 65 is seen in plan view in the direction from the tubular portion 92 toward the joint portion 91, the positioning portion 121A and the positioning portion 121B are located outside the tubular portion 92.

In the ink outlet forming portion 65, the positioning portion 121A and the positioning portion 121B are provided in the joint portion 91. When the ink outlet forming portion 65 is seen in plan view in the direction from the tubular portion 92 toward the joint portion 91, the positioning portion 121A and the positioning portion 121B are provided in positions facing each other across the tubular portion 92. The positioning portion 121A and the positioning portion 121B protrude from the joint portion 91 toward the end surface 94 side. The positioning portion 121A and the positioning portion 121B are each connected to the tubular portion 92 via the joint portion 122.

The positioning portion 121A and the positioning portion 121B are each provided with a third recessed portion 123. Each third recessed portion 123 engages with a first protruding portion 59 formed in the slot portion 54 in the adapter 35 of the ink supply device 4 (FIG. 4). If the first protruding portions 59 of the slot portion 54 respectively fitted to the third recessed portions 123 of the positioning portions 121, the ink outlet forming portion 65 can be inserted into the slot portion 54. As described above, in one slot portion 54, the first protruding portions 59 are arranged at positions that are symmetrical with respect to a central point of the connecting tube 49. Therefore, when the ink outlet forming portion 65 is seen in plan view in the direction from the tubular portion 92 toward the joint portion 91, the positioning portion 121A and the positioning portion 121B are arranged at positions that are symmetrical with respect to a central axis CL of the ink outlet 95. The positioning portion 121A and the positioning portion 121B are formed at equal intervals with an interval of a phase angle of 180° with respect to the central axis CL of the ink outlet 95. Note that the central axis CL is an axis that passes through the center of a region that is surrounded by the peripheral edge of the ink outlet 95 in a direction vertical to the region, when the ink outlet forming portion 65 is seen in plan view in the direction from the tubular portion 92 toward the joint portion 91.

Figure 14:
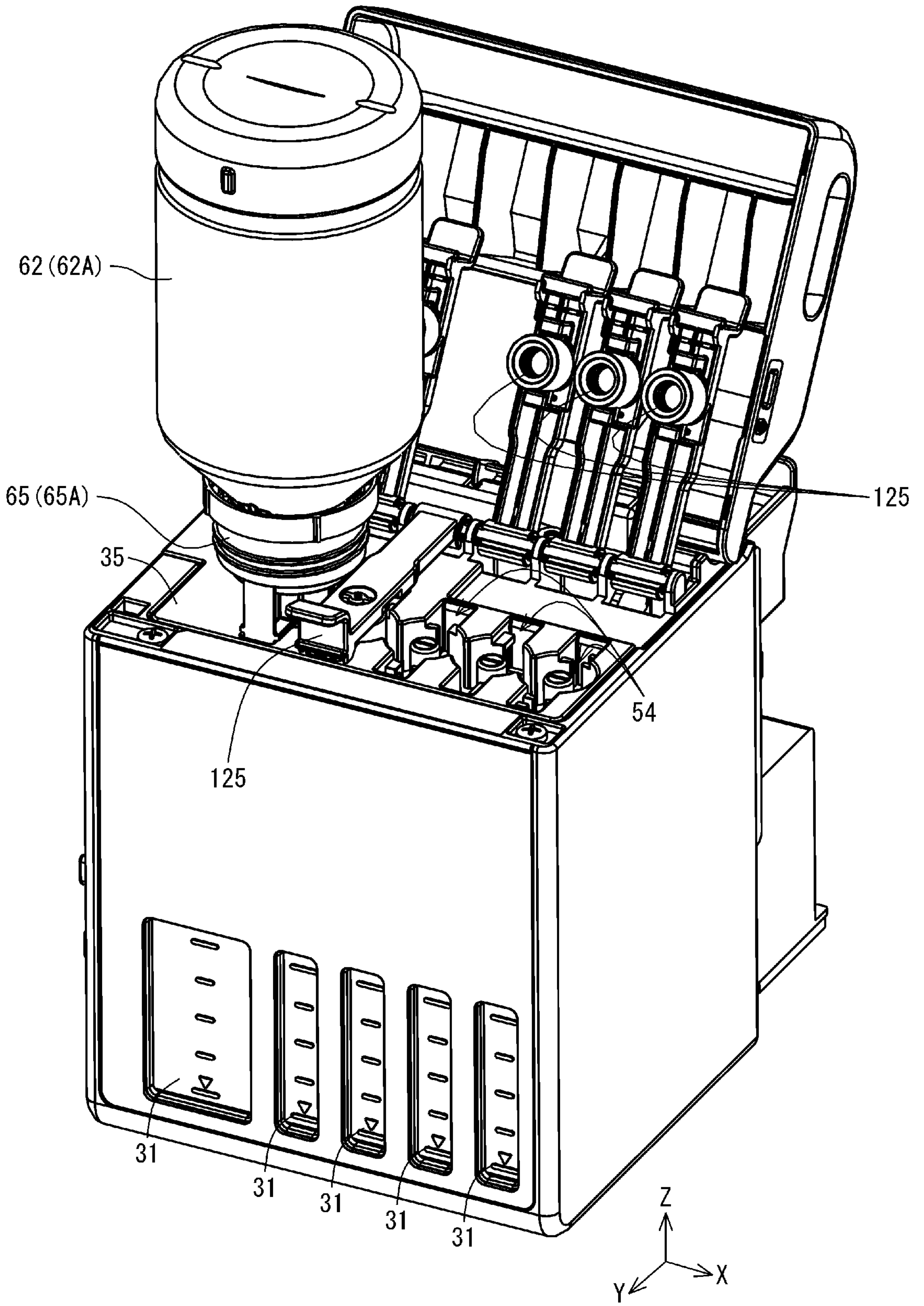
FIG. 14 is a perspective view illustrating an ink bottle and an ink supply device according to the present embodiment.
Figure 15:
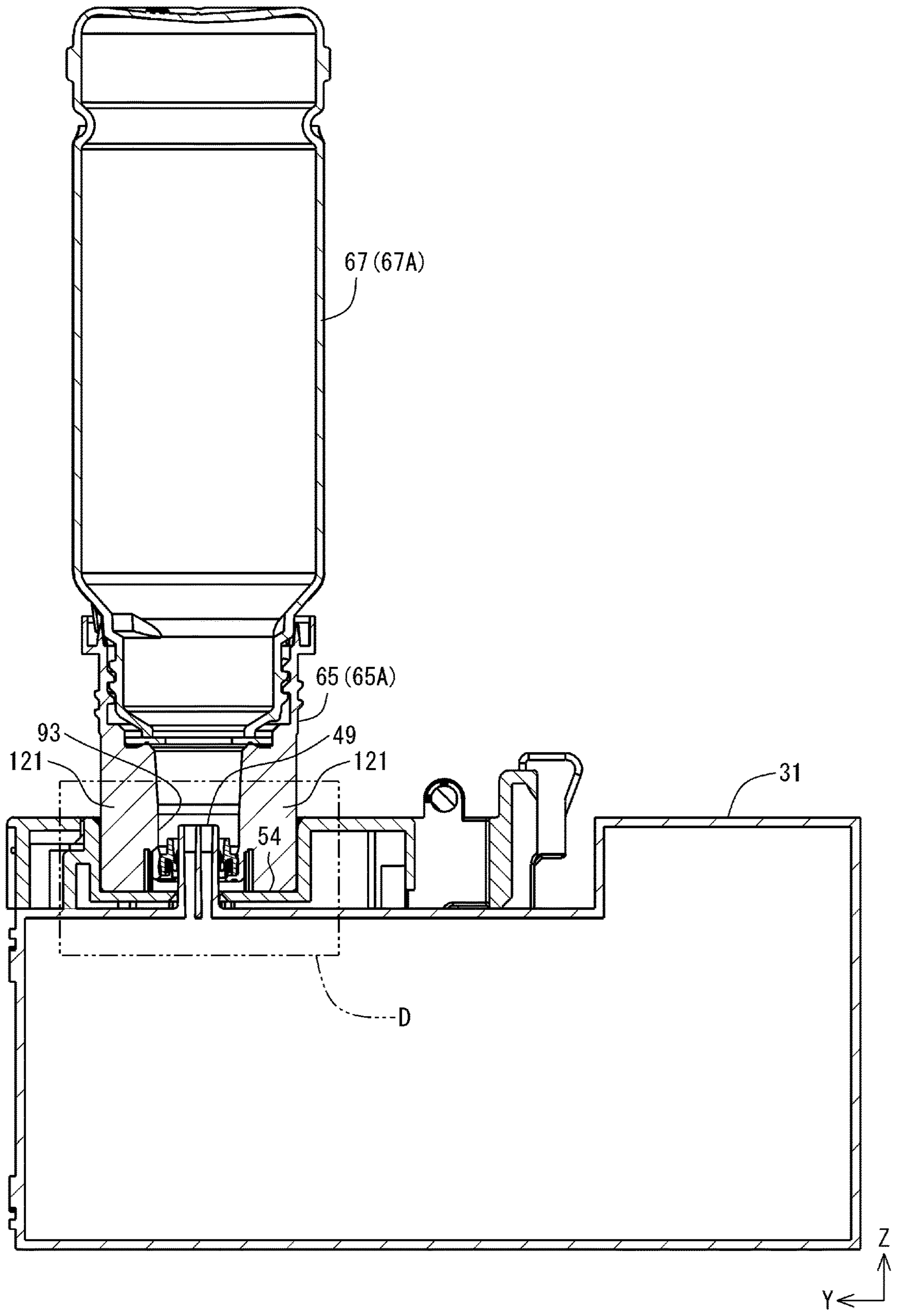
FIG. 15 is a cross-sectional view of the ink bottle and the ink supply device according to the present embodiment.
Figure 16:
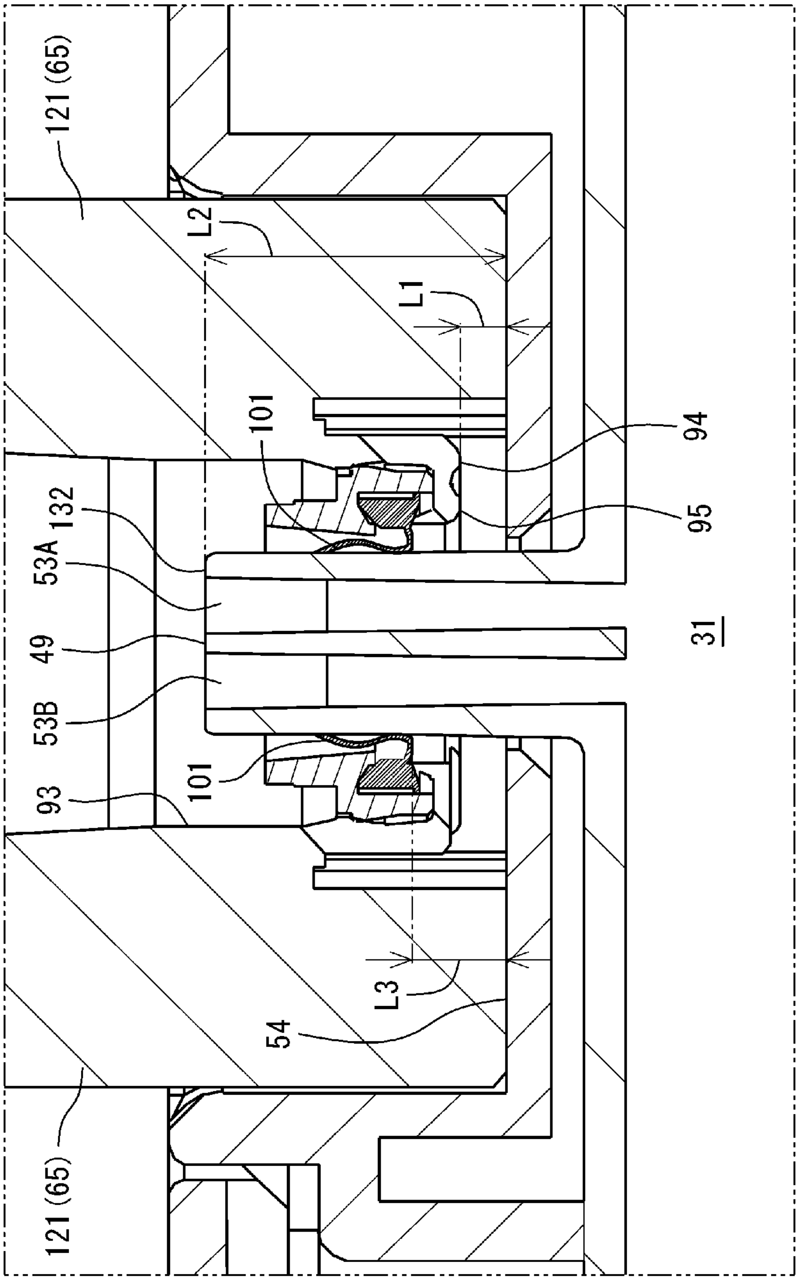
FIG. 16 is an enlarged view of a portion D in FIG. 15.

If the third recessed portions 123 of the positioning portions 121 are respectively fitted to the first protruding portions 59 of the slot portion 54 in the adapter 35 of the ink supply device 4 (FIG. 4), the ink outlet forming portion 65 of the ink bottle 62 can be inserted into the slot portion 54, as shown in FIG. 14. In the ink outlet forming portion 65, the size of the tubular portion 92 in a radial direction is smaller than that of the joint portion 91 (refer to FIG. 13). Accordingly, the tubular portion 92 of the ink outlet forming portion 65 evades a cap 125 that covers an adjacent slot portion 54, and the ink outlet forming portion 65 can be inserted into the slot portion 54. At this time, the connecting tube 49 of the ink tank 31 is inserted into the guiding flow passage 93 of the ink outlet forming portion 65, as shown in FIG. 15, which is a cross-sectional view. Note that a cross section, when cut along the YZ plane, of the ink tank 31 and the ink bottle 62 shown in FIG. 14 is shown in FIG. 15. At this time, the valve 101 is opened by the connecting tube 49 as shown in FIG. 16, which is an enlarged view of a portion D in FIG. 15.

In a state in which the positioning portions 121 of the ink outlet forming portion 65 abut against the bottom of the slot portion 54, the relationship between the distance L1 from the bottom of the slot portion 54 to the end surface 94 and the distance L2 from the bottom of the slot portion 54 to a leading end portion 132 of the connecting tube 49 is expressed by the following equation (1).

$$L1 < L2 \quad (1)$$

According to the relationship expressed by the above equation (1), the leading end portion 132 of the connecting tube 49 enters the inside of the guiding flow passage 93 through the ink outlet 95 in a state in which the ink outlet forming portion 65 abuts against the bottom of the slot portion 54. That is, the connecting tube 49 is connected to the ink outlet 95 in a state in which the ink outlet forming portion 65 abuts against the bottom of the slot portion 54. Therefore, in the ink tank 31, the connecting tube 49 is provided so as to be connectable to the ink outlet 95.

Here, the relationship between the distance L3 from the bottom of the slot portion 54 to the valve 101, the distance L1, and the distance L2 is expressed by the following equation (2).

$$L1<L3<L2 \tag{2}$$

According to the relationship expressed by the above equation (2), the valve 101 is opened by the connecting tube 49 in a state in which the positioning portions 121 of the ink outlet forming portion 65 abut against the bottom of the slot portion 54. According to the above relationship, the positioning portions 121 define the position of the valve 101 relative to the ink tank 31 when a state is entered in which the ink outlet 95 is connected to the connecting tube 49, and the valve 101 is opened.

Accordingly, the guiding flow passage 93 and the inside of the ink tank 31 are in communication with each other via the flow passage 53A and the flow passage 53B of the connecting tube 49. Therefore, the ink inside the ink bottle 62 can be injected into the ink tank 31 via the connecting tube 49. As described above, the inside of the connecting tube 49 is partitioned into two flow passages, namely the flow passage 53A and the flow passage 53B. Accordingly, the ink in the ink bottle 62 can flow into the ink tank 31 via one of the flow passage 53A and the flow passage 53B, and the air in the ink tank 31 can flow into the ink bottle 62 via the other of the flow passage 53A and the flow passage 53B. That is, the exchange between the ink in the ink bottle 62 and the air in the ink tank 31 (referred to as air/liquid exchange) can be smoothly promoted via the connecting tube 49 which is partitioned into the flow passage 53A and the flow passage 53B. As a result, according to the present embodiment, since the injection of ink from the ink bottle 62 to the ink tank 31 is smoothly performed, the convenience is improved.

Example 2

Figure 17:
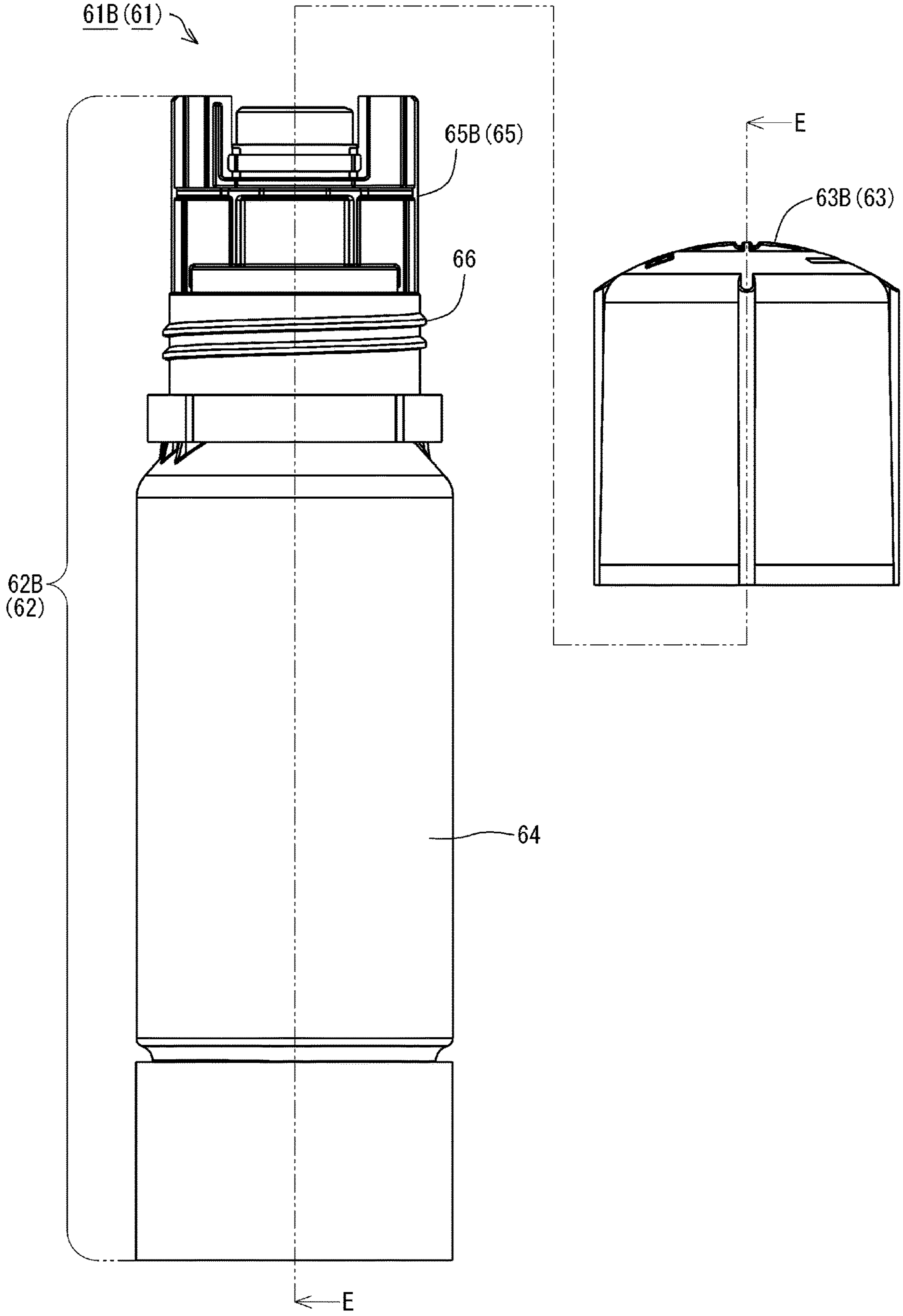
FIG. 17 is an exploded view illustrating a bottle set of Example 2.

A bottle set 61B of Example 2 will be described. Constituent parts in Example 2 that are the same as those in Example 1 will be assigned the same signs as those in Example 1, and a detailed description thereof will be omitted. The bottle set 61B of Example 2 includes an ink bottle 62B and a lid member 63B, as shown in FIG. 17. The material of the lid member 63B is not limited to polypropylene, and may be another synthetic resin. In this regard, the lid member 63B differs from the lid member 63A in Example 1. With the exception of the above point, the lid member 63B has a configuration similar to the lid member 63A in Example 1.

Figure 18:
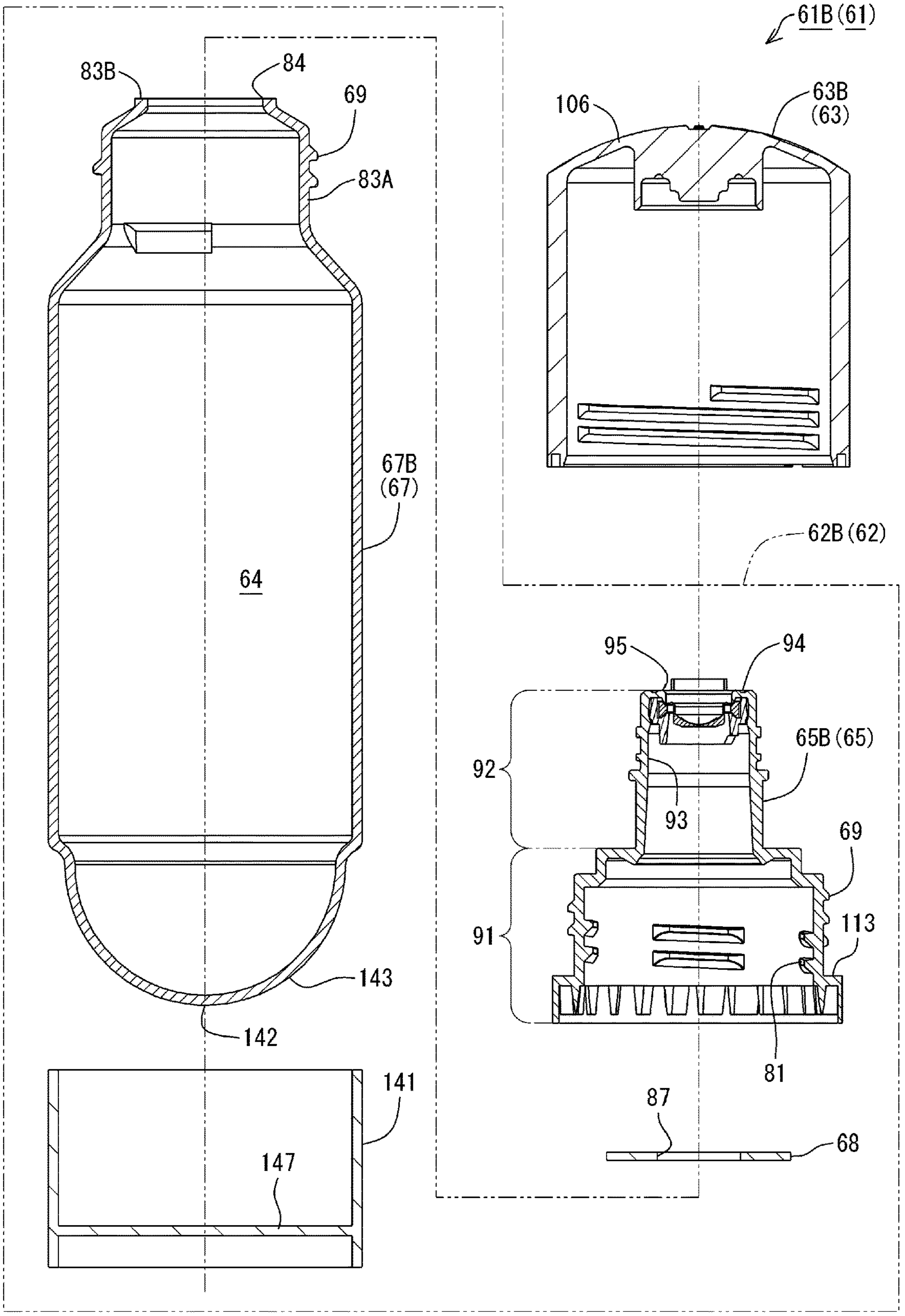
FIG. 18 is an exploded cross-sectional view taken along line E-E in FIG. 17.

The ink bottle 62B includes an ink outlet forming portion 65B, a container body portion 67B, and a cover 141, as shown in FIG. 18, which is an exploded cross-sectional view taken along line E-E in FIG. 17. The material of the ink outlet forming portion 65B is not limited to polypropylene, and may be another synthetic resin. In this regard, the ink outlet forming portion 65B differs from the ink outlet forming portion 65A in Example 1. With the exception of the above point, the ink outlet forming portion 65B is configured similarly to the ink outlet forming portion 65A in Example 1. Note that, with the exception of the above differences, the bottle set 61B is configured similarly to the bottle set 61A in Example 1.

The container body portion 67B is configured similarly to the container body portion 67A in Example 1 except for the shape of the outer shell being different from that in Example 1. A hemispherical spherical portion 143 is formed in an end portion 142 of the container body portion 67B on the side opposite to the ink outlet forming portion 65B side, that is, in the end portion 142 on the side opposite to an opening portion 84 side.

Here, in the container body portion 67A in Example 1, it is difficult to increase the strength of a corner portion 146 that connects a bottom surface portion 144 (FIG. 8) and a side wall 145. This is because, in blow molding of a synthetic resin material, the corner portion 146 is likely to become thin. Note that the bottom surface portion 144 is a surface that opposes the opening portion 84 in the container body portion 67A, and is a portion corresponding to the bottom of the ink container portion 64 when the bottom surface portion 144 is placed on a horizontal surface. The side wall 145 intersects the bottom surface portion 144, and is a wall that extends from the bottom surface portion 144 side toward an end portion 83B side.

In contrast to Example 1, in Example 2, the corner portion 146 in Example 1 is easily eliminated due to the spherical portion 143. The thinning of the material of the container body portion 67B can be easily suppressed. As a result, the strength of the container body portion 67B can be increased. Note that the shape of the spherical portion 143 is not limited to a strict hemisphere, and may be distorted, deformed, or uneven, in a range in which the thinning of the material of the container body portion 67B can be reduced.

Also, in Example 2, the cover 141 covers at least a portion of the spherical portion 143. That is, the ink bottle 62B includes the cover 141 that covers at least the end portion of the container body portion 67B on the side opposite to the ink outlet forming portion 65B side. Accordingly, because the cover 141 can protect the spherical portion 143, the strength of the ink bottle 62B can be increased, and the convenience and the reliability can be improved. Also, the cover 141 has a tubular structure. The spherical portion 143 is inserted into the inside of the tubular cover 141. Therefore, the ink bottle 62B can stand upright in a state in which the spherical portion 143 is located on the lower side due to the tubular cover 141. Note that a closing wall 147 that closes the tubular cover 141 is provided on the side opposite to the end portion 83B side relative to the spherical portion 143 in a state in which the spherical portion 143 is inserted into the tubular cover 141. Accordingly, the spherical portion 143 can be covered by the cover 141.

Also, in Example 2, the outer diameter of the cover 141 is set equivalent to the outer diameter of the container body portion 67B. Therefore, the outer circumferential surface of the cover 141 and the outer circumferential surface of the container body portion 67B can be flush with each other, and as a result, an increase in size of the bottle set 61B can be easily avoided.

Example 3

Figure 19:
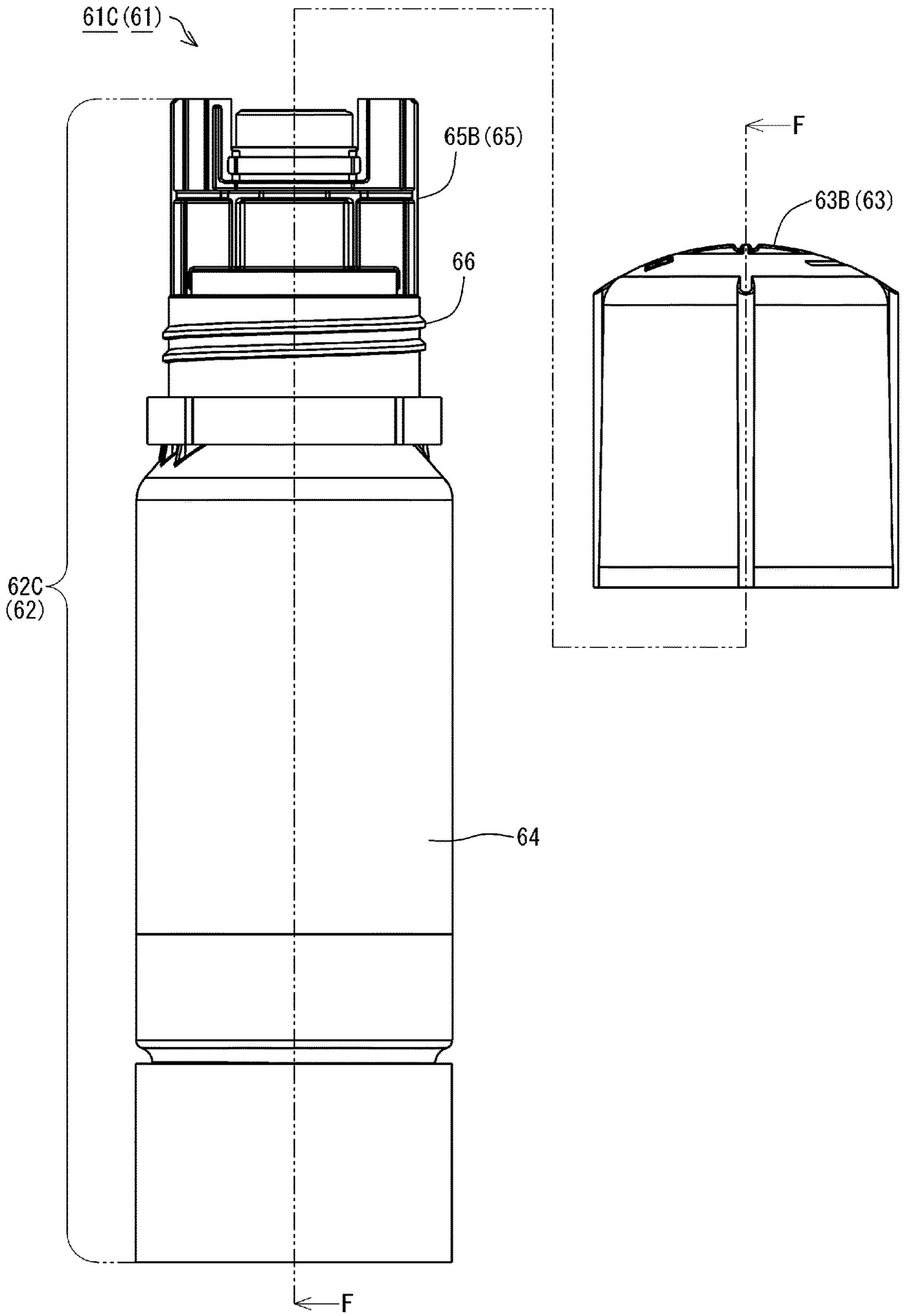
FIG. 19 is an exploded view illustrating a bottle set of Example 3.

A bottle set 61C of Example 3 will be described. Constituent parts in Example 3 that are the same as those in Examples 1 and 2 will be assigned the same signs as those in Examples 1 and 2, and a detailed description thereof will be omitted. The bottle set 61C of Example 3 includes an ink bottle 62C and a lid member 63B, as shown in FIG. 19. The lid member 63B is the same as that in Example 2.

Figure 20:
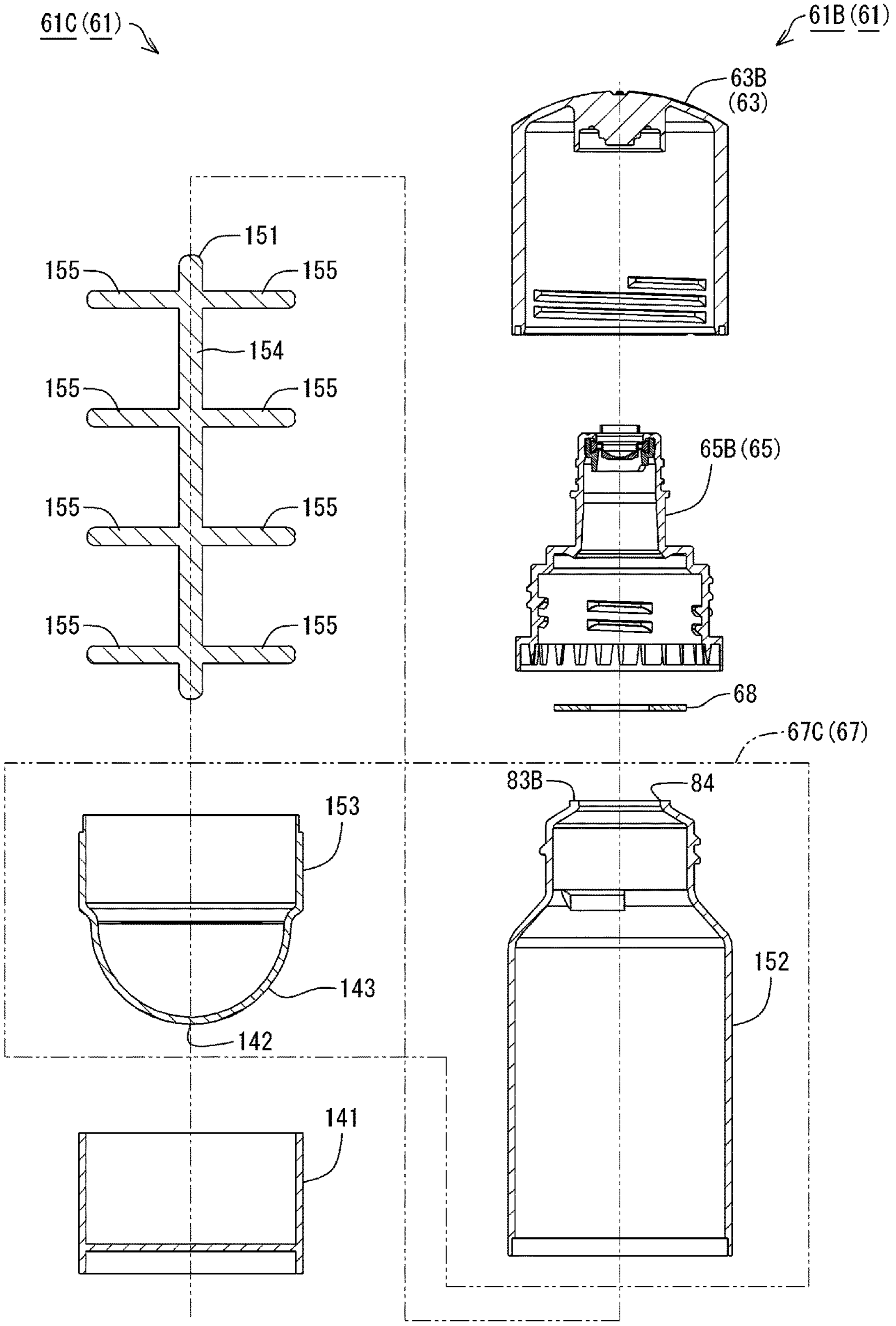
FIG. 20 is an exploded cross-sectional view taken along line F-F in FIG. 19.

The ink bottle 62C includes an ink outlet forming portion 65B, a container body portion 67C, a restriction member 151, and a cover 141, as shown in FIG. 20, which is an exploded cross-sectional view taken along line F-F in FIG. 19. The ink outlet forming portion 65B is configured similarly to Example 2. In Example 3, the container body portion 67C includes a first portion 152 and a second portion 153. In the present embodiment, the container body portion 67C is configured by combining the first portion 152 and the second portion 153. That is, in the present embodiment, the container body portion 67C is divided into the first portion 152 and the second portion 153. The first portion 152 is flexible.

The first portion 152 is a part of the container body portion 67C that is located on the ink outlet forming portion 65B side. The second portion 153 is a part of the container body portion 67C that is located on the side opposite to the ink outlet forming portion 65B side. That is, the first portion 152 is a part that includes an opening portion 84 of an end portion 83B of the container body portion 67C. The second portion 153 is a part that includes an end portion 142 that is on the side opposite to the ink outlet forming portion 65B side.

The first portion 152 has a tubular structure. The second portion 153 has a tubular structure in which the end portion 142 is closed by a spherical portion 143. A portion of the second portion 153 on the side opposite to the end portion 142 side is inserted into the tubular first portion 152. Accordingly, the first portion 152 and the second portion 153 are combined, and the container body portion 67C is configured. Note that, if the joint between the first portion 152 and the second portion 153 is joined through adhesion or welding, the airtightness of the container body portion 67C can be improved.

The restriction member 151 is housed inside the container body portion 67C. The restriction member 151 has a main shaft 154. The main shaft 154 extends along an axis line that connects the end portion 83B and the end portion 142 of the container body portion 67C, that is, an axis line that extends along the extending direction of the container body portion 67C. The main shaft 154 has a length so as to be housed inside the container body portion 67C. The restriction member 151 includes a plurality of arm portions 155 that extend from the main shaft 154 in directions that intersect the main shaft 154. The outer diameter of each arm portion 155 is smaller than the inner diameter of the container body portion 67C. Therefore, the restriction member 151 can be housed inside the container body portion 67C.

Note that the restriction member 151 is housed inside the container body portion 67C when the first portion 152 and the second portion 153 are combined to form the container body portion 67C. That is, the first portion 152 and the second portion 153 are combined in a state in which the restriction member 151 is placed between the first portion 152 and the second portion 153, and as a result, the restriction member 151 can be housed inside the container body portion 67C.

Note that the members (such as the ink outlet forming portion 65B and the restriction member 151 described above) of the bottle set 61C are separate members, but the entirety of the bottle set 61C or some of the plurality of members may be integrally formed using a 3D printer or the like, for example.

Figure 21:
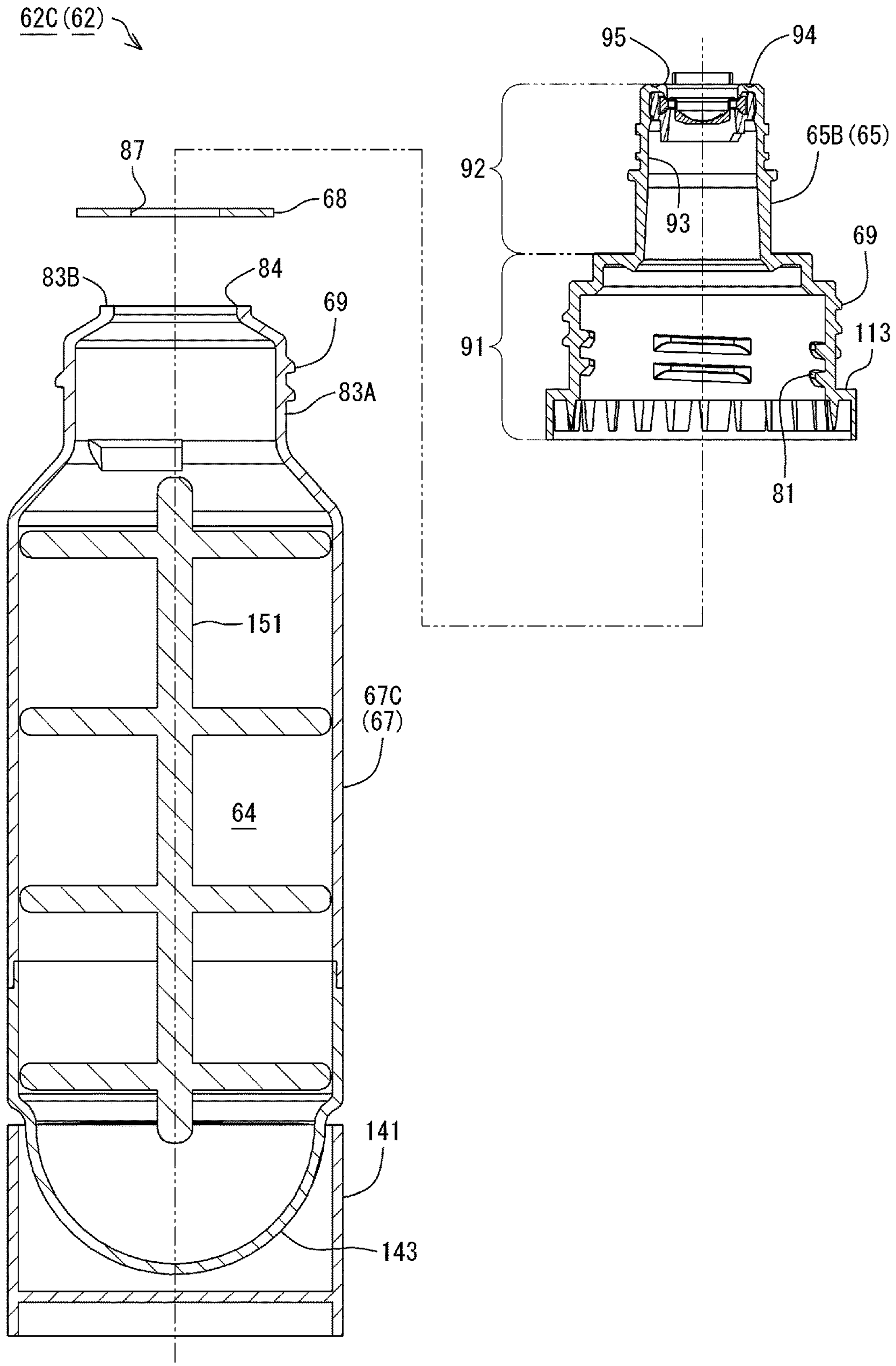
FIG. 21 is a cross-sectional view of an ink bottle of Example 3 taken along line F-F in FIG. 19.

The spherical portion 143 is inserted into the cover 141 in Example 3 similarly to Example 2. As described above, the ink bottle 62C is configured, as shown in FIG. 21. Example 3 can also achieve the same effects as those achieved by Example 2.

Also, in the ink bottle 62C in Example 3, the restriction member 151 is provided inside the container body portion 67C. Accordingly, when a compressing force acts on the container body portion 67C, the restriction member 151 can restrict the compression deformation of the container body portion 67C, and as a result, the leaking out of the ink inside the container body portion 67C can be easily suppressed, for example. The convenience can be easily improved with this ink bottle 62C.

Also, in Example 3, in the container body portion 67C, the outer diameter of the second portion 153 is set to be the same as the outer diameter of the first portion 152 or less. Therefore, in the container body portion 67C, the outer circumferential surfaces of the first portion 152 and the second portion 153 can be flush with each other, and as a result, an increase in size of the bottle set 61C can be easily avoided.

Example 4

Figure 22:
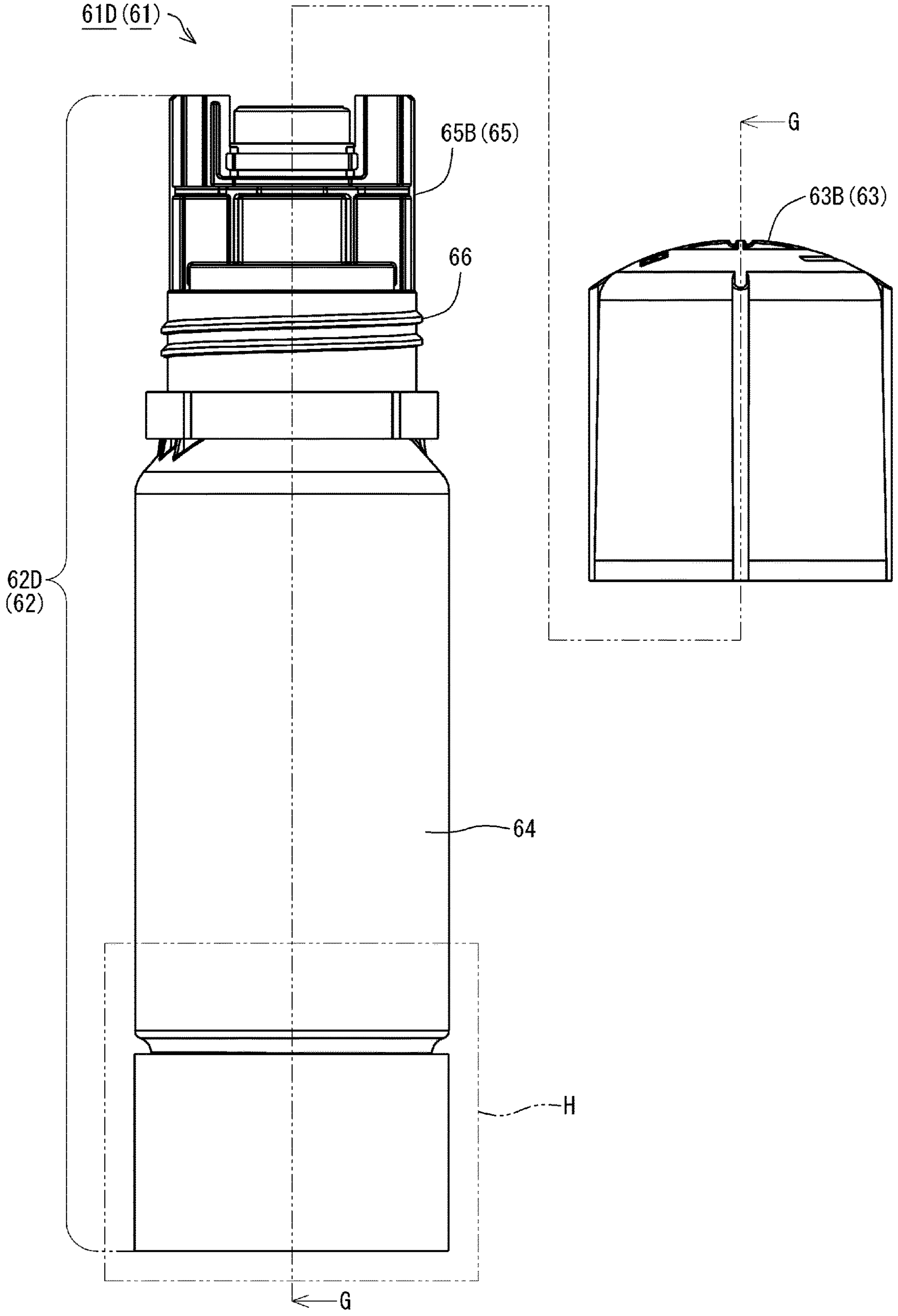
FIG. 22 is an exploded view illustrating a bottle set of Example 4.

A bottle set 61D of Example 4 will be described. Constituent parts in Example 4 that are the same as those in Examples 1 to 3 will be assigned the same signs as those in Examples 1 to 3, and a detailed description thereof will be omitted. The bottle set 61D of Example 4 includes an ink bottle 62D and a lid member 63B, as shown in FIG. 22. The lid member 63B is the same as that in Example 2.

Figure 23:
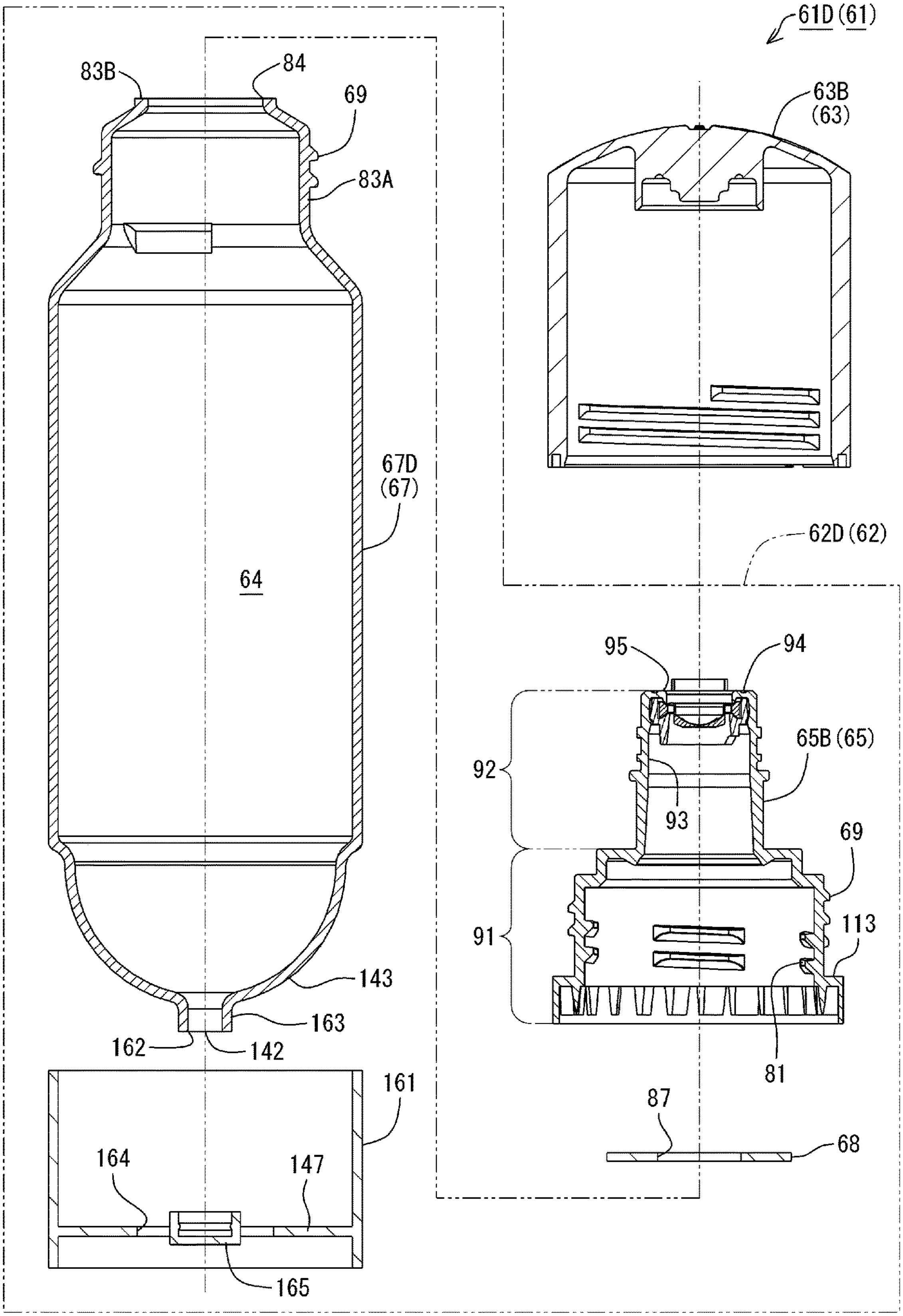
FIG. 23 is an exploded cross-sectional view taken along line G-G in FIG. 22.

The ink bottle 62D includes an ink outlet forming portion 65B, a container body portion 67D, and a cover 161, as shown in FIG. 23, which is an exploded cross-sectional view taken along line G-G in FIG. 22. The ink outlet forming portion 65B is configured similarly to Example 2.

In the container body portion 67D, an opening 162 is formed in an end portion 142. The container body portion 67D includes an ink container portion 64 that is a space in which ink can be contained and the opening 162 through which air can be introduced to the ink container portion 64 from the outside. With the exception of the above point, the container body portion 67D is configured similarly to Example 2. The cover 161 is configured similarly to Example 2 with the exception that an opening 164 is formed in a closing wall 147 and a closing portion 165 is included.

In the container body portion 67D, the opening 162 is formed in a tubular portion 163 that protrudes from a spherical portion 143 toward the side opposite to an end portion 83B side. The opening 162 is formed in an end portion 142 of the tubular portion 163 that protrudes from the spherical portion 143 on the side opposite to the spherical portion 143 side.

Figure 24:
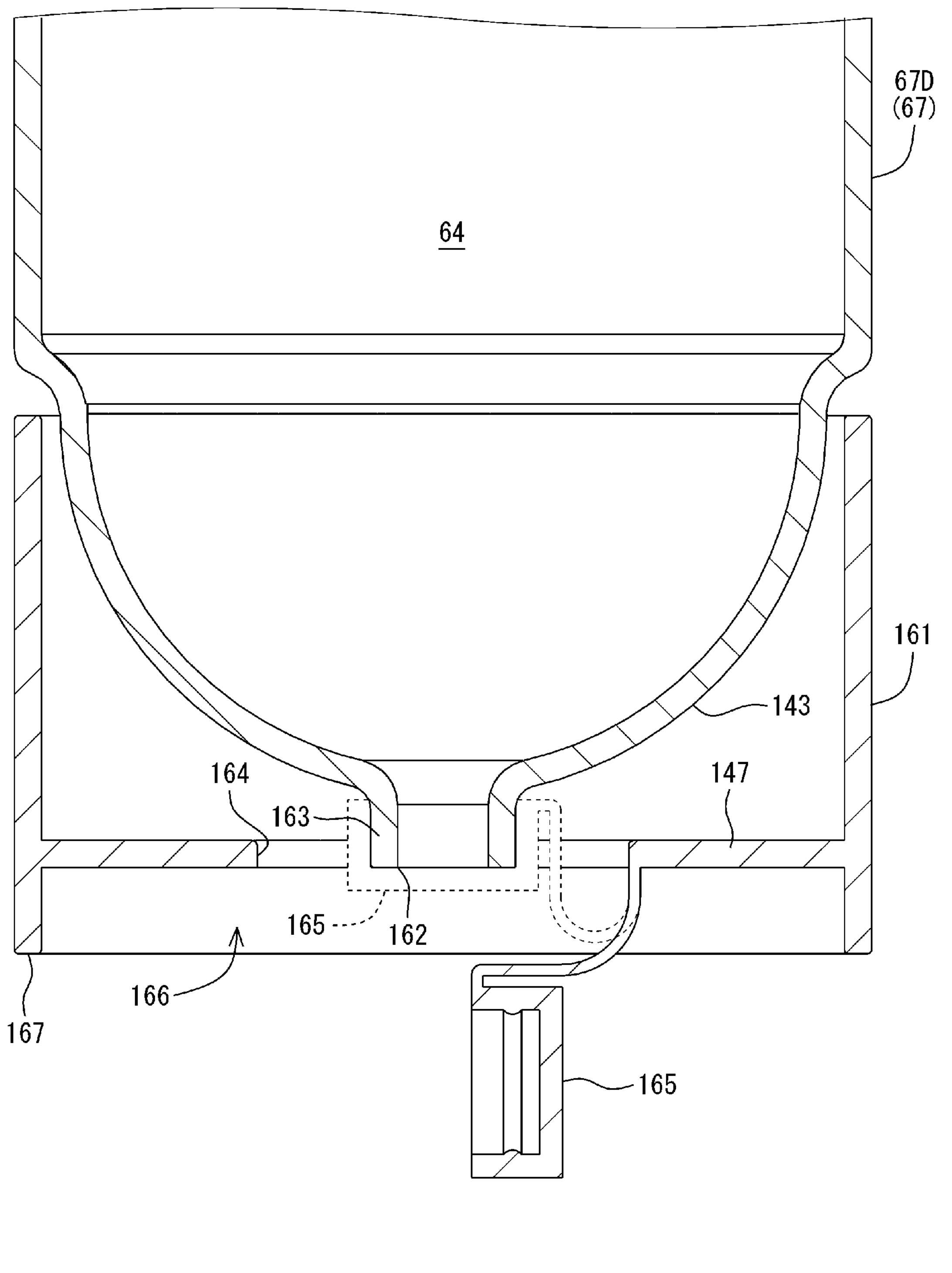
FIG. 24 is a cross-sectional view of a portion H in FIG. 22.

In the closing wall 147 of the cover 161, the opening 164 is formed at a position that opposes the tubular portion 163 of the container body portion 67D in a state in which the spherical portion 143 is inserted into a tubular cover 161. The opening 164 is formed to have a size and shape such that the tubular portion 163 can be accepted. Therefore, the opening 162 of the container body portion 67D may be exposed via the opening 164 of the cover 161 in a state in which the spherical portion 143 is inserted into the tubular cover 161, as shown in FIG. 24. Note that FIG. 24 is a cross-sectional view of a portion H in FIG. 22 when cut along line G-G.

The closing portion 165 is a cap-shaped member that can close the opening 162 of the container body portion 67D. The closing portion 165 is positioned so as to face the opening 162 of the container body portion 67D, inside the opening 164 of the cover 161. Note that the closing portion 165 is connected to the cover 161. Accordingly, losing the closing portion 165 can be easily avoided. The closing portion 165 closes the opening 162 of the container body portion 67D such that the opening 162 can be opened and closed. In the present embodiment, the closing portion 165 covers the outside of the tubular portion 163 of the container body portion 67D. Accordingly, the end portion 142 of the tubular portion 163 of the container body portion 67D is covered by the closing portion 165. As a result, the opening 162 of the container body portion 67D is closed by the closing portion 165. Also, when the closing portion 165 is removed from the tubular portion 163, the opening 162 of the container body portion 67D is opened. Note that, in the present example, the closing portion 165 is connected to the cover 161, but a configuration in which the closing portion 165 is connected to the container body portion 67D may be adopted. Furthermore, a configuration in which the closing portion 165 is not connected to another constituent member and the closing portion 165 is independent may be adopted.

Example 4 can also achieve the same effects as those achieved by Example 2. Furthermore, in Example 4, the opening 162 is formed in the container body portion 67D. Also, in Example 4, the closing portion 165 that closes the opening 162 formed in the container body portion 67D such that the opening 162 can be opened and closed is provided. Therefore, for example, as a result of releasing the closing of the opening 162 by the closing portion 165 when the ink in the container body portion 67D is allowed to flow out from the ink outlet 95, that is, as a result of opening the opening 162 when the ink in the container body portion 67D is allowed to flow out from the ink outlet 95, external air can be introduced into the container body portion 67D via the opening 162. Accordingly, the ink in the container body portion 67D can be allowed to quickly flow out from the ink outlet 95. In this way, the convenience can be easily improved with this ink bottle 62D.

Also, the cover 161 is provided with a sunken portion (depression portion) 166, as shown in FIG. 24. The sunken portion 166 is provided on the side of the closing wall 147 of the cover 161 opposite to the container body portion 67D side. The sunken portion 166 is a spatial region between an end portion 167 and the closing wall 147 of the cover 161. According to this configuration, the ink bottle 62D can be considered to include the sunken portion 166 that is a sunken portion of the outer shell. In the ink bottle 62D, the sunken portion 166 is provided so as to be recessed from the end portion 167 toward the container body portion 67D side. The opening 162 of the container body portion 67D is located in the sunken portion 166. That is, the opening 162 is formed in the sunken portion 166. Therefore, the opening 162 is located at a position receded from the outer shell of the ink bottle 62D. Accordingly, at least a portion of the closing portion 165 that closes the opening 162 can be housed inside the sunken portion 166, and as a result, the amount of the closing portion 165 projecting from the outer shell of the ink bottle 62D can be reduced. Also, since the opening 162 is located in the sunken portion 166, the closing portion 165 can be prevented from coming off from the opening 162 as a result of an unintended external force acting on the closing portion 165.

Also, in Example 4, the opening 162 is formed in the end portion 142 of the container body portion 67D on the side opposite to the ink outlet forming portion 65B. Therefore, when the ink bottle 62D is tilted downward with the ink outlet 95 being oriented downward, and the ink is allowed to flow out from the ink outlet 95, the opening 162 is located above the ink outlet 95. Therefore, when the ink bottle 62D is tilted downward with the ink outlet 95 being oriented downward, and the ink is allowed to flow out from the ink outlet 95, the ink in the ink bottle 62D is likely to be located below the opening 162. That is, when the ink bottle 62D is tilted downward with the ink outlet 95 being oriented downward, and the ink is allowed to flow out from the ink outlet 95, the liquid surface of the ink in the ink bottle 62D is likely to be located below the opening 162. Therefore, the ink is unlikely to leak out from the opening 162.

Note that the configuration of Example 4 can be applied to Example 3. In this case, the tubular portion 163 and the opening 162 are formed in the second portion 153, and the cover 161 in place of the cover 141 can be adopted.

Example 5

Figure 25:
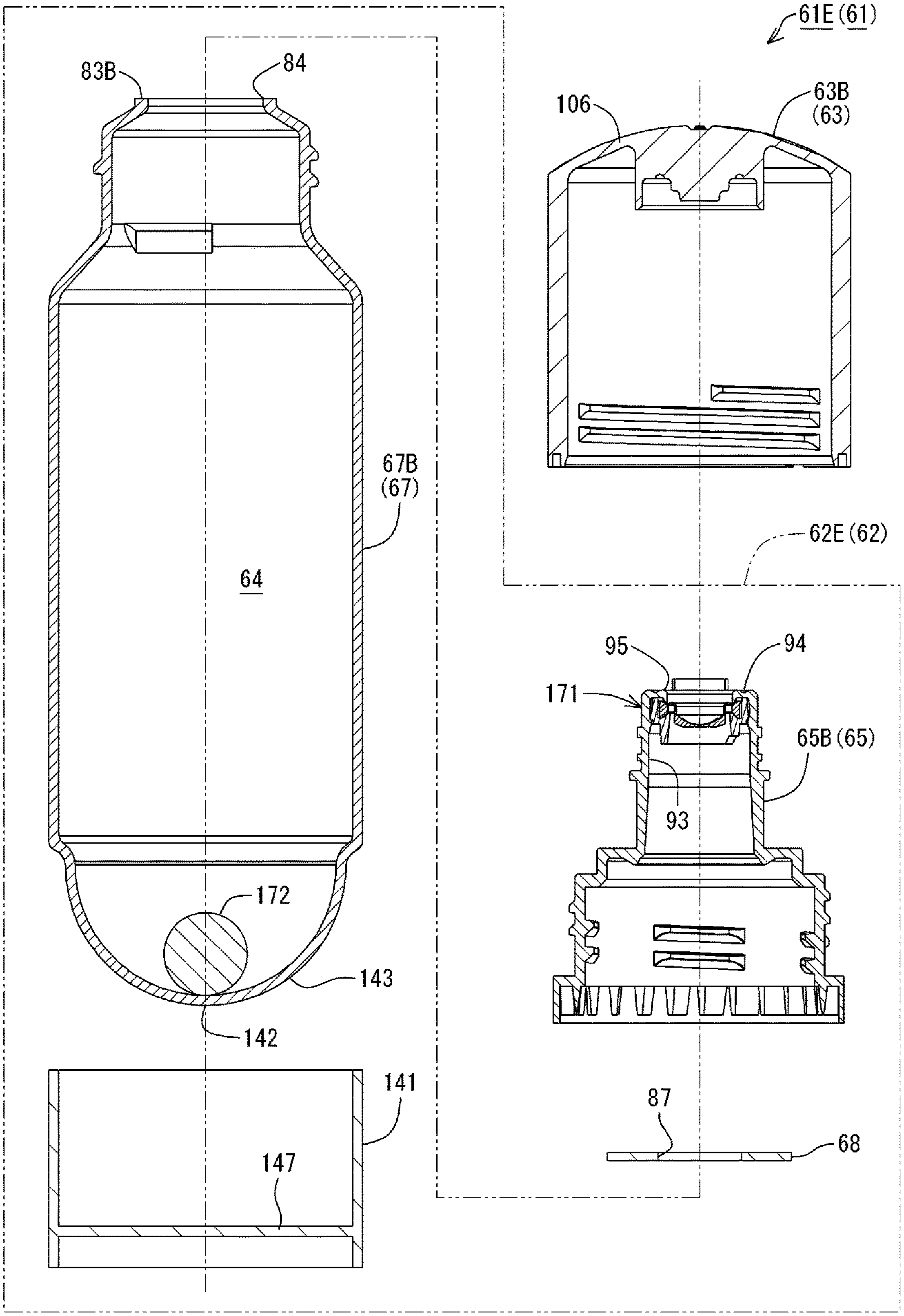
FIG. 25 is an exploded cross-sectional view illustrating a bottle set of Example 5.

A bottle set 61E of Example 5 will be described. Constituent parts in Example 5 that are the same as those in Examples 1 to 4 will be assigned the same signs as those in Examples 1 to 4, and a detailed description thereof will be omitted. The bottle set 61E of Example 5 includes an ink bottle 62E and a lid member 63B, as shown in FIG. 25. The lid member 63B is the same as that in Example 2. Note that FIG. 25 is a cross-sectional view of the bottle set 61E when cut along a line corresponding to the line B-B in FIG. 6.

The ink bottle 62E includes an ink outlet unit 171, a container body portion 67B, a stirring member 172, and a cover 141. The container body portion 67B and the cover 141 are the same as those in Example 2. The ink bottle 62E is configured similarly to Example 2 except that the holder 102 (FIG. 10) in Example 2 is replaced by a later-described holder 173, and a stirring member 172 is added.

The stirring member 172 is housed inside the container body portion 67B, that is, in an ink container portion 64. When the ink bottle 62E is vibrated, the stirring member 172 displaces inside the ink container portion 64, and as a result, the ink inside the ink container portion 64 can be stirred. Pigment ink is an example of ink that is appropriate to the ink bottle 62E. The pigment ink adopts a powdered material as the coloring material. The pigment ink has a configuration in which pigment particles are dispersed in a liquid. The liquid in which pigment particles are dispersed is also referred to as a dispersion medium. An oil-based or aqueous dispersion medium may be adopted as the dispersion medium.

Pigment particles in pigment ink may precipitate (also referred to as being deposited) in the dispersion medium in the ink container portion 64. In such a case, the pigment ink can be stirred when the ink bottle 62E is caused to vibrate, and therefore this configuration is preferable. Note that a material having a higher density than the pigment ink is preferable as the material of the stirring member 172. This is because, as the stirring member 172 is likely to be submerged in the pigment ink, the effect of stirring is easily improved.

Figure 26:
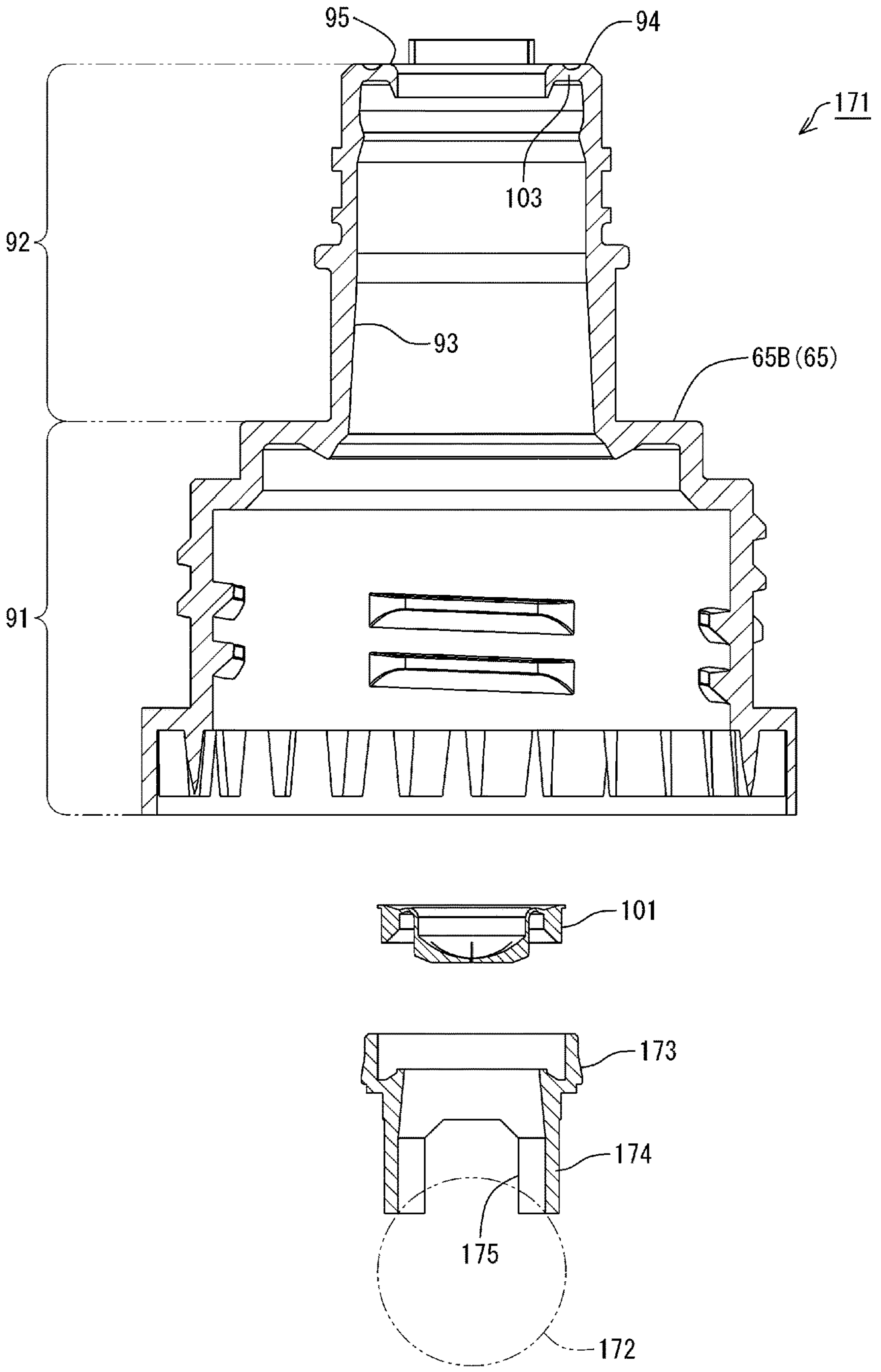
FIG. 26 is an exploded cross-sectional view illustrating an ink outlet unit in Example 5.

The ink outlet unit 171 is adopted in the ink bottle 62E. The ink outlet unit 171 includes an ink outlet forming portion 65B, a valve 101, and the holder 173, as shown in FIG. 26. Note that the combination of the ink outlet forming portion 65, the valve 101, and the holder 102 in Examples 1 to 4 may also be referred to as an ink outlet unit 171. The ink outlet unit 171 of Example 5 is configured similarly to the ink outlet unit 171 of Example 2 except that the holder 102 (FIG. 10) of Example 2 is replaced by the holder 173.

A groove 175 is formed in a tubular portion 174 in the holder 173, as shown in FIG. 26. The tubular portion 174 has a cylindrical external appearance, and extends toward the side opposite to an ink outlet 95 in a guiding flow passage 93 of the ink outlet forming portion 65B. The groove (opening portion in the invention) 175 is formed along an extending direction of the tubular portion 174. Since the groove 175 is provided in the tubular portion 174, even if the tubular portion 174 is blocked by the stirring member 172, the ink in the ink container portion 64 can flow to the ink outlet 95 through the groove 175. Accordingly, the ink in the ink bottle 62E is allowed to smoothly flow out from the ink outlet 95. In this way, the convenience can be easily improved with this ink bottle 62E. In the present embodiment, two grooves 175 are formed, and ink passes through one groove and air passes through the other groove, and as a result, air-liquid exchange in the ink bottle 62E is performed more smoothly, and the ink can be more smoothly discharged from the inside of the ink bottle to the outside.

Note that the opening portion is not limited to the groove 175 that is formed so as to extend along the extending direction of the tubular portion, and the opening portion may be formed in a direction that intersects the gravity direction of the guiding flow passage of the tubular portion, which are not illustrated. Also, the number, size, and position of the opening portion are not limited to those in the present embodiment.

Note that the shape of the stirring member 172 is not limited to a sphere. Various shapes such as ellipsoid and polyhedron may be adopted as the shape of the stirring member 172. Also, a configuration in which the stirring member 172 is applied to each of Examples 1 to 4 may be adopted. In this case, a configuration is preferable in which an ink outlet unit 171 including the holder 173 is adopted.

Example 6

Figure 27:
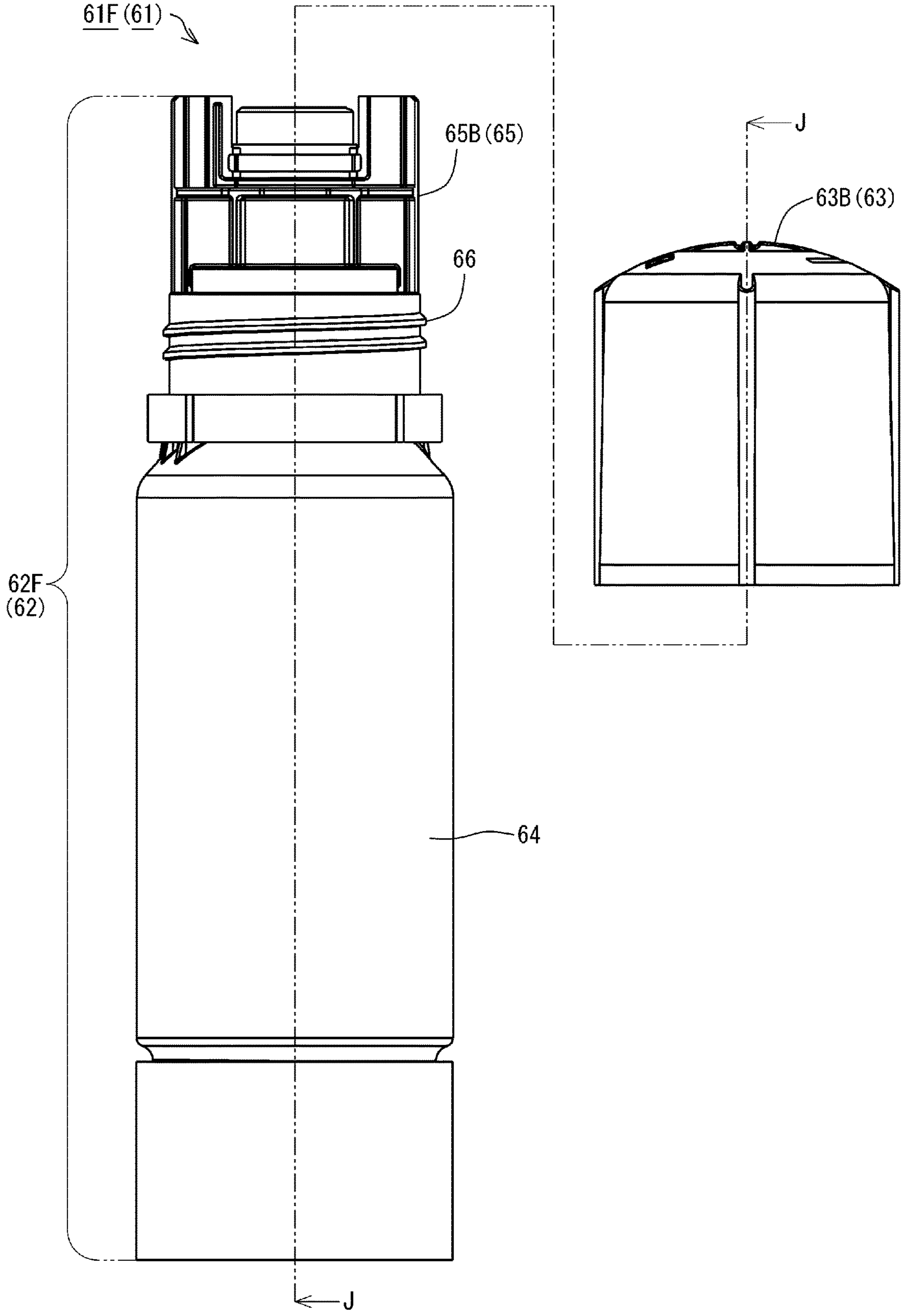
FIG. 27 is an exploded view illustrating a bottle set of Example 6.

A bottle set 61F of Example 6 will be described. Constituent parts in Example 6 that are the same as those in Examples 1 to 5 will be assigned the same signs as those in Examples 1 to 5, and a detailed description thereof will be omitted. The bottle set 61F of Example 6 includes an ink bottle 62F and a lid member 63B, as shown in FIG. 27. The lid member 63B is the same as that in Example 2.

Figure 28:
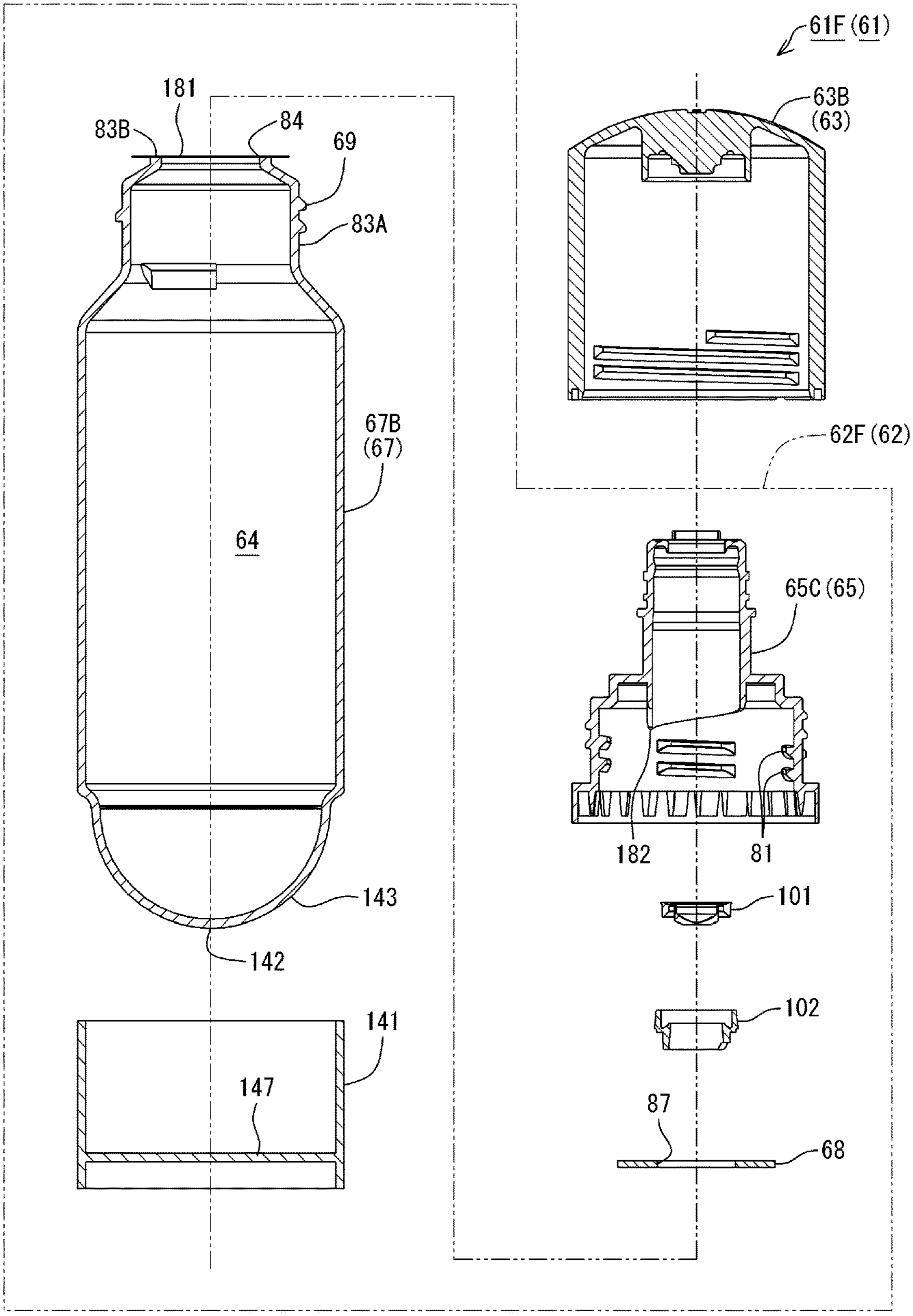
FIG. 28 is an exploded cross-sectional view taken along line J-J in FIG. 27.

The ink bottle 62F includes an ink outlet forming portion 65C, a valve 101, a holder 102, a film 181, a container body portion 67B, and a cover 141, as shown in FIG. 28, which is an exploded cross-sectional view taken along line J-J in FIG. 27. The container body portion 67B, the valve 101, the holder 102, and the cover 141 are the same as those in Example 2.

The film 181 is flexible and has a size and shape so as to cover an opening portion 84 of the container body portion 67B. The film 181 is joined to an end portion 83B of the opening portion 84, and seals the opening portion 84. The ink outlet forming portion 65C, which is an example of a nozzle member, includes a breakup portion 182. With the exception of the above point, the ink outlet forming portion 65C is configured similarly to the ink outlet forming portion 65B in Example 2. The ink bottle 62F is configured similarly to Example 2 with the exception of the film 181 being added and the ink outlet forming portion 65B being replaced by the ink outlet forming portion 65C.

The film 181 may be formed by a material such as polyethylene terephthalate (PET), nylon, or polyethylene. Also, a laminated structure in which these materials are laminated may be adopted. Furthermore, a configuration that includes a layer of any of those materials to which aluminum or the like is evaporated may also be adopted. Thus, higher gas barrier properties can be achieved. The film 181 is joined to the end portion 83B of the container body portion 67B by means of adhesion, for example. Accordingly, a high liquid-tightness is achieved in the container body portion 67B, and the ink can be stored in an airtight manner in the container body portion 67B. The user who uses the bottle set 61F removes the film 181 from the container body portion 67B before injecting the ink in the bottle set 61F into the ink tank 31, and thereafter injects the ink.

Figure 29:
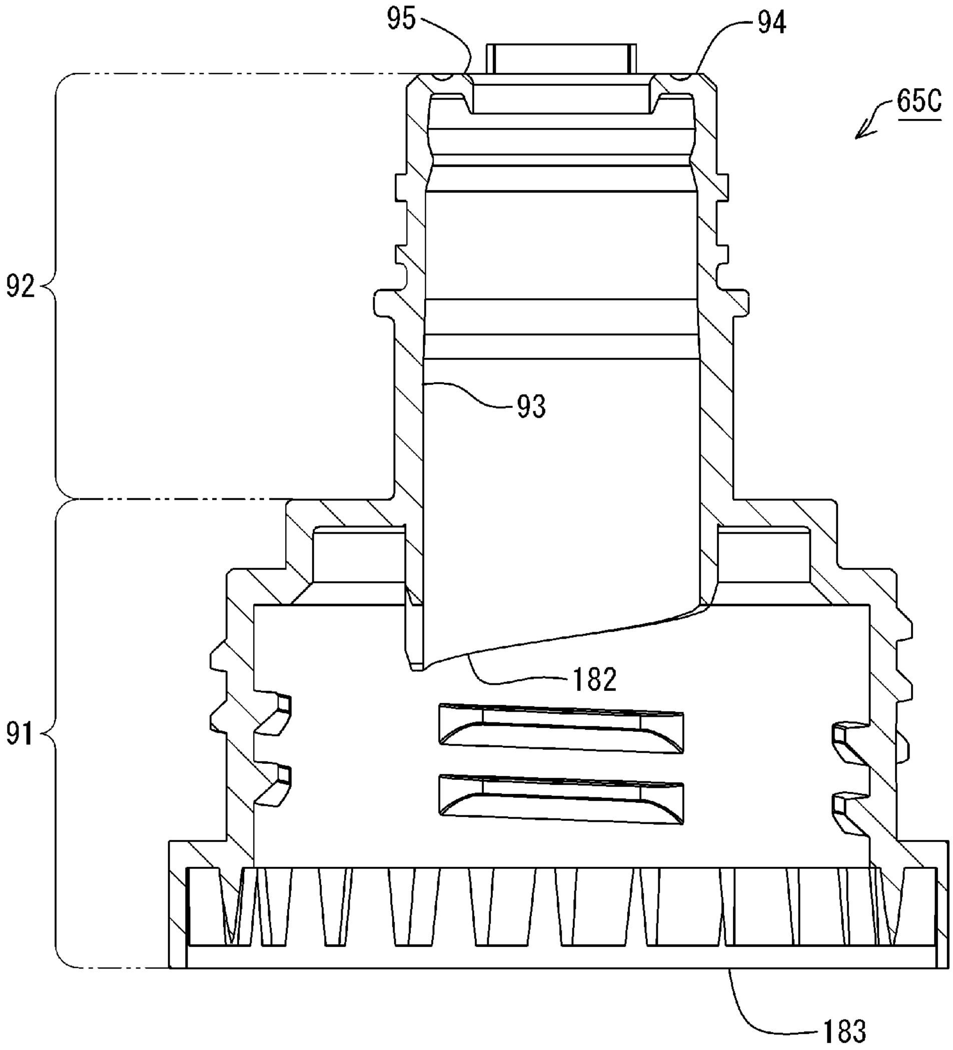
FIG. 29 is a cross-sectional view illustrating an ink outlet forming portion of Example 6.

The breakup portion 182 of the ink outlet forming portion 65C has a shape such that a tubular portion 92 is extended on an end portion 183 side of the ink outlet forming portion 65C, as shown in FIG. 29. Note that FIG. 29 is a cross-sectional view of the ink outlet forming portion 65C when cut along a line J-J in FIG. 27. The end portion 183 is an end edge of the ink outlet forming portion 65C located on the side opposite to the end surface 94 side. In the ink outlet forming portion 65C, the tubular portion 92 can be considered to be extended into a joint portion 91. Note that the breakup portion 182 is a portion of the tubular portion 92 that is extended into the joint portion 91, and is a portion that is located inside the joint portion 91.

Figure 30:
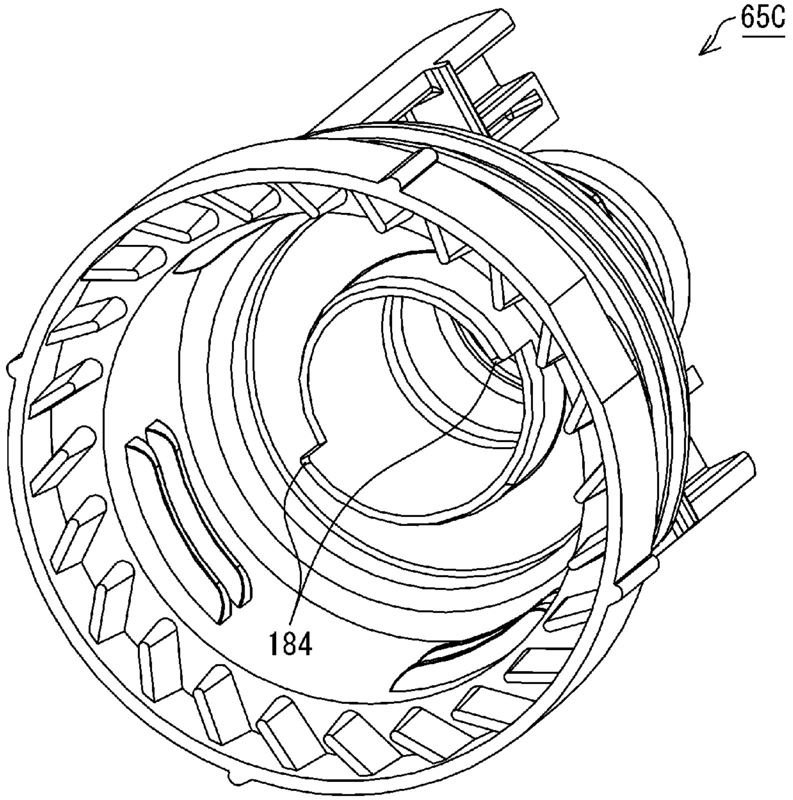
FIG. 30 is a perspective view illustrating an ink outlet forming portion of Example 6.

The breakup portion 182 has an appearance of a tube provided in the joint portion 91, as shown in FIG. 30. The inside of the tubular breakup portion 182 is in communication with a guiding flow passage 93, as shown in FIG. 29. In the ink outlet forming portion 65C, the guiding flow passage 93 can be considered to be extended into the joint portion 91. The tubular breakup portion 182 is provided with at least two blade portions 184, as shown in FIG. 30.

Figure 31:
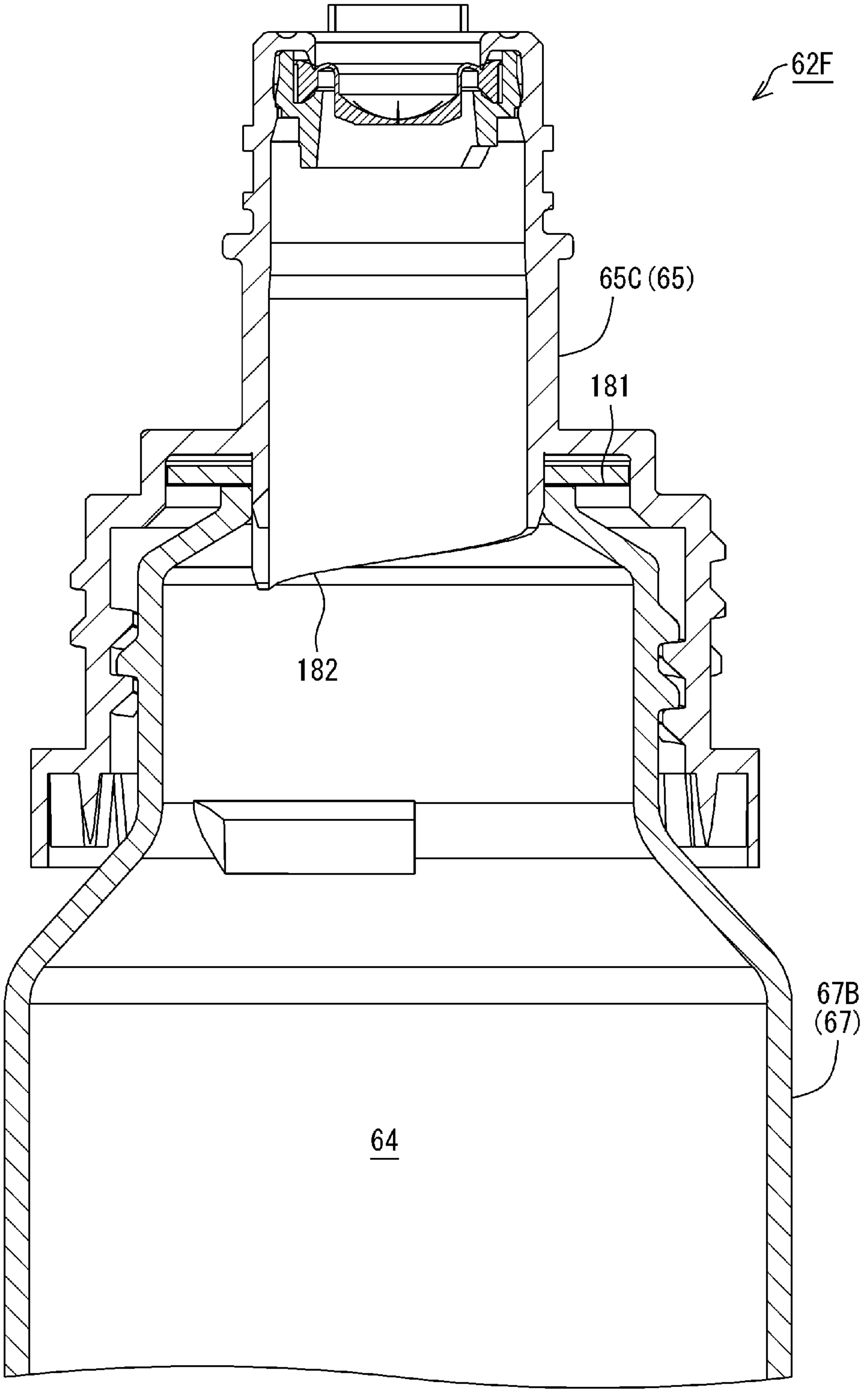
FIG. 31 is a partial cross-sectional view of an ink bottle of Example 6.

In a state in which a thread 81 of the ink outlet forming portion 65C is engaged with a thread 69 of the container body portion 67B and thus the ink outlet forming portion 65C is attached to the container body portion 67B, the threads being shown in FIG. 28, the breakup portion 182 enters the ink container portion 64 side relative to the opening portion 84 of the container body portion 67B. Therefore, when the ink outlet forming portion 65C is attached to the container body portion 67B in a state in which the film 181 is not opened, the breakup portion 182 breaks through the film 181, as shown in FIG. 31. Accordingly, the film 181 added to the container body portion 67B can be opened. Therefore, the film 181 can be opened by merely attaching the ink outlet forming portion 65C to the container body portion 67B without a worker peeling off the film 181 from the container body portion 67B. As a result, the convenience of the ink bottle 62F can be easily improved.

Since the breakup portion 182 is provided with at least two blade portions 184, when the ink outlet forming portion 65C is attached to the container body portion 67B, at least two fractured portions are formed in the film 181. In the case where two fractured portions are formed in the film 181, when ink is allowed to flow out from the ink outlet 95, for example, the ink can be allowed to flow out from the ink outlet 95 through one fractured portion of the two fractured portions, and external air can be introduced into the ink container portion 64 through the other fractured portion of the two fractured portions. That is, one of the two fractured portions can be used as an ink flow path, and the other can be used as an air flow path. Accordingly, the ink in the container body portion 67B can be allowed to smoothly flow out from the ink outlet 95, and therefore the convenience of the ink bottle 62F can be easily improved. Note that the number of the blade portions 184 of the breakup portion 182 is not limited to two, and may be three or more.

In Examples 1 to 6, the ink bottle 62 has a columnar external appearance, but the external appearance of the ink bottle 62 is not limited thereto. Various external appearances such as a polygonal column such as a triangular prism or a rectangular parallelepiped, an elliptic cylinder, or other prism and columnar shape may be adopted as the external appearance of the ink bottle 62. Also, the external appearance of the ink bottle 62 is not limited to a prism or columnar shape, and various shapes such as a box and a sphere may be adopted. Hereinafter, an example of an ink bottle 62 having an external appearance of a rectangular parallelepiped will be described. In the following example, constituent parts that have the functions similar to those in Examples 1 to 6 and constituent parts that are the same as those in Examples 1 to 6 will be assigned the same signs as those in Examples 1 to 6, and a detailed description thereof will be omitted.

Example 7

Figure 32:
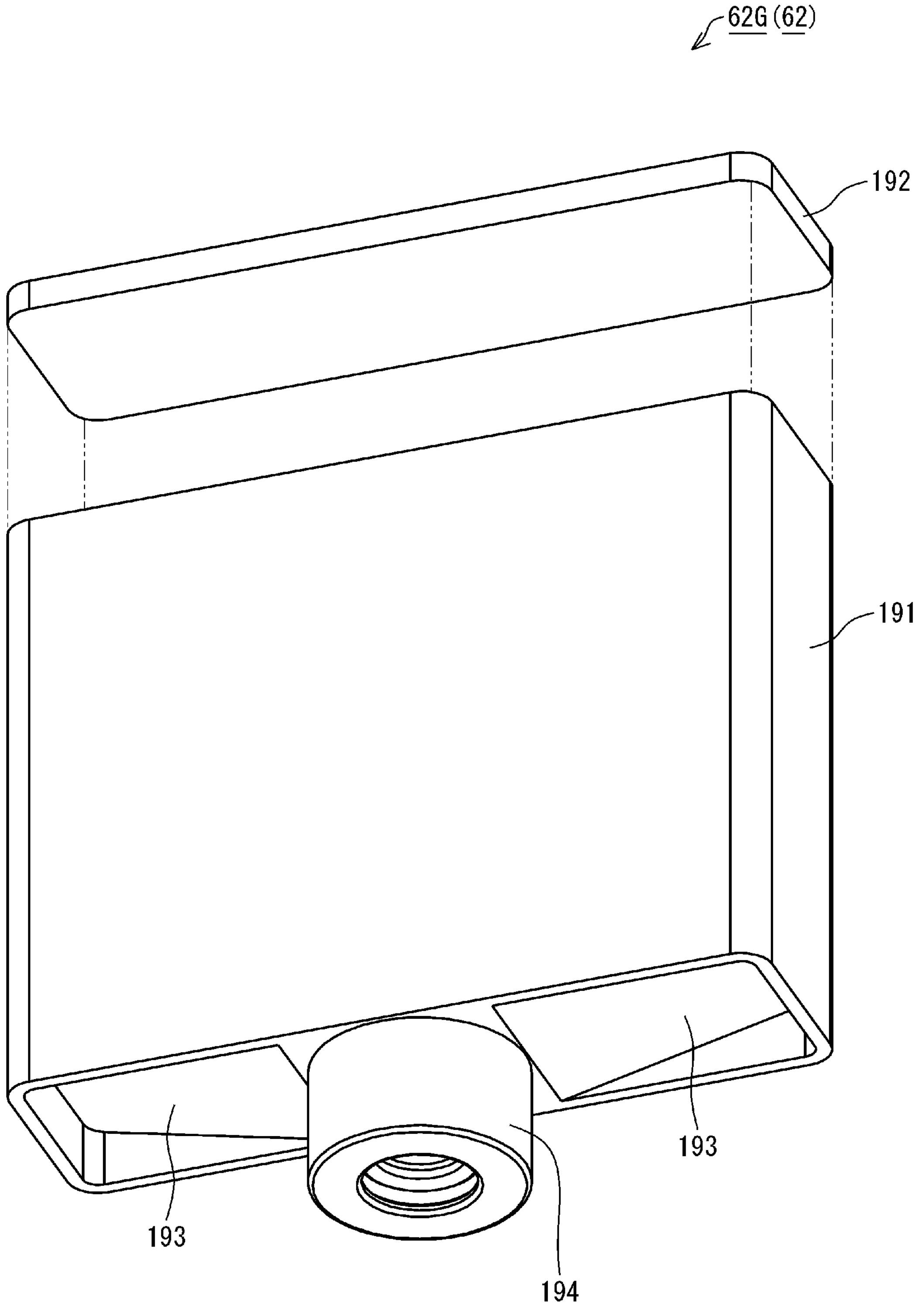
FIG. 32 is an exploded perspective view illustrating an ink bottle of Example 7.

An ink bottle 62G in Example 7 includes a container body portion 191 and a lid member 192, as shown in FIG. 32. The container body portion 191 has an external appearance of a rectangular parallelepiped, and formed in a container shape. An ink outlet forming portion 194 is formed in a bottom wall 193 that corresponds to the bottom of the container-shaped container body portion 191. The ink outlet forming portion 194 has a function similar to that of the ink outlet forming portion 65. The lid member 192 is a portion corresponding to the lid of the container-shaped container body portion 191, and opposes the bottom wall 193.

The container body portion 191 and the lid member 192 may be formed by a resin material such as polyethylene terephthalate (PET), nylon, polyethylene, polypropylene, or polystyrene, or a metal material such as an iron material or aluminum, for example. In the container body portion 191, the bottom wall 193 and the ink outlet forming portion 194 are integrally formed.

Figure 33:
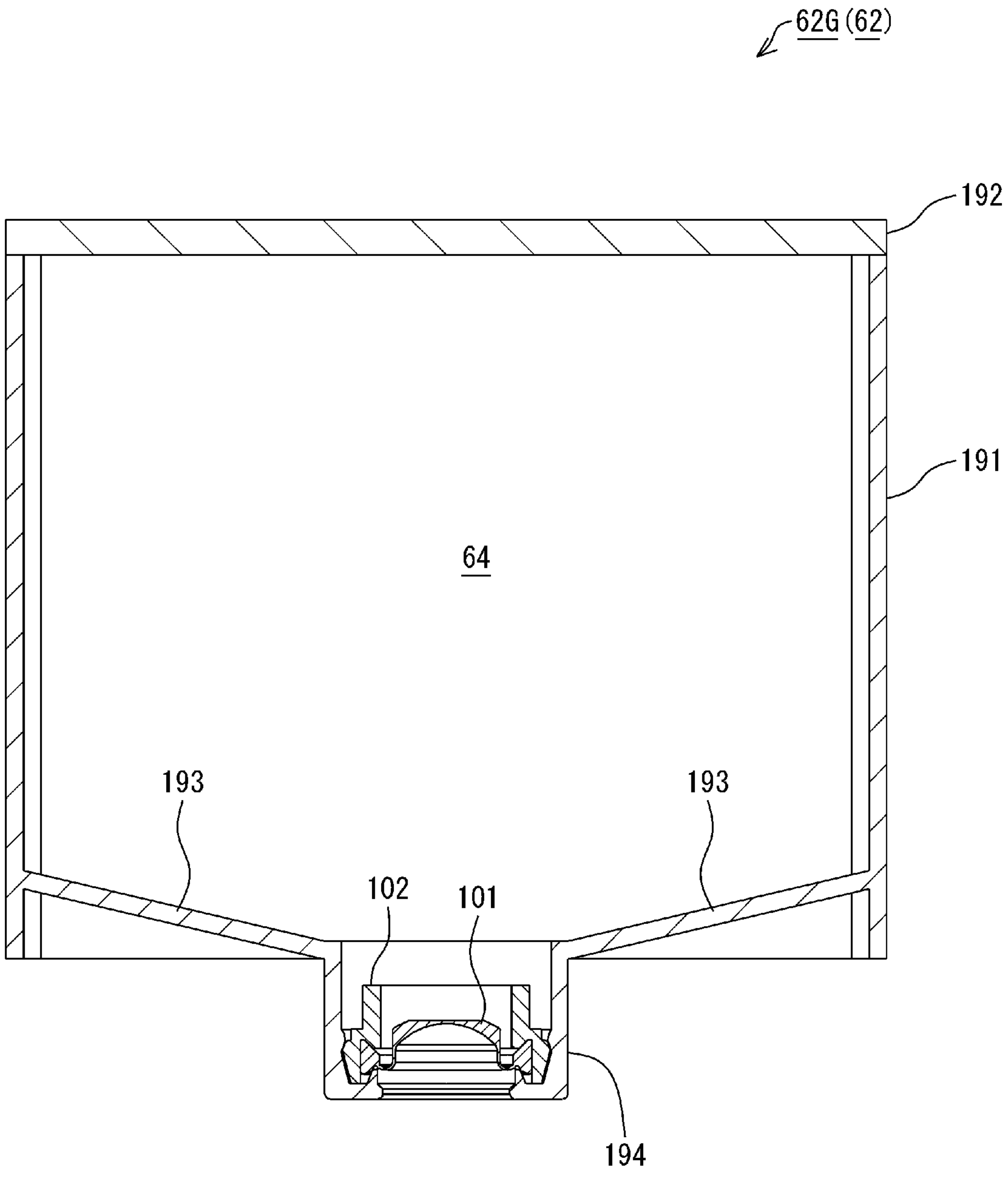
FIG. 33 is a cross-sectional view illustrating the ink bottle of Example 7.

Also, the ink bottle 62G includes a valve 101 and a holder 102, as shown in FIG. 33. The valve 101 and the holder 102 are the same as those in Example 1. A region surrounded by the container body portion 191 and the lid member 192 constitutes an ink container portion 64. Ink can be contained in the ink bottle 62G of Example 7 as well. The ink contained in the ink bottle 62G may be supplied to an ink tank 31 of the ink supply device 4 (FIG. 2) via the ink outlet forming portion 194.

Example 8

Figure 34:
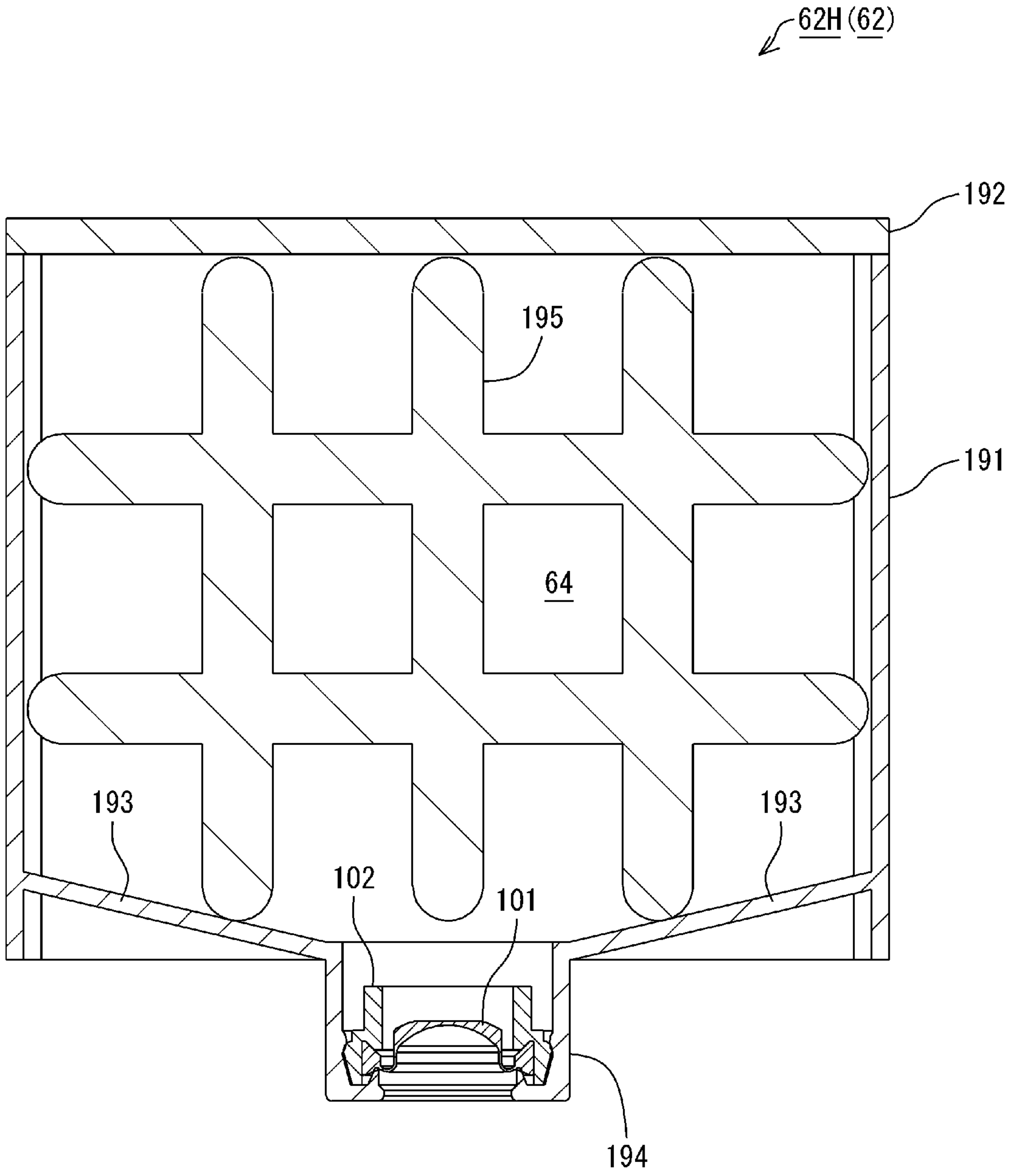
FIG. 34 is a cross-sectional view illustrating an ink bottle of Example 8.

An ink bottle 62H of Example 8 includes a restriction member 195, as shown in FIG. 34. With the exception of this point, the ink bottle 62H of Example 8 is configured similarly to Example 7. The restriction member 195 has a function similar to that of the restriction member 151 (FIG. 20) in Example 3. The restriction member 195 is housed in an ink container portion 64, as shown in FIG. 34. Example 8 can also achieve the same effects as those achieved by Example 3.

In the above embodiment and examples, the ink ejection device may be a liquid ejection device that ejects, discharges, or applies liquid other than ink to consume the liquid. Note that the status of liquid discharged as very small droplets from the liquid ejection device includes a granular shape, a tear-drop shape, and a shape having a thread-like trailing end. Furthermore, the liquid mentioned here may be any kind of material that can be consumed by the liquid ejection device. For example, the liquid need only be a material whose substance is in the liquid phase, and includes fluids such as inorganic solvent, organic solvent, solution, liquid resin, and liquid metal (metal melt) in the form of a liquid body having a high or low viscosity, sol, gel water, or the like. Furthermore, the liquid is not limited to being a one-state substance, and also includes particles of a functional material made from solid matter, such as pigment or metal particles, that are dissolved, dispersed, or mixed in a solvent. Representative examples of the liquid include ink such as that described in the above embodiment, as well as liquid crystal, and the like. Here, "ink" encompasses general water-based ink and oil-based ink, as well as various types of liquid compositions such as gel ink and hot melt-ink. Specific examples of the liquid ejection device include liquid ejection devices that eject a liquid containing, in the form of dispersion or dissolution, a material such as an electrode material or a color material used in manufacturing or the like of a liquid crystal display, an EL (electroluminescence) display, a surface-emitting display, or a color filter, for example. The liquid ejection device may also be a liquid ejection device that ejects biological organic matter used in manufacturing of a biochip, a liquid ejection device that is used as a precision pipette and ejects a liquid serving as a sample, a textile printing device, a microdispenser, or the like. Furthermore, the liquid ejection device may also be a liquid ejection device that ejects lubricating oil in a pinpoint manner to a precision machine such as a watch or a camera, or a liquid ejection device that ejects a transparent resin liquid such as ultraviolet-cured resin onto a substrate in order to form a micro-hemispherical lens (optical lens) or the like that is used in an optical communication device or the like. Furthermore, the liquid ejection device may be a liquid ejection device that ejects an etchant which is acid, alkaline, or the like, in order to etch a substrate or the like.

Note that the invention is not limited to the above embodiment and examples, and can be achieved by various configurations without departing from the gist thereof. For example, the technical features in the embodiment and examples that correspond to the technical features in the modes described in the summary of the invention may be replaced or combined as appropriate in order to solve part or the entire foregoing problem, or to achieve some or all of the above-described effects. The technical features that are not described as essential in the specification can be deleted as appropriate. In the above embodiments, the bottle is made of material having elasticity, but the entirety or a portion of the bottle may be formed by another material such as glass, ceramic, or metal.

What is claimed is:

1. An ink bottle configured to supply ink to a printer through a connecting tube disposed in the printer, the ink bottle comprising:

a container body portion configured to contain ink;

an ink outlet forming portion having an ink outlet that allows the ink to flow out; and a valve disposed in the ink outlet forming portion, the valve having an elastic valve body with a slit formed therethrough, the slit configured to be open by the connecting tube pushing the valve body through the ink outlet and to be closed by taking off the ink bottle from the connecting tube, wherein the container body portion has an external appearance of a rectangular parallelepiped, and has two first side walls opposed to each other and two second side walls opposed to each other, the first side walls intersecting with the second side walls, a first distance between the first side walls being shorter than a second distance between the second side walls, and wherein the ink outlet forming portion is disposed within the first distance.

2. The ink bottle according to claim 1, wherein the container body portion has slanted wall portions which are slanted from respective the second side walls toward ink outlet forming portion.

3. The ink bottle according to claim 2, wherein an outside surface of the slanted wall portion and end portions of the first and second side walls define a recess.

4. The ink bottle according to claim 1, wherein the container body portion houses a stirring member, and wherein the ink outlet forming portion includes a holder, the holder holds the valve, the holder is engaged with an inner surface of the ink outlet forming portion, and the holder has a tubular portion having a groove that extends toward a side opposite to the ink outlet.

5. An ink bottle configured to supply ink to a printer through a connecting tube disposed in the printer, the ink bottle comprising:

a container body portion configured to contain ink;

an ink outlet forming portion having an ink outlet that allows the ink to flow out; and a valve disposed in the ink outlet forming portion, the valve configured to be opened by the connecting tube pushing the valve through the ink outlet and to be closed by taking off the ink bottle from the connecting tube, wherein the container body portion has an external appearance of a rectangular parallelepiped, and wherein the container body portion has a wall formed with the ink outlet forming portion, the wall being slanted toward the ink outlet forming portion.

6. The ink bottle according to claim 5, wherein the valve has an elastic valve body with a slit formed therethrough, the slit configured to be open by the connecting tube pushing the valve body through the ink outlet and to be closed by taking off the ink bottle from the connecting tube.

7. The ink bottle according to claim 5, wherein the container body portion further has a side wall, end portion of the side wall and an outside surface of the slanted wall defining a recess.

8. The ink bottle according to claim 5, further comprising a lid member, the lid member sealing the ink outlet in a state that the lid member is attached to the ink outlet forming portion.

9. The ink bottle according to claim 7, wherein at least one of the ink outlet forming portion and the lid member is made of polypropylene.

10. A printer ink supply system comprising a printer and an ink bottle for supplying ink to the printer, the printer including:

a slot portion, the slot portion having a circular portion; and a connecting tube configured to be connected to the ink bottle, the connecting tube being disposed in the circular portion, the ink bottle including:

a container body portion configured to contain ink;

a cylindrical portion having an ink outlet;

a valve disposed in the cylindrical portion, the valve having an elastic valve body with a slit formed therethrough, the slit configured to be open by the connecting tube pushing the valve body through the ink outlet and to be closed by taking off the ink bottle from the connecting tube; and a cover configured to cover the end part of the container body portion that is opposite to the ink outlet, the cover having a side wall that is flush with an uncovered portion of a side wall of the container body portion.

11. The printer ink supply system according to claim 10, wherein the slot portion of the printer further has a pair of rectangular portions, the rectangular portions being disposed radially outside of the circular portion and configured to be point symmetrical with respect to the circular portion, and wherein the ink bottle further includes a pair of protruding portions disposed radially outside of the cylindrical portion, each of the pair of protruding portions being arranged and configured to be point symmetrical with respect to the central axis of the ink outlet, the pair of protruding portions being inserted in the pair of the rectangular portions, respectively, in a state that the cylindrical portion is connected to the connecting tube.

12. The printer ink supply system according to claim 10, wherein the container body portion includes an opening portion and a film that is joined to a periphery of the opening portion before use of the ink bottle.

13. The printer ink supply system according to claim 12, wherein the film includes aluminum.

14. The printer ink supply system according to claim 10, wherein the container body portion is formed by a material selected from a group of polyethylene terephthalate, nylon, polyethylene, polypropylene, polystyrene, iron and aluminum.

15. The printer ink supply system according to claim 12, wherein the ink bottle further includes a seal member interposed between the cylindrical portion and the periphery of the opening portion.

* * * * *